United States Patent [19]
Witt et al.

[11] Patent Number: 5,751,981
[45] Date of Patent: May 12, 1998

[54] HIGH PERFORMANCE SUPERSCALAR MICROPROCESSOR INCLUDING A SPECULATIVE INSTRUCTION QUEUE FOR BYTE-ALIGNING CISC INSTRUCTIONS STORED IN A VARIABLE BYTE-LENGTH FORMAT

[75] Inventors: David B. Witt; William M. Johnson, both of Austin, Tex.

[73] Assignee: Advanced Micro Devices, Inc., Sunnyvale, Calif.

[21] Appl. No.: 599,699

[22] Filed: Feb. 9, 1996

Related U.S. Application Data

[62] Division of Ser. No. 501,243, Jul. 10, 1995, which is a continuation of Ser. No. 146,382, Oct. 29, 1993, abandoned.

[51] Int. Cl.$^6$ .................................................. G06F 9/38
[52] U.S. Cl. .................... 395/380; 395/376; 395/386; 395/387; 395/391; 395/394; 395/411
[58] Field of Search ................................ 395/375, 411, 395/800, 376, 380, 386, 387, 391, 394

[56] References Cited

U.S. PATENT DOCUMENTS

| | | | |
|---|---|---|---|
| 5,155,817 | 10/1992 | Kishigami et al. | 395/394 |
| 5,337,415 | 8/1994 | DeLano et al. | 395/389 |
| 5,438,668 | 8/1995 | Coon et al. | 395/375 |
| 5,465,373 | 11/1995 | Kahle et al. | 395/800 |
| 5,467,473 | 11/1995 | Kahle et al. | 395/800 |
| 5,488,710 | 1/1996 | Sato et al. | 395/452 |

OTHER PUBLICATIONS

Mike Johnson, "Superscalar Microprocessor Design", (Prentice–Hall series in innovative technology), ©1991. (Copy of book has been place in USPTO Library).

R.M. Tomasulo, "An Efficient Algorithm for Exploiting Multiple arithmetic Units", Part 2 Regions of Computer Space, Section 3 Concurrency: Single–Processor System, IBM Journal, vol. 11, Jan. 1967, pp. 250–32, 293–305.

U.S. Patent Application Serial No. 08/145,902 filed Oct. 29m 1993 entitled "Speculative Instruction Queue and Method Therefor Particularly Suitable for Variable Byte–Length Instructions"—David B. Witt, Attorney Docket No. M–2279 US.

U.S. Patent Application Serial No. 08/145,905 filed Oct. 29, 1893 entitled "Pre–Decoded Instruction Cache and Method Therefor Particularly Suitable for Variable Byte–Length Instructions"—David B. Witt and Michael D. Goddard, Attorney Docket M–2278 US.

U.S. Patent Application Serial No. 08/146,383 filed Oct. 29, 1993 entitled "Superscalar Instruction Decoder"—David B. Witt and Michael D. Goddard, Attorney Docket No. 2280 US.

(List continued on next page.)

*Primary Examiner*—Kenneth S. Kim
*Attorney, Agent, or Firm*—Skjerven, Morrill, MacPherson, Franklin & Friel LLP; Ken J. Koestner

[57] ABSTRACT

A superscalar microprocessor is provided which includes a integer functional unit and a floating point functional unit that share a high performance main data processing bus. The integer unit and the floating point unit also share a common reorder buffer, register file, branch prediction unit and load/store unit which all reside on the same main data processing bus. Instruction and data caches are coupled to a main memory via an internal address data bus which handles communications therebetween. An instruction decoder is coupled to the instruction cache and is capable of decoding multiple instructions per microprocessor cycle. Instructions are dispatched from the decoder in speculative order, issued out-of-order and completed out-of-order. Instructions are retired from the reorder buffer to the register file in-order. The functional units of the microprocessor desirably accommodate operands exhibiting multiple data widths. High performance and efficient use of the microprocessor die size are achieved by the sharing architecture of the disclosed superscalar microprocessor.

29 Claims, 31 Drawing Sheets

FIG. 2

OTHER PUBLICATIONS

D.W. Anderson, F.J. Sparacio, F.M. Tomasulo, "The IBM System/360 Model 91", Machine Philosophy and Instruction-handling, Chapter 18, Part 2 Regions of Computer Space, Section 3 Concurrency: Single–Processor System, IBM Journal, vol. 11, Jan. 1967, pp. 276–292.

U.S. Patent Application Serial No. 07/929,770 filed Apr. 12, 1992 entitled "Instruction Decoder and Superscalar Processor Utilizing Same"—David B. Witt and William M. Johnson.

Michael Slater, "AMD's K5 Designed to Outrun Pentium", Microprocessor Report, vol. 8, No. 14, Oct. 24, 1994, pp. 1,6–11.

Brian Case, "AMD Unveils First Superscalar 29K Core", Microprocessor Report, vol. 8, No. 14, Oct. 24, 1994, pp. 23–26.

Gurindar S. Sohi, "Instruction Issue Logic for High–Performance, Interruptible, Multiply Functional Unit, Pipelined Computers", IEEE Transaction on Computers, vol. 39, No. 3, ©1990, pp. 349–359.

Bruce D. Lightner and Gene Hill, "The Metaflow Lightning Chipset", IEEE Proceedings CompCom Spring '91, Feb. 1991, pp. 13–18.

IBM Technical Disclosure Bulletin, "High Speed Buffer with Dual Directories", vol. 26, No. 12, May 1984, pp. 6264–6265.

IBM Technical Disclosure Bulletin, "System/370 Emulator Assist Processor for a Reduced Instruction Set Computer", vol. 30, No. 10, Mar. 1988, pp. 308–309.

Shreekant S. Thakkar and William E. Hostmann, "An Instruction Pitch Unit for a Graph Reduction Machine", IEEE, 1986, pp. 82–91.

Toyohiko Yoshida, et al., "The Approach to Multiple Instruction Execution in the GMICRO/400 Processor", ©1991, pp. 185–195.

Val Popescu, "The Metaflow Architecture", IEEE Micro, Jun. 1991, pp. 10–13 and 63–73.

IBM Technical Disclosure Bulletin, "Variable–Performance Processors", vol. 17, No. 12, May 1975, pp. 3708–3710.

Tom R. Halfhill, "AMD K6 Takes on Intel P6", *Byte* magazine, Jan. 1996, pp. 67–68, 70, and 72.

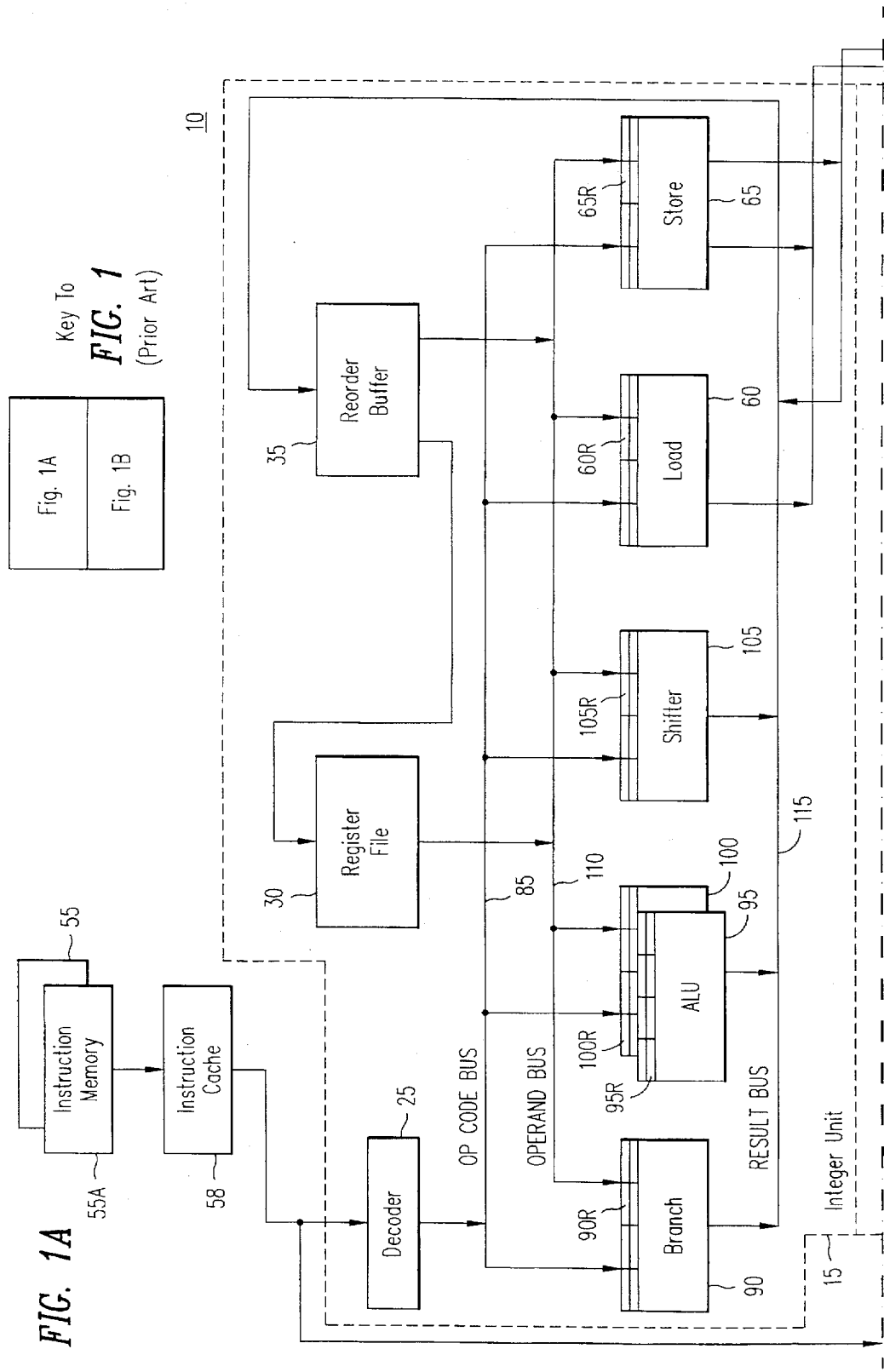

Key To

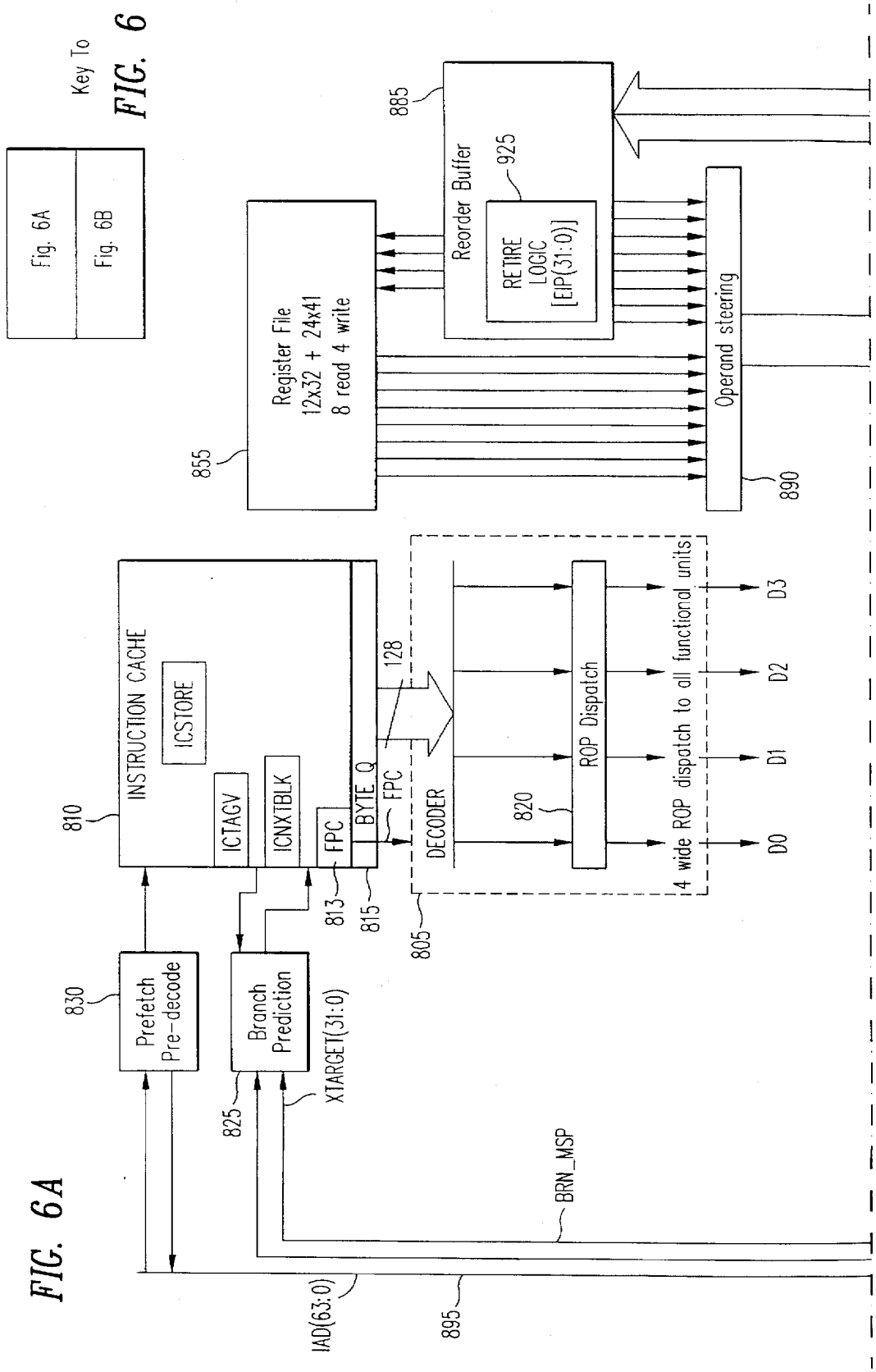

HIGH PERFORMANCE SUPERSCALAR MICROPROCESSOR INCLUDING A SPECULATIVE INSTRUCTION QUEUE FOR BYTE-ALIGNING CISC INSTRUCTIONS STORED IN A VARIABLE BYTE-LENGTH FORMAT

This application is a continuation of application Ser. No. 08/501,243, filed Jul. 10, 1995, which is a continuation of application Ser. No. 08/146,382, filed Oct. 29, 1993 now abandoned.

CROSS REFERENCE TO RELATED PATENT APPLICATIONS

This patent application is related to continued and abandoned U.S. patent application Ser. No. 07/929,770, filed Apr. 12, 1992 entitled "Instruction Decoder And Superscalar Processor Utilizing Same" which has the same inventive entity and assignee as the subject patent application, the disclosure of which is incorporated herein by reference.

This patent application is related to the copending U.S. patent application Ser No. 08/146,383 filed Oct. 29, 1993 which is abandoned and continued as Ser. No. 08/628,389 filed Apr. 5, 1996 entitled "Superscalar Instruction Decoder" by David B. Witt and Michael D. Goddard, the disclosure of which is incorporated herein by reference.

This patent application is related to the copending U.S. patent application Ser. No. 08/146,381 filed Oct. 29, 1993 which is abandoned and continued as Ser. No. 08/506,509 filed Jul. 24, 1995 entitled "Linearly Addressable Microprocessor Cache" by David B. Witt, the disclosure of which is incorporated herein by reference.

This patent application is related to the copending U.S. patent application Ser. No. 08/146,376 filed Oct. 29, 1993 which is abandoned and continued as Ser. No. 08/703,299 filed Aug. 26, 1996 entitled "High Performance Load/Store Functional Unit And Data Cache" by William M. Johnson, David B. Witt and Murali Chinnakonda, the disclosure of which is incorporated herein by reference.

This patent application is related to the copending U.S. patent application Ser. No. 08/145,905 filed Oct. 29, 1993, entitled "Pre-Decoded Instruction Cache And Method Therefor Particularly Suitable For Variable Byte-Length Instructions" by David B. Witt and Michael D. Goddard, the disclosure of which is incorporated herein by reference.

This patent application is related to the copending U.S. patent application Ser. No. 08/145,902 filed Oct. 29, 1994 which is abandoned and continued as Ser. No. 08/311,286 filed Sep. 23, 1994 entitled "Speculative Instruction Queue And Method Therefor Particularly Suitable For Variable Byte-Length Instructions" by David B. Witt, the disclosure of which is incorporated herein by reference.

In addition to the above related and co-pending applications, the present application is a divisional application, and therefore has additional related and co-pending applications, as follows:

The related U.S. Pat. No. 5,574,928 entitled "MIXED INTEGER/FLOATING POINT CORE," by Scott A. White, et al. issued on Nov. 12, 1996.

The related U.S. Patent Application entitled "HIGH PERFORMANCE SUPERSCALER MICROPROCESSOR INCLUDING A COMMON REORDER BUFFER AND COMMON REGISTER FILE FOR BOTH INTEGER AND FLOATING POINT OPERATIONS," Ser. No. 08/501,243, filed Jul. 10, 1995, by David B. Witt, et al. is pending.

The related U S. Patent Application entitled "HIGH PERFORMANCE SUPERSCALAR MICROPROCESSOR INCLUDING A CIRCUIT FOR CONVERTING CISC INSTRUCTIONS TO RISC OPERATIONS," Ser. No. 08/599,696, by David B. Witt and William M. Johnson is pending.

The related U.S. Patent Application entitled "HIGH PERFORMANCE SUPERSCALAR MICROPROCESSOR INCLUDING A CIRCUIT FOR BYTE-ALIGNING CISC INSTRUCTIONS STORED IN A VARIABLE BYTE-LENGTH FORMAT," Ser. No. 08/599,697, by David B. Witt and William M. Johnson is pending.

The related U.S. Patent Application entitled "HIGH PERFORMANCE SUPERSCALAR MICROPROCESSOR INCLUDING A DUAL-PATHWAY CIRCUIT FOR CONVERTING CISC INSTRUCTIONS TO RISC OPERATIONS," Ser. No. 08/599,700, by David B. Witt and William M. Johnson is pending.

The related U.S. Patent Application entitled "HIGH PERFORMANCE SUPERSCALAR MICROPROCESSOR INCLUDING A CIRCUIT FOR CONVERTING SIMPLE AND COMPLEX CISC INSTRUCTIONS TO RISC OPERATIONS," Ser. No. 08/599,701, by David B Witt and William M. Johnson is pending.

The related U.S. Patent Application entitled "HIGH PERFORMANCE SUPERSCALAR MICROPROCESSOR INCLUDING AN INSTRUCTION CACHE CIRCUIT FOR BYTE-ALIGNING CISC INSTRUCTIONS STORED IN A VARIABLE BYTE-LENGTH FORMAT," Ser. No. 08/599,698, by David B. Witt and William M. Johnson is pending.

The related U.S. Patent Application entitled "METHOD OF OPERATING A HIGH PERFORMANCE SUPERSCALAR MICROPROCESSOR INCLUDING A COMMON REORDER BUFFER AND COMMON REGISTER FILE FOR BOTH INTEGER AND FLOATING POINT OPERATIONS," Ser. No. 08/571,321, by David B. Witt and William M. Johnson is pending.

The related U.S. Patent Application entitled "MIXED INTEGER/FLOATING POINT CORE," Ser. No. 08/602,642, by Scott A. White, Michael D. Goddard and William M. Johnson is pending.

BACKGROUND OF THE INVENTION

This invention relates in general to microprocessors and, more particularly, to high performance superscalar microprocessors.

Like many other modern technical disciplines, microprocessor design is a technology in which engineers and scientists continually strive for increased speed, efficiency and performance. Generally speaking, microprocessors can be divided into two classes, namely scalar and vector processors. The most elementary scalar processor processes a maximum of one instruction per machine cycle. So called "superscalar" processors can process more than one instruction per machine cycle. In contrast with the scalar processor, a vector processor can process a relatively large array of values during each machine cycle.

Vector processors rely on data parallelism to achieve processing efficiencies whereas superscalar processors rely on instruction parallelism to achieve increased operational efficiency. Instruction parallelism may be thought of as the inherent property of a sequence of instructions which enable such instructions to be processed in parallel. In contrast, data parallelism may be viewed as the inherent property of a stream of data which enables the elements thereof to be processed in parallel. Instruction parallelism is related to the number of dependencies which a particular sequence of instructions exhibits. Dependency is defined as the extent to which a particular instruction depends on the result of another instruction. In a scalar processor, when an instruction exhibits a dependency on another instruction, the dependency generally must be resolved before the instruction can be passed to a functional unit for execution. For this reason, conventional scalar processors experience undesirable time delays while the processor waits pending resolution of such dependencies.

Several approaches have been employed over the years to speed up the execution of instructions by processors and microprocessors. One approach which is still widely used in microprocessors today is pipelining. In pipelining, an assembly line approach is taken in which the three microprocessor operations of 1) fetching the instruction, 2) decoding the instruction and gathering the operands, and 3) executing the instruction and writeback of the result, are overlapped to speed up processing. In other words, instruction 1 is fetched and instruction 1 is decoded in respective machine cycles. While instruction 1 is being decoded and its operands are gathered, instruction 2 is fetched. While instruction 1 is being executed and the result written, instruction 2 is being decoded and its operands are gathered, and instruction 3 is being fetched. In actual practice, the assembly line approach may be divided into more assembly line stations than described above. A more in-depth discussion of the pipelining technique is described by D. W. Anderson et al. in their publication "The IBM System/360 Model 91: Machine Philosophy", IBM Journal, Vol. 11, January 1967, pp. 8–24.

The following definitions are now set forth for the purpose of promoting clarity in this document. "Dispatch" is the act of sending an instruction from the instruction decoder to a functional unit. "Issue" is the act of placing an instruction in execution in a functional unit. "Completion" is achieved when an instruction finishes execution and the result is available. An instruction is said to be "retired" when the instruction's result is written to the register file. This is also referred to as "writeback".

The recent book, Superscalar Microprocessor Design, William Johnson, 1991, Prentice-Hall, Inc., describes several general considerations for the design of practical superscalar microprocessors. FIGS. 1, 1A, and 1B comprise a block diagram of a microprocessor 10 which depicts the implementation of a superscalar microprocessor described in the Johnson book. Microprocessor 10 includes an integer unit 15 for handling integer operations and a floating point unit 20 for handling floating point operations. Integer unit 15 and floating point unit each include their own respective, separate and dedicated instruction decoder, register file, reorder buffer, and load and store units. More specifically, integer unit 15 includes instruction decoder 25, a register file 30, a reorder buffer 35, and load and store units (60 and 65), while floating point unit 20 includes its own instruction decoder 40, register file 45, reorder buffer 50, and load and store units (75 and 80) as shown in FIG. 1. The reorder buffers contain the speculative state of the microprocessor, whereas the register files contain the architectural state of the microprocessor.

Microprocessor 10 is coupled to a main memory 55 which may be thought of as having two portions, namely an instruction memory 55A for storing instructions and a data memory 55B for storing data. Instruction memory 55A is coupled to both integer unit 15 and floating point unit 20. Similarly, data memory 55B is coupled to both integer unit 15 and floating point unit 20. In more detail, instruction memory 55A is coupled to decoder 25 and decoder 40 via instruction cache 58. Data memory 55B is coupled to load functional unit 60 and store functional unit 65 of integer unit 15 via a data cache 70. Data memory 55B is also coupled to a float load functional unit 75 and a float store functional unit 80 of floating point unit 20 via data cache 70. Load unit 60 performs the conventional microprocessor function of loading selected data from data memory 55B into integer unit 15, whereas store unit 70 performs the conventional microprocessor function of storing data from integer unit 15 in data memory 55B.

A computer program includes a sequence of instructions which are to be executed by microprocessor 10. Computer programs are typically stored in a hard disk, floppy disk or other non-volatile storage media which is located in a computer system. When the program is run, the program is loaded from the storage media into main memory 55. Once the instructions of the program and associated data are in main memory 55, the individual instructions can be prepared for execution and ultimately be executed by microprocessor 10.

After being stored in main memory 55, the instructions are passed through instruction cache 58 and then to instruction decoder 25. Instruction decoder 25 examines each instruction and determines the appropriate action to take. For example, decoder 25 determines whether a particular instruction is a PUSH, POP, LOAD, AND, OR, EX OR, ADD, SUB, NOP, JUMP, JUMP on condition (BRANCH) or other type of instruction. Depending on the particular type of instruction which decoder 58 determines is present, the instruction is dispatched to the appropriate functional unit. In the superscalar architecture proposed in the Johnson book, decoder 25 is a multi-instruction decoder which is capable of decoding 4 instructions per machine cycle. It can thus be said that decoder 58 exhibits a bandwidth which is four instructions wide.

As seen in FIG. 1, an OP CODE bus 85 is coupled between decoder 25 and each of the functional units, namely, branch unit 90, arithmetic logic units 95 and 100, shifter unit 105, load unit 60 and store unit 65. In this manner, the OP CODE for each instruction is provided to the appropriate functional unit.

Departing momentarily from the immediate discussion, it is noted that instructions typically include multiple fields in the following format: OP CODE, OPERAND A, OPERAND B, DESTINATION REGISTER. For example, the sample instruction ADD A, B, C would mean ADD the contents of register A to the contents of register B and place the result in the destination register C. The handling of the OP CODE portion of each instruction has already been discussed above. The handling of the OPERANDs for each instruction will now be described.

Not only must the OP CODE for a particular instruction be provided to the appropriate functional unit, but also the designated OPERANDS for that instruction must be retrieved and sent to the functional unit. If the value of a particular operand has not yet been calculated, then that value must be first calculated and provided to the functional unit before the functional unit can execute the instruction. For example, if a current instruction is dependent on a prior instruction, the result of the prior instruction must be determined before the current instruction can be executed. This situation is referred to as a dependency.

The operands which are needed for a particular instruction to be executed by a functional unit are provided by either register file 30 or reorder buffer 35 to operand bus 110.

Operand bus 110 is coupled to each of the functional units. Thus, operand bus 110 conveys the operands to the appropriate functional unit. In actual practice, operand bus 110 includes separate buses for OPERAND A and OPERAND B.

Once a functional unit is provided with the OP CODE and OPERAND A and OPERAND B, the functional unit executes the instruction and places the result on a result bus 115 which is coupled to the output of all of the functional units and to reorder buffer 35 (and to the respective reservation stations at the input of each functional unit as will now be discussed).

The input of each functional unit is provided with a "reservation station" for storing OP codes from instructions which are not yet complete in the sense that the operands for that instruction are not yet available to the functional unit. The reservation station stores the instruction's OP CODE together with operand tags which reserve places for the missing operands that will arrive at the reservation station later. This technique enhances performance by permitting the microprocessor to continue executing other instructions while the pending instruction is being assembled together with its operands at the reservation station. As seen in FIG. 1, branch unit 90 is equipped with a reservation station 90R; ALU's 95 and 100 are equipped with reservation stations 95R and 100R, respectively; shifter unit 105 is equipped with a reservation station 105R; load unit 60 is equipped with a reservation station 60R; and store unit 65 is equipped with a reservation station 65R. In this approach, reservation stations are employed in place of the input latches which were typically used at the inputs of the functional units in earlier microprocessors. The classic reference with respect to reservation stations is R.M. Tomasulo, "An Efficient Algorithm For Exploiting Multiple Arithmetic Units" IBM Journal, Volume 11, January 1967, pp. 25–33.

As mentioned earlier, a pipeline can be used to increase the effective throughput in a scalar microprocessor up to a limit of one instruction per machine cycle. In the superscalar microprocessor shown in FIG. 1, multiple pipelines are employed to achieve the processing of multiple instructions per machine cycle. This technique is referred to as "super-pipelining".

Another technique referred to as "register renaming" can also be employed to enhance superscalar microprocessor throughput. This technique is useful in the situation where two instructions in an instruction stream both require use of the same register, for example a hypothetical register 1. Provided that the second instruction is not dependent on the first instruction, a second register called register 1A is allocated for use by the second instruction in place of register 1. In this manner, the second instruction can be executed and a result can be obtained without waiting for the first instruction to be done using register 1. The superscalar microprocessor 10 shown in FIG. 1 uses a register renaming approach to increase instruction handling capability. The manner in which register renaming is implemented in microprocessor 10 is now discussed in more detail.

From the above, it is seen that register renaming eliminates storage conflicts for registers. To implement register renaming, integer unit 15 and floating point unit 20 are associated with respective reorder buffers 35 and 50. For simplicity, only register renaming via reorder buffer 35 in integer unit 15 will be discussed, although the same discussion applies to similar circuitry in floating point unit 20.

Reorder buffer 35 includes a number of storage locations which are dynamically allocated to instruction results. More specifically, when an instruction is decoded by decoder 25, the result value of the instruction is assigned a location in reorder buffer 35 and its destination register number is associated with this location. This effectively renames the destination register number of the instruction to the reorder buffer location. A tag, or temporary hardware identifier, is generated by the microprocessor hardware to identify the result. This tag is also stored in the assigned reorder buffer location. When a later instruction in the instruction stream refers to the renamed destination register, in order to obtain the value considered to be stored in the register, the instruction instead obtains the value stored in the reorder buffer or the tag for this value if the value has not yet been computed.

Reorder buffer 35 is implemented as a first-in-first-out (FIFO) circular buffer which is a content-addressable memory. This means that an entry in reorder buffer 35 is identified by specifying something that the entry contains, rather than by identifying the entry directly. More particularly, the entry is identified by using the register number that is written into it. When a register number is presented to reorder buffer 35, the reorder buffer provides the latest value written into the register (or a tag for the value if the value is not yet computed). This tag contains the relative speculative position of a particular instruction in reorder buffer 35. This organization mimics register file 30 which also provides a value in a register when it is presented with a register number. However, reorder buffer 35 and register file 30 use very different mechanisms for accessing values therein.

In the mechanism employed by reorder buffer 35, the reorder buffer compares the requested register number to the register numbers in all of the entries of the reorder buffer. Then, the reorder buffer returns the value (or tag) in the entry that has a matching register number. This is an associative lookup technique. In contrast, when register file 30 is presented with a requested register number, the register file simply decodes the register number and provides the value at the selected entry. when instruction decoder 25 decodes an instruction, the register numbers of the decoded instruction's source operands are used to access both reorder buffer 35 and register file 30 at the same time. If reorder buffer 35 does not have an entry whose register number matches the requested source register number, then the value in register file 30 is selected as the source operand. However, if reorder buffer 35 does contain a matching entry, then the value in this entry is selected as the source operand because this value must be the most recent value assigned to the reorder buffer. If the value is not available because the value has not yet been computed, then the tag for the value is instead selected and used as the operand. In any case, the value or tag is copied to the reservation station of the appropriate functional unit. This procedure is carried out for each operand required by each decoded instruction.

In a typical instruction sequence, a given register may be written many times. For this reason, it is possible that different instructions cause the same register to be written into different entries of reorder buffer 35 in the case where the instructions specify the same destination register. To obtain the correct register value in this scenario, reorder buffer 35 prioritizes multiple matching entries by order of allocation, and returns the most recent entry when a particular register value is requested. By this technique, new entries to the reorder buffer supersede older entries.

When a functional unit produces a result, the result is written into reorder buffer 35 and to any reservation station entry containing a tag for this result. When a result value is written into the reservation stations in this manner, it may provide a needed operand which frees up one or more waiting instructions to be issued to the functional unit for execution. After the result value is written into reorder buffer 35, subsequent instructions continue to fetch the result value from the reorder buffer. This fetching continues unless the entry is superseded by a new value and until the value is retired by writing the value to register file 30. Retiring occurs in the order of the original instruction sequence, thus preserving the in-order state for interrupts and exceptions.

With respect to floating point unit 20, it is noted that in addition to the float load functional unit 75 and a float store functional unit 80, floating point unit 20 includes other functional units as well. For instance, floating point unit 20 includes a float add unit 120, a float convert unit 125, a float multiply unit 130 and a float divide unit 140. An OP CODE bus 145 is coupled between decoder 40 and each of the functional units in floating point unit 20 to provide decoded instructions to the functional units. Each functional unit includes a respective reservation station, namely, float add reservation station 120R, float convert reservation station 125R, float multiply reservation station 130R and float divide reservation station 140R. An operand bus 150 couples register file 45 and reorder buffer 50 to the reservation stations of the functional units so that operands are provided thereto. A result bus 155 couples the outputs of all of the functional units of floating point unit 20 to reorder buffer 50. Reorder buffer 50 is then coupled to register file 45. Reorder buffer 50 and register file 45 are thus provided with results in the same manner as discussed above with respect to integer unit 15.

Integer reorder buffer 35 holds 16 entries and floating point reorder buffer 50 holds 8 entries. Integer reorder buffer 35 and floating point reorder buffer 50 can each accept two computed results per machine cycle and can retire two results per cycle to the respective register file.

When a microprocessor is constrained to issue decoded instructions in order ("in-order issue"), the microprocessor must stop decoding instructions whenever a decoded instruction generates a resource conflict (ie. two instructions both wanting to use the R1 register) or when the decoded instruction has a dependency, In contrast, microprocessor 10 of FIG. 1 which employs "out-of-order-issue" achieves this type of instruction issue by isolating decoder 25 from the execution units (functional units). This is done by using reorder buffer 35 and the aforementioned reservation stations at the functional units to effectively establish a distributed instruction window. In this manner, the decoder can continue to decode instructions even if the instructions can not be immediately executed. The instruction window acts as a pool of instructions from which the microprocessor can draw as it continues to go forward and execute instructions. A look ahead capability is thus provided to the microprocessor by the instruction window. When dependencies are cleared up and as operands become available, more instructions in the window are executed by the functional units and the decoder continues to fill the window with yet more decoded instructions.

Microprocessor 10 includes a branch prediction unit 90 to enhance its performance. It is well known that branches in the instruction stream of a program hinder the capability of a microprocessor to fetch instructions. This is so because when a branch occurs, the next instruction which the fetcher should fetch depends on the result of the branch. Without a branch prediction unit such as unit 90, the microprocessor's instruction fetcher may become stalled or may fetch incorrect instructions. This reduces the likelihood that the microprocessor can find other instructions in the instruction window to execute in parallel. Hardware branch prediction, as opposed to software branch prediction, is employed in branch prediction unit 90 to predict the outcomes of branches which occur during instruction fetching. In other words, branch prediction unit 90 predicts whether or not branches should be taken. For example, a branch target buffer is employed to keep a running history of the outcomes of prior branches. Based on this history, a decision is made during a particular fetched branch as to which branch the fetched branch instruction will take.

It is noted that software branch prediction also may be employed to predict the outcome of a branch. In that branch prediction approach, several tests are run on each branch in a program to determine statistically which branch outcome is more likely. Software branch prediction techniques typically involve imbedding statistical branch prediction information as to the favored branch outcome in the program itself. It is noted that the term "speculative execution" is often applied to microprocessor design practices wherein a sequence of code (such as a branch) is executed before the microprocessor is sure that it was proper to execute that sequence of code.

To understand the operation of superscalar microprocessors, it is helpful to compare scalar and superscalar microprocessors at each stage of the pipeline, namely at fetch, decode, execute, writeback and result commit. Table 1 below provides such a comparison.

TABLE 1

| Pipeline Stage | Pipelined Scalar Processor | Pipelined Superscalar Processor (with out-of-order issue & out-of-order completion) |
|---|---|---|
| Fetch | fetch one instruction | fetch multiple instructions |
| Decode | decode instruction | decode instructions |
| | access operands from register file | access operands from register file and reorder buffer |
| | copy operands to functional unit input latches | copy operands to functional unit reservation stations |
| Execute | execute instruction | execute instructions arbitrate for result buses |
| Writeback | write result to register file | write results to reorder buffer |
| | forward results to functional unit input latches | forward results to functional unit reservation stations |
| Result Commit | n/a | write result to register file |

From the above description of superscalar microprocessor 10, it is appreciated that this microprocessor is indeed a powerful but very complex structure. Further increases in processing performance as well as design simplification are however always desirable in microprocessors such as microprocessor 10.

SUMMARY OF THE INVENTION

Accordingly, one advantage of the superscalar microprocessor of the present invention is its increased performance in terms of processing instructions in parallel.

Another advantage of the superscalar microprocessor of the present invention is reduced complexity.

Still another advantage of the superscalar microprocessor of the present invention is reduced die size as compared to other superscalar microprocessors.

In accordance with one embodiment of the present invention, a superscalar microprocessor is provided for processing instructions stored in a main memory. The microprocessor includes a multiple instruction decoder for decoding multiple instructions in the same microprocessor cycle. The decoder decodes both integer and floating point instructions in the same microprocessor cycle. The microprocessor includes a data processing bus coupled to the decoder. The microprocessor further includes an integer functional unit and a floating point functional unit coupled to and sharing the same data processing bus. A common reorder buffer is coupled to the data processing bus for use by both the integer functional unit and the floating point functional unit. A common register file is coupled to the reorder buffer for accepting instruction results which are retired from the reorder buffer.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIGS. 1, 1A, and 1B comprise a block diagram showing a conventional superscalar microprocessor.

FIGS. 2, 2A, and 2B comprise a simplified block diagram of one embodiment of the high performance superscalar microprocessor of the present invention.

FIGS. 6, 6A, and 6B comprise a block diagram of another embodiment of the superscalar microprocessor of the invention.

DETAILED DESCRIPTION OF THE INVENTION

I. SUPERSCALAR MICROPROCESSOR OVERVIEW

The high performance superscalar microprocessor of the present invention desirably permits parallel out-of-order issue of instructions and out-of-order execution of instructions. More particularly, in the disclosed superscalar microprocessor, instructions are dispatched in program order, issued and completed out of order, and retired in order. Several aspects of the invention which permit achievement of high performance are now discussed before proceeding to a more detailed description.

Figure 1B:
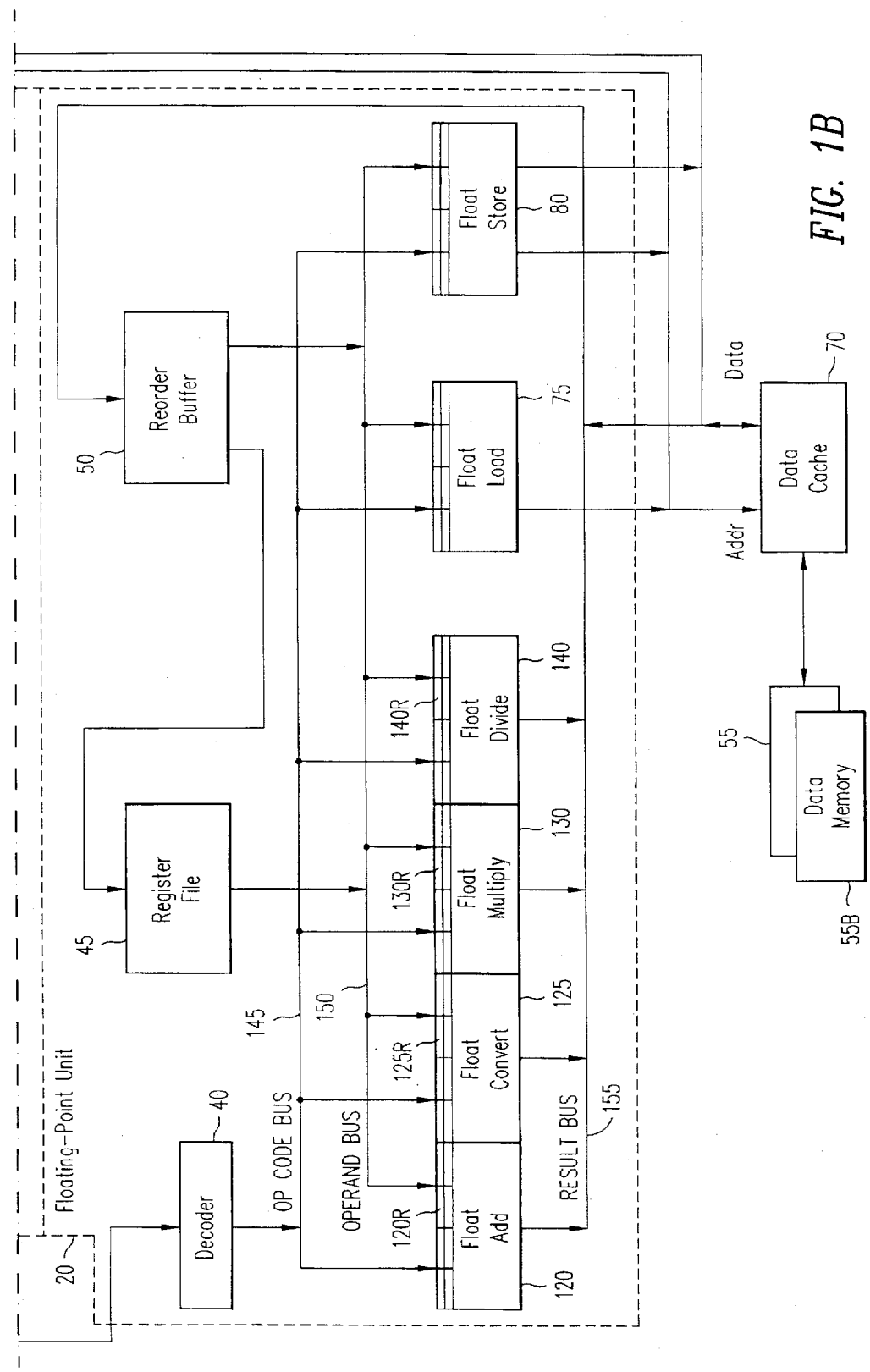
Figure 2A:
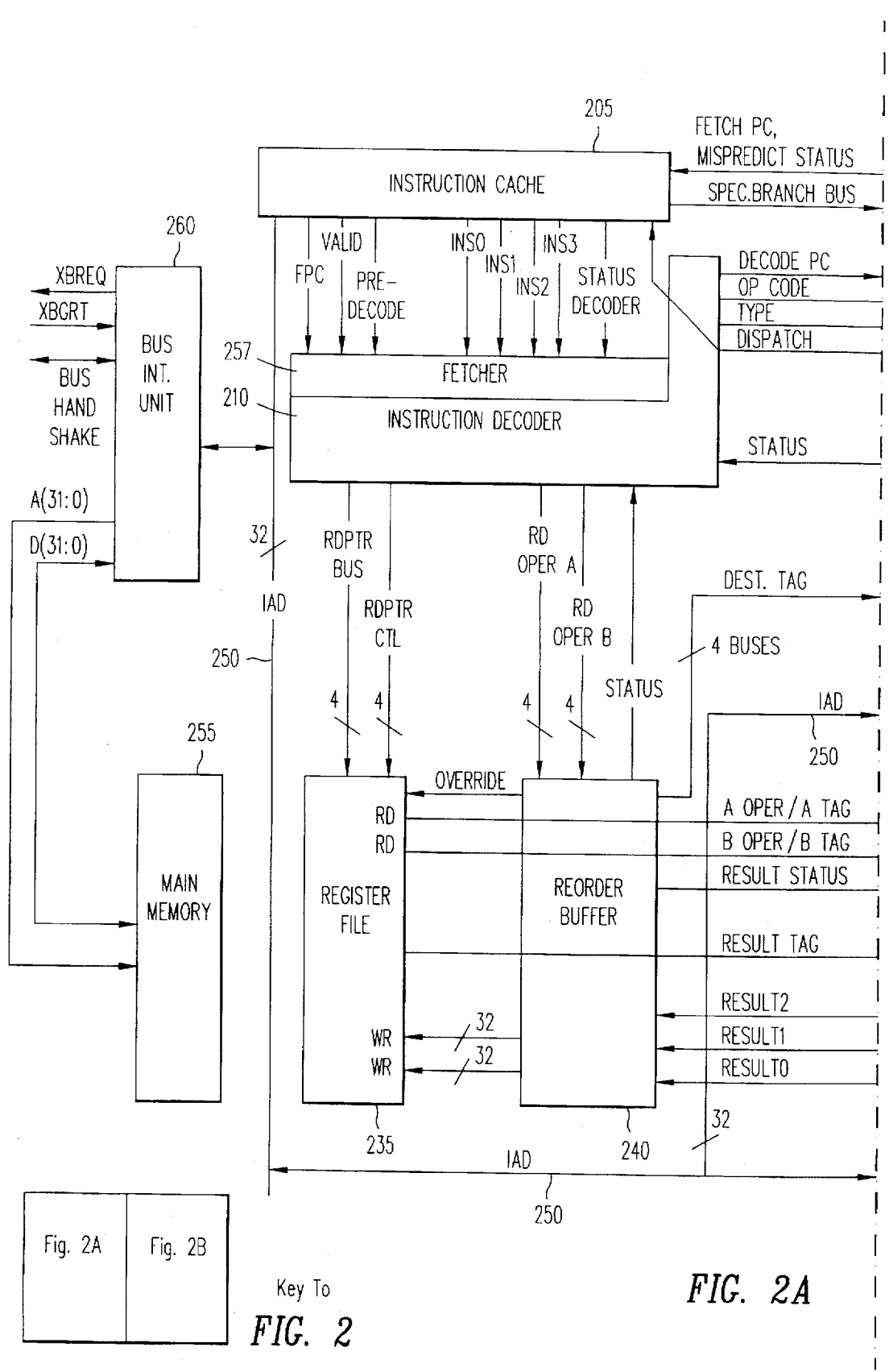
Figure 2B:
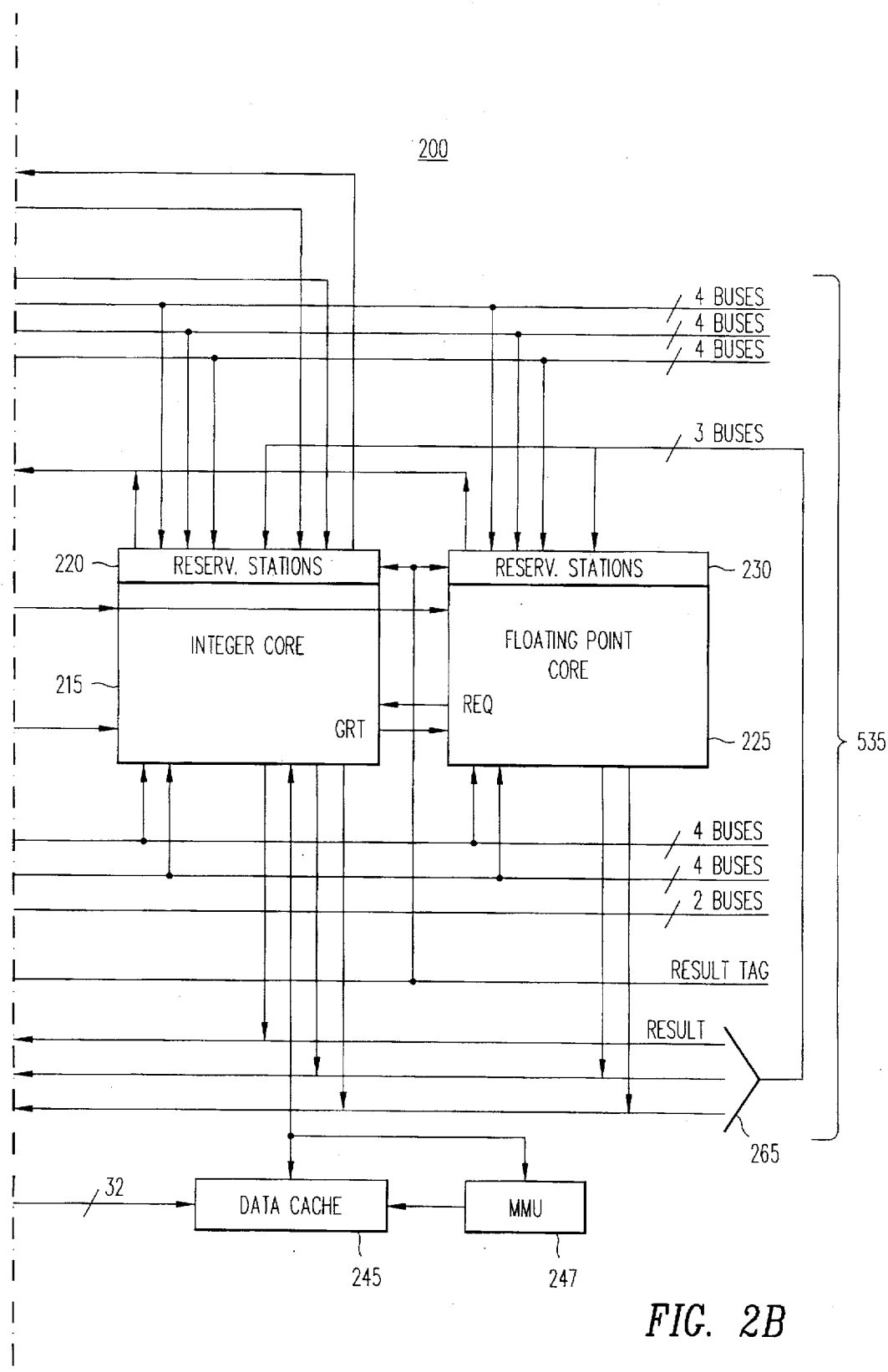

The superscalar microprocessor 200 of FIGS. 2, 2A, and 2B achieves increased performance without increasing die size by sharing several key components. The architecture of the microprocessor provides that the integer unit 215 and the floating point unit 225 are coupled to a common data processing bus 535. Data processing bus 535 is a high speed, high performance bus primarily due to its wide bandwidth. Increased utilization of both the integer functional unit and the floating point functional unit is thus made possible as compared to designs where these functional units reside on separate buses.

The integer and floating point functional units include multiple reservation stations which are also coupled to the same data processing bus 535. As seen in the more detailed representation of the microprocessor of the invention in FIGS. 3, 3A, 3B, 3C, 3D, and 3E, the integer and floating point functional units also share a common branch unit 520 on data processing bus 535. Moreover, the integer and floating point functional units share a common load/store unit 530 which is coupled to the same data processing bus 535. The disclosed microprocessor architecture advantageously increases performance while more efficiently using the size of the microprocessor die. In the embodiment of the invention shown in FIGS. 2 and 3, the microprocessor of the present invention is a reduced instruction set computer (RISC) wherein the instructions processed by the microprocessor exhibit the same width and the operand size is variable.

Returning to FIG. 2, a simplified block diagram of the superscalar microprocessor of the invention is shown as microprocessor 200. Superscalar microprocessor 200 includes a four instruction wide, two-way set associative, partially decoded 8K byte instruction cache 205. Instruction cache 205 supports fetching of multiple instructions per machine cycle with branch prediction. For purposes of this document, the terms machine cycle and microprocessor cycle are regarded as synonymous. Instruction cache 205 will also be referred to as ICACHE.

Microprocessor 200 further includes an instruction decoder (IDECODE) 210 which is capable of decoding and dispatching up to four instructions per machine cycle to any of six independent functional units regardless of operand availability. As seen in the more detailed embodiment of the invention depicted in FIG. 3 as microprocessor 500, these functional units include two arithmetic logic units (ALU 0 and ALU 1 shown collectively as ALU 505). These functional units further include a shifter section 510 (SHFSEC) which together with ALU section 505 form an integer unit 515 for processing integer instructions. The functional units also include a branch section (BRNSEC) 520 for processing instruction branches and for performing branch prediction. One branch unit which may be employed as branch unit 520 is described in U.S. Pat. No. 5,136,697 entitled "System For Reducing Delay For Execution Subsequent To Correctly Predicted Branch Instruction Using Fetch Information Stored With Each Block Of Instructions In Cache", issued Aug. 4, 1992, the disclosure of which is incorporated herein by reference. A floating point section (FPTSEC) 525 and a load/store section (LSSEC) 530 are also included among the functional units to which decoder (IDECODE) 210 dispatches instructions. The above described functional units all share a common main data processing bus 535 as shown in FIG.3. (For purposes of this document, FIGS. 3A, 3B, 3C, 3D, and 3E together form microprocessor 500 and should be viewed together in side by side relationship.)

In the simplified block diagram of superscalar microprocessor 200 of FIG. 2, branches are considered to be integer operations and the branching unit is viewed as being a part of integer core 215. It is also noted that superscalar microprocessor 200 provides for tagging of instructions to preserve proper ordering of operand dependencies and to allow out-of-order issue. Microprocessor 200 further includes multiple reservation stations at the functional units where dispatched instructions are queued pending execution. In this particular embodiment, two reservation stations are provided at the input of each functional unit. More particularly, integer core 215 includes two reservation stations 220 and floating point core 225 includes two reservation stations 230 in this particular embodiment. The number of reservation stations employed per functional unit may vary according to the degree of queuing desired. Integer core 215 processes integer instructions and floating point core 225 processes floating point instructions. In actual practice, integer core 215 and floating point core 225 each include multiple functional units, each of which is equipped with multiple reservation stations in one embodiment of the invention.

In this particular embodiment, microprocessor 200 is capable of handling up to three functional unit results per machine cycle. This is so because microprocessor 200 includes three result buses designated RESULT0, RESULT 1 and RESULT 2 which are coupled to all functional units (ie. to integer core 215 and floating point core 225 in FIG. 2). The invention is not limited to this number of result buses and a greater or lesser number of result buses may be employed commensurate with the performance level desired. Similarly, the invention is not limited to the particular number of functional units in the embodiments depicted.

Microprocessor 200 further includes a unified register file 235 for storing results which are retired from a reorder buffer 240. Register file 235 is a multi-ported, multiple register storage area which permits 4 reads and 2 writes per machine cycle in one embodiment. Register file 235 accommodates different size entries, namely both 32bit integer and 64bit floating point operand entries in the same register file in one embodiment. Register file 235 exhibits a size of 194 32 bit registers in this particular embodiment. Reorder buffer 240 also accommodates different size entries, namely both 32 bit integer and 64 bit floating point operand entries in the same register file in one embodiment. Again, these particular numbers are given for purposes of illustration rather than limitation.

Reorder buffer 240 is a circular buffer or queue which receives out-of-order functional unit results and which updates register file 235 in sequential instruction program order. In one embodiment, reorder buffer 240 is implemented as a first in first out (FIFO) buffer with 10 entries. The queue within FIFO ROB 240 includes a head and a tail. Another embodiment of the invention employs a reorder buffer with 16 entries. Reorder buffer 240 contains positions allocated to renamed registers, and holds the results of instructions which are speculatively executed. Instructions are speculatively executed when branch logic predicts that a certain branch will be taken such that instructions in the predicted branch are executed on speculation that the branch was indeed properly taken in a particular instance. If it should be determined that the branch was mispredicted, then the branch results which are in reorder buffer 240 are effectively cancelled. This is accomplished by microprocessor effectively backing up to the mispredicted branch instruction, flushing the speculative state of the microprocessor and resuming execution from a point in the program instruction stream prior to the mispredicted branch.

Although the 10 entries of reorder buffer are 32 bits wide each (which corresponds to the width of a 32 bit integer quantity), the reorder buffer can also accommodate 64 bit quantities such as 64 bit floating point quantities, for example. This is accomplished by storing the 64 bit quantity within the reorder buffer as two consecutive ROP's. (ROP's, pronounced R-ops, refer to RISC or RISC-like instructions/ operations which are processed by the microprocessor.) Such stored consecutive ROP's have information linking them as one structure and are retired together as one structure. Each reorder buffer entry has the capacity to hold one 32 bit quantity, namely ½ a double precision floating point quantity, one single precision floating point quantity or a 32 bit integer.

A program counter (PC) is employed to keep track of the point in the program instruction stream which is the boundary between those instructions which have been retired into register file 235 as being no longer speculative, and those instructions which have been speculatively executed and whose results are resident in reorder buffer (ROB) 240 pending retirement. This PC is referred to as the retire PC, or simply the PC. The retire PC is stored and updated at the head of the ROB queue. ROB entries contain relative PC update status information.

The retire PC is updated by status information associated with the head of the reorder buffer queue. More particularly, the reorder buffer queue indicates the number of instructions that are ready to retire, up to a maximum of four instructions in this particular embodiment. The retire PC section which is situated within retire logic 242 holds the current retired PC. If four (4) sequential instructions are to be retired in a particular clock cycle, then the retire PC logic adds [4 instructions*4 bytes/instruction] to the current retire PC to produce the new retire PC. If a taken branch exists, then the retire PC is advanced to the target of the branch once the branch is retired and no longer speculative. The retire PC is subsequently incremented from that point by the number of instructions retired. The retire PC is present on an internal bus within retire logic 242, namely PC(31:0).

II. SIMPLIFIED BLOCK DIAGRAM OF THE SUPERSCALAR MICROPROCESSOR

The discussion of this section will focus on aspects of the simplified microprocessor block diagram of FIG. 2 not already discussed above. A general perspective will be presented.

FIG. 2 shows a simplified block diagram of one embodiment of the high performance superscalar microprocessor of the present invention as microprocessor 200. In microprocessor 200, instruction cache 205 and a data cache 245 are coupled to each other via a 32 bit wide internal address data (IAD) bus 250. IAD bus 250 is a communications bus which, in one embodiment, exhibits relatively low speed when compared with data processing bus 535. IAD bus 250 serves to interconnect several key components of microprocessor 200 to provide communication of both address information and data among such components. IAD bus 250 is employed for those tasks which do not require high speed parallelism as do operand handling and result handling which data processing bus 535 handles. In one embodiment of the invention, IAD bus 250 is a 32 bit wide bus onto which both data and address information are multiplexed in each clock cycle. The bandwidth of IAD bus 250 is thus 64 bits/clock in one example.

A main memory 255 is coupled to IAD bus 250 via a bus interface unit 260 as shown in FIG. 2. In this manner, the reading and writing of information to and from main memory 255 is enabled. For convenience of illustration, main memory 255 is shown in FIG. 2 as being a part of microprocessor 200. In actual practice, main memory 225 is generally situated external to microprocessor 200. Implementations of microprocessor 200 are however contemplated wherein main memory 255 is located within microprocessor 200 as in the case of a microcontroller, for example.

Decoder 210 includes a fetcher 257 which is coupled to instruction cache 205. Fetcher 257 fetches instructions from cache 205 and main memory 255 for decoding and dispatch by decoder 210.

A bus interface unit (BIU) 260 is coupled to IAD bus 250 to interface microprocessor 200 with bus circuitry (not shown) external to microprocessor 200. More particularly, IAD bus 260 interfaces microprocessor 200 with a system bus, local bus or other bus (not shown) which is external to microprocessor 200. One bus interface unit which may be employed as BIU 260 is the bus interface unit from the AM29030 microprocessor which is manufactured by Advanced Micro Devices. BIU 260 includes an address port designated A(31:0) and a data port designated D(31:0). BIU 260 also includes a bus hand shake port (BUS HAND SHAKE) and grant/request lines designated XBREQ (not bus request) and XBGRT (not bus grant). The bus interface unit of the AM29030 microprocessor is described in more detail in the Am29030 User's Manual published by Advanced Micro Devices, Inc.

Those skilled in the art will appreciate that programs including sequences of instructions and data therefor are stored in main memory 255. When instructions and data are read from memory 255, the instructions and data are respectively stored in instruction cache 205 and data cache 245 before the instructions can be fetched, decoded and dispatched to the functional units by decoder 210.

When a particular instruction is decoded by decoder 210, decoder 210 sends the OP CODE of the decoded instruction to the appropriate functional unit for that type of instruction. Assume for example purposes that the following instruction has been fetched: ADD R1, R2, R3 (ADD the integer in register 1 to the integer in register 2 and place the result in register 3. Here, R1 is the A operand, R2 is the B operand and R3 is the destination register).

In actual practice, decoder 210 decodes four (4) instructions per block at one time and identifies the opcode associated with each instruction. In other words, decoder 210 identifies an opcode type for each of the four dispatch positions included in decoder 210. The four decoded opcode types are then broadcast on the four TYPE busses, respectively, to the functional units. The four decoded opcodes are broadcast on respective OP CODE busses to the functional units. Operands, if available, are retrieved from ROB 240 and register file 235. The operands are broadcast to the functional units over the A operand and B operand busses. If a particular operand is not available, an A or B operand tag is instead transmitted to the appropriate functional unit over the appropriate A or B operand bus. The four instructions decoded by decoder 210 are thus dispatched to the functional units for processing.

With respect to the ADD opcode in the present example, one of the functional units, namely the arithmetic logic unit (ALU) in integer core 215 will recognize the opcode type and latch in its reservation station 220 the information including opcode, A operand tag, A operand (if available), B operand tag, B operand (if available) and destination tag. The ALU functional unit then determines the result and places the result on the result bus 265 for storage in ROB 240 and for retrieval by any other functional unit needing that result to process a pending instruction.

It is noted that when an instruction is decoded by decoder 210, a register is allocated in reorder buffer 240 for the result. The destination register of the instruction is then associated with the allocated register. A result tag (a temporary unique hardware identifier) corresponding to the not yet available result of the instruction is then placed in the allocated register. "Register renaming" is thus implemented. When an instruction later in the program instruction sequence refers to this renamed destination register in reorder buffer 240, reorder buffer 240 provides either the result value which is stored in the location allocated to that register or the tag for that value if the result has not yet been computed. When the result is finally computed, a signal is placed on the result tag bus to let reorder buffer 240 and the reservation stations of the functional units know that the result is now available on the result bus. The result is thus stored in reorder buffer 240.

As seen in FIG. 3, the destination tag line runs from reorder buffer 240 to the functional units. Decoder 210 informs the reorder buffer of the number of instructions which are presently ready for allocation of reorder buffer entries. The reorder buffer then assigns each instruction a destination tag based on the current state of the reorder buffer. Decoder 210 then validates whether each instruction is issued or not. The reorder buffer takes those instructions that are issued and validates the temporary allocation of reorder buffer entries.

The operands for a particular instruction are transported to the appropriate functional unit over the A Operand bus (A OPER) and the B Operand bus (B OPER) of common data processing bus 535. The results of respective instructions are generated at the functional units assigned to those instructions. Those results are transmitted to reorder buffer 240 via composite result bus 265 which includes 3 result buses RESULT 0, RESULT1 and RESULT 2. Composite result bus 265 is a part of data processing bus 535.

The fact that one or more operands are not presently available when a particular instruction is decoded does not prevent dispatch of the instruction from decoder 210 to a functional unit. Rather, in the case where one or more operands are not yet available, an operand tag (a temporary unique hardware identifier) is sent to the appropriate functional unit/reservation station in place of the missing operand. The OP CODE for the instruction and the operand tag are then stored in the reservation station of that functional unit until the operand corresponding to the tag becomes available in reorder buffer 240 via the result bus. Once all missing operands become available in reorder buffer 240, the operand corresponding to the tag is retrieved from reorder buffer 240. The operand(s) and OP CODE are then sent from the reservation station to the functional unit for execution. The result is placed on the result bus for transmission to reorder buffer 240.

It is noted that in the above operand tag transaction, the operand tags are actually transmitted to the reservation stations of the functional unit via the A OPER and B OPER buses. When used in this fashion to communicate operand tags, the A OPER and B OPER buses are referred to as the A TAG and B TAG buses as indicated in FIG. 2.

III. SUPERSCALAR MICROPROCESSOR; A MORE DETAILED DISCUSSION

FIG. 3 shows a more detailed implementation of the microprocessor of the present invention as microprocessor 500. Like numerals are used to indicate like elements in the microprocessors depicted in FIGS. 2, and 3. It is noted that portions of microprocessor 500 have already been discussed above.

In microprocessor 500, instructions are dispatched in speculative program order, issued and completed out of order, and retired in order. It will become clear in the subsequent discussion that many signals and buses are replicated to promote parallelism, especially for instruction dispatch. Decoder 210 decodes multiple instructions per microprocessor cycle and forms a dispatch window from which the decoded instructions are dispatched in parallel to functional units. ICACHE 205 is capable of providing four instructions at a time to decoder 210 over lines INS0, INS1, INS2 and INS3 which couple ICACHE 205 to decoder 210.

In microprocessor 500, the main data processing bus is again designated as data processing bus 535. Data processing bus 535 includes 4 OP CODE buses, 4 A OPER/A TAG buses, 4 B OPER/B TAG buses and 4 OP CODE TYPE buses. Since the 4 OP CODE buses, 4 A OPER/A TAG buses, 4 B OPER/B TAG buses and 4 OP CODE TYPE buses cooperate to transmit decoded instructions to the functional units, they are together also referred to as 4 instruction buses designated XI0B, XI1B, XI2B and XI3B (not separately labelled in the figures.) These similar instruction bus names are distinguished from one another by a single digit. This digit indicates the instruction's position in a 0 mod 16 byte block of memory, with 0 being the earlier instruction. These names are given in generic form here with the digit replaced by a lowercase "n" (ie. the four instruction buses XI0B, XI1B, XI2B and XI3B are referred to as XInB).

The features of superscalar microprocessor 500 which permit parallel out-of-order instruction execution are now briefly reiterated before commencing a more detailed discussion of the microprocessor. Microprocessor 500 includes a four-instruction-wide, two-way set associative, partially-decoded 8K byte instruction cache 205 (ICACHE) to support fetching of four instructions per microprocessor cycle with branch prediction. Microprocessor 500 provides for decode and dispatch of up to four instructions per cycle by decoder 210 (IDECODE) to any of five independent functional units regardless of operand availability. These functional units include branching section BRNSEC 520, arithmetic logic unit ALU 505, shifter section SHFSEC 510, floating point section FPTSEC 525 and LOAD/STORE section 530.

Microprocessor 500 provides tagging of instructions to preserve proper ordering of operand dependencies and allow out-of-order issue. Microprocessor 500 further includes reservation stations in the functional units at which dispatched instructions that cannot yet be executed are queued. Three result buses (RESULT0, RESULT1 and RESULT2) are provided to permit handling of up to three functional unit results per cycle. A circular buffer or FIFO queue, namely reorder buffer 240, receives out-of-order functional unit results and updates the register file 235. More particularly, the register file is updated in correct program order with results from the reorder buffer. In other words, retirement of results from the reorder buffer to the register file is in the order of correct execution with all the branches, arithmetic and load/store operations which that entails. Multiported register file 235 is capable of 4 reads and 2 writes per machine cycle. RESULT0, RESULT1 and RESULT2 are written in parallel to ROB 240. As results are retired from ROB 240, they are written in parallel to register file 235 via write buses WRITEBACK0 and WRITEBACK1. Microprocessor 500 also includes an on-board direct mapped 8K byte coherent data cache 245 to minimize load and store latency.

III (A) Instruction Flow—FETCH

The instruction flow through microprocessor 500 is now discussed. Instruction decoder (IDECODE) 210 includes an instruction fetcher 257 which fetches instructions from instruction cache (ICACHE) 205. One instruction cache which may be employed as cache 205 is described in copending U.S. patent application Ser. No. 07/929,770, filed Apr. 12, 1992, entitled "Instruction Decoder And Superscalar Processor Utilizing Same" which was incorporated herein by reference earlier in this document. One decoder which may be employed as decoder 210 (IDECODE) is also described in patent application Ser. No. 07/929,770, filed Apr. 12, 1992, entitled "Instruction Decoder And Superscalar Processor Utilizing Same".

As a particular program in main memory 255 is being run by microprocessor 500, the instructions of the program are retrieved in program order for execution. Since instructions aren't normally in ICACHE 205 to begin with, a typical ICACHE refill operation will first be discussed. On a cache miss, a request is made to the bus interface unit (BIU) 260 for a four-word block of instructions aligned in memory at 0 mod 16 bytes (the cache block size). This starts a continuing prefetch stream of instruction blocks, with the assumption being that subsequent misses will also occur. A four word block is the minimum transfer size, since in this particular embodiment there is only one valid bit per block in the cache. A valid bit indicates that the current 16 byte entry and tag is valid. This means that the entry has been loaded and validated to the currently running program.

As a block of instructions returns (low-order word first, as opposed to word-of-interest first), it passes through a pre-decode network (not shown) which generates four bits of information per instruction. If the previous block of instructions has been dispatched, the next instruction block (new instruction block) advances to instruction register 258 and IDECODE 210. Otherwise the next instruction block waits in prefetch buffer 259. Instruction register 258 holds the current four instructions that are the next instructions to be dispatched for speculative execution. Prefetch buffer 259 holds a block of prefetched instructions that ICACHE 205 has requested. These instructions will be subsequently pre-decoded and fed into ICACHE 205 and IDECODE 210. By holding a block of prefetched instructions in this manner, a buffering action is provided such that dispatching by IDECODE 210 and prefetching need not to run in lockstep.

The next instruction block is written into ICACHE 205 when the next instruction which is predicted executed advances to decode if there are no unresolved conditional branches. This approach desirably prevents unneeded instructions from being cached. The predecode information is also written in the cache. Predecode information is information with respect to the size and content of an instruction which assists in quickly channelling a particular instruction to the appropriate functional unit. More information with respect to predecoding is found in the U.S. patent application entitled "Pre-Decoded Instruction Cache And Method Therefor Particularly Suitable For Variable Byte-Length Instructions (Attorney Docket No. M-2278), filed concurrently herewith and assigned to the instant assignee, the disclosure of which is incorporated herein by reference.) It is noted that branch prediction is used to predict which branches are taken as a program is executed. The prediction is later validated when the branch is actually executed. Prediction occurs during the fetch stage of the microprocessor pipeline.

The prefetch stream continues until BIU 260 has to give up the external bus (not shown) coupled thereto, the data cache 245 needs external access, the prefetch buffer 259 overflows, a cache hit occurs or a branch or interrupt occurs. From the above it will be appreciated that prefetch streams tend not to be very long. Generally, external prefetches are at most two blocks ahead of what is being dispatched.

It is noted that, in this particular embodiment, there is only one valid bit per block in instruction cache 205 (ICACHE) so partial blocks do not exist—all external fetches are done in blocks of four instructions. Again, there is only one valid bit per block in the cache. ICACHE 205 also contains branch prediction information for each block. This information is cleared on a refill.

Now that instructions have progressed into ICACHE 205, superscalar execution can commence. It is noted that once an externally fetched block advances to decode, operation is the same as though it were fetched from ICACHE 205, but overall performance is limited by the maximum external fetch rate of one instruction per cycle. A four word block of instructions is fetched and advanced to decode along with the predecode information (cache read at PH2, instruction buses driven at PH1). PH1 is defined as the first of the two phases of the clock and PH2 is defined as the second of the two phases of the clock. PH1 and PH2 constitute the fundamental timing of a pipelined processor.

Figure 3A:
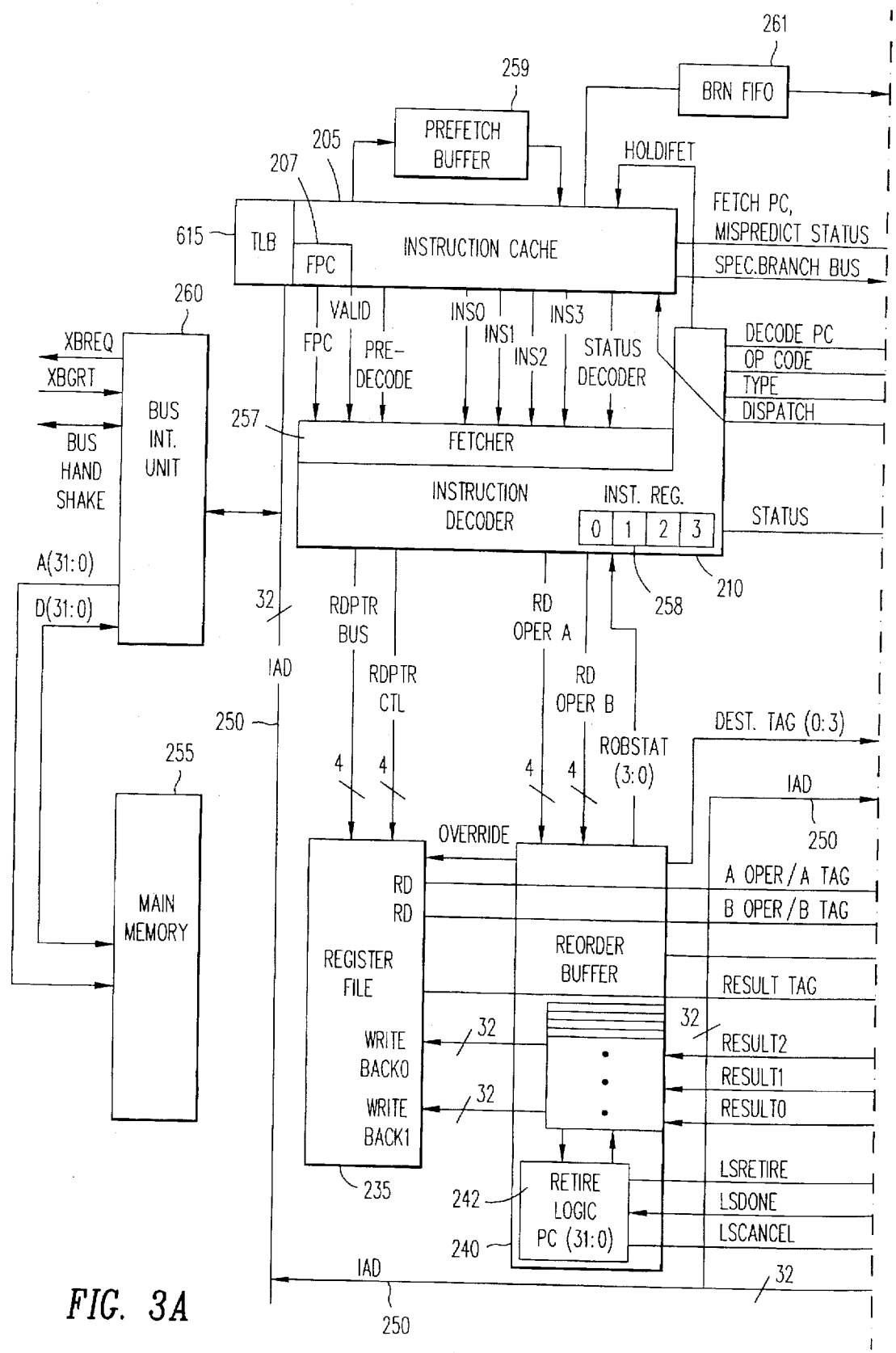
FIGS. 3, 3A, 3B, 3C, 3D, and 3E comprise a more detailed block diagram of another embodiment of the high performance superscalar microprocessor of the present invention.
Figure 3B:
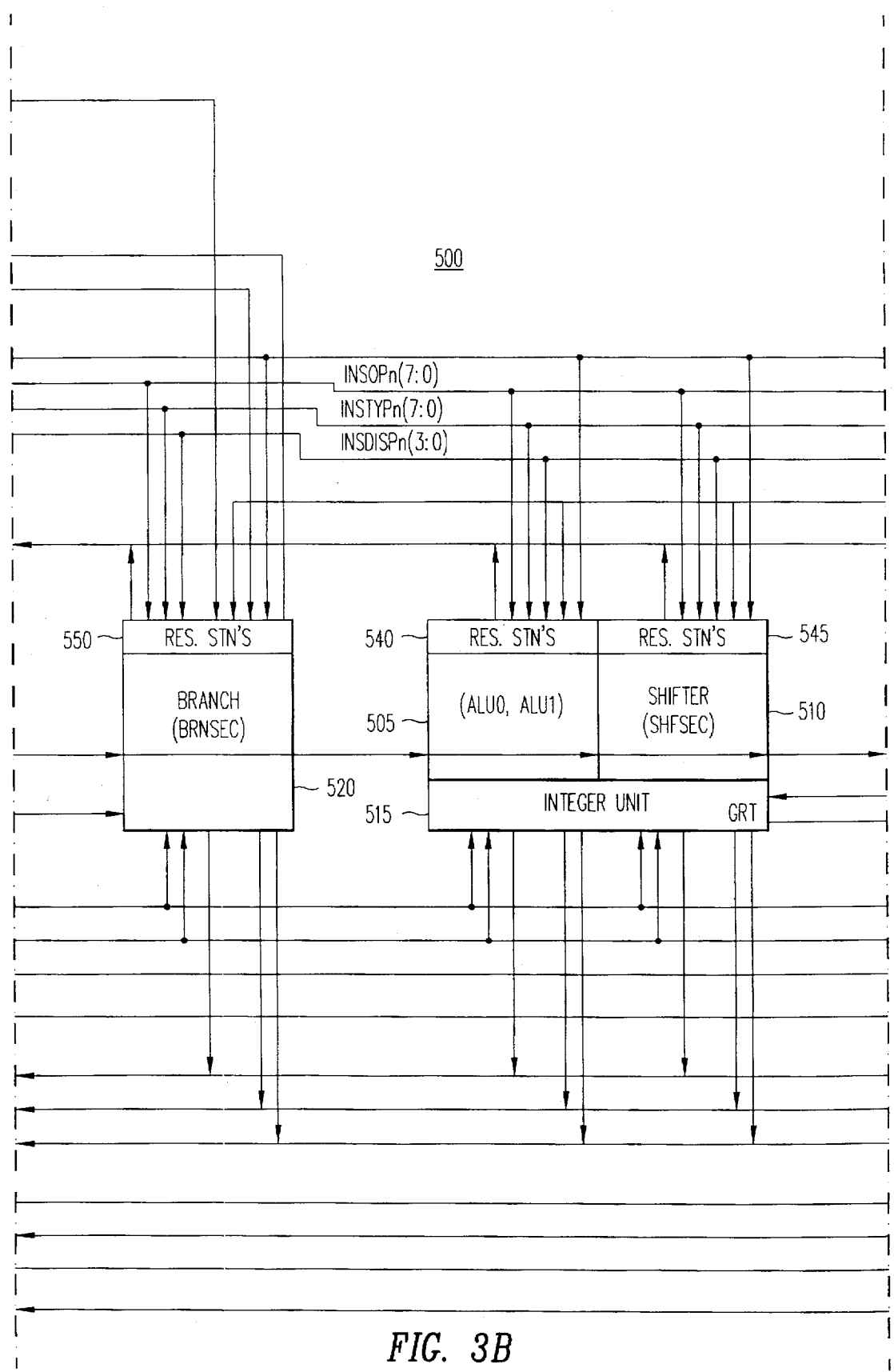
Figure 3C:
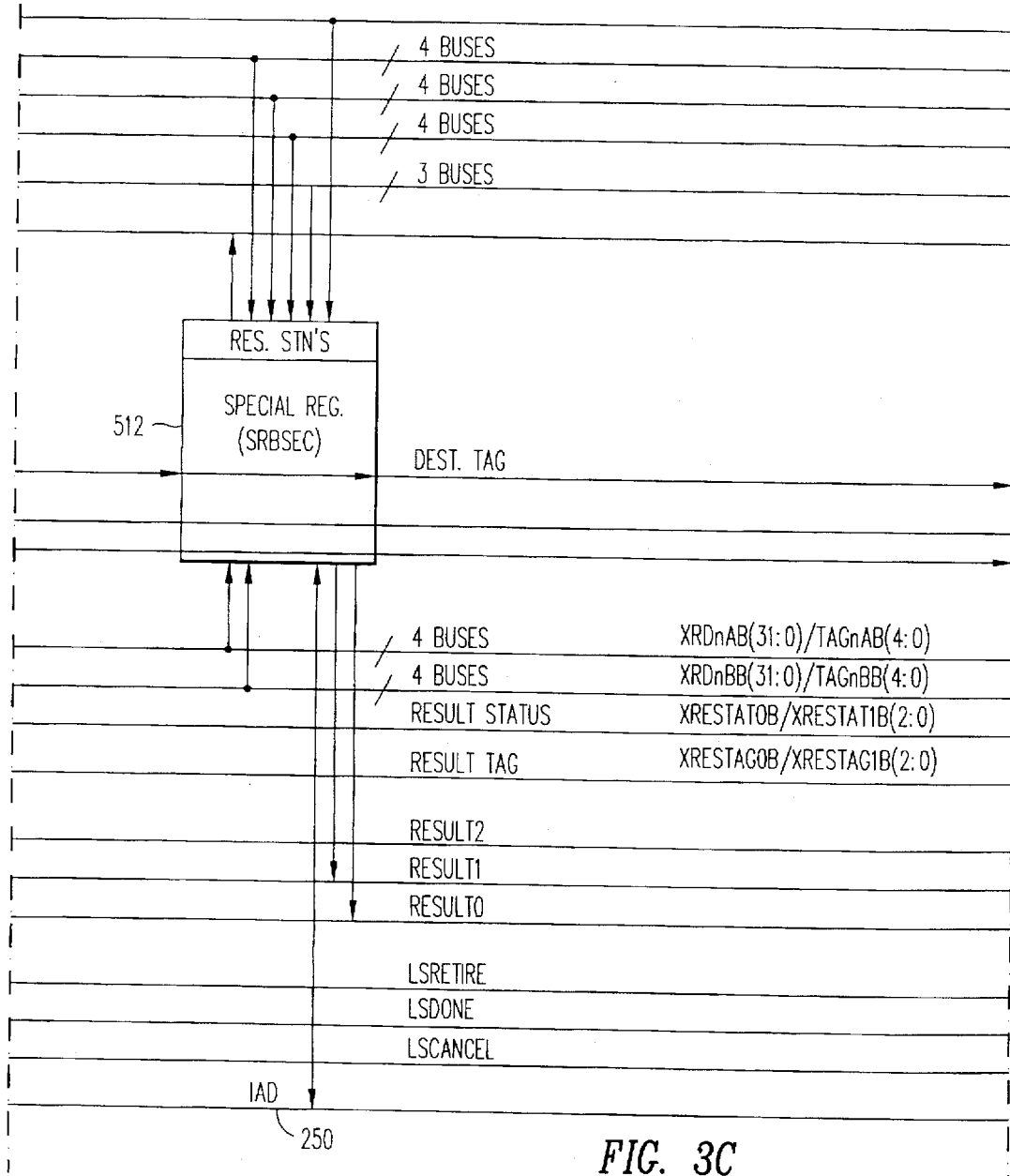
Figure 3D:
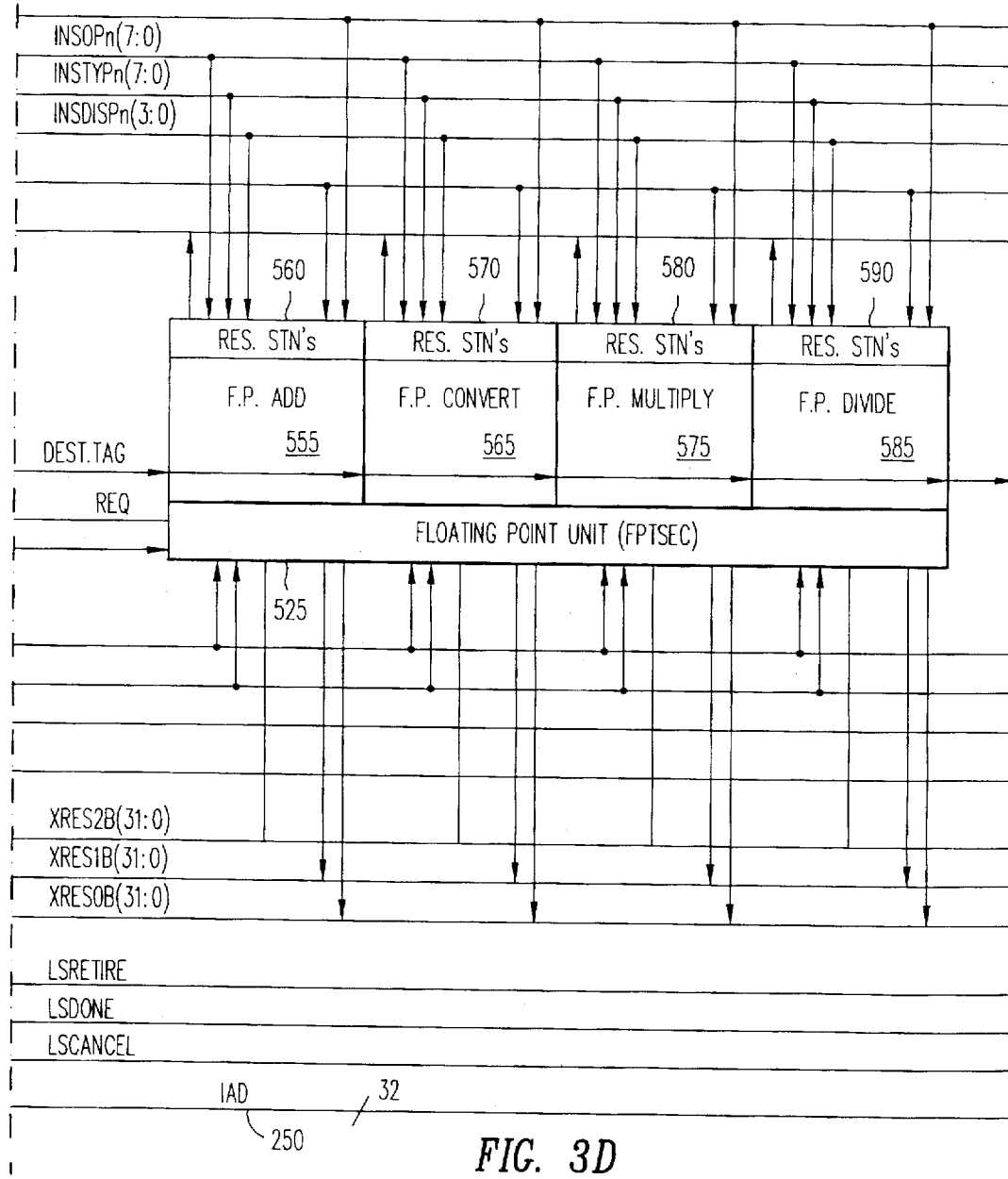
Figure 3:
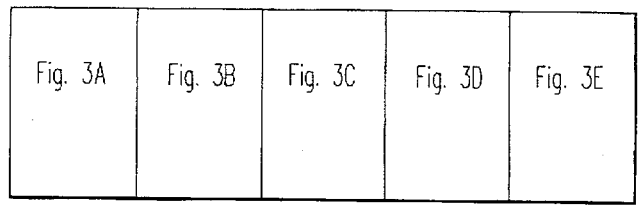
Figure 3E:
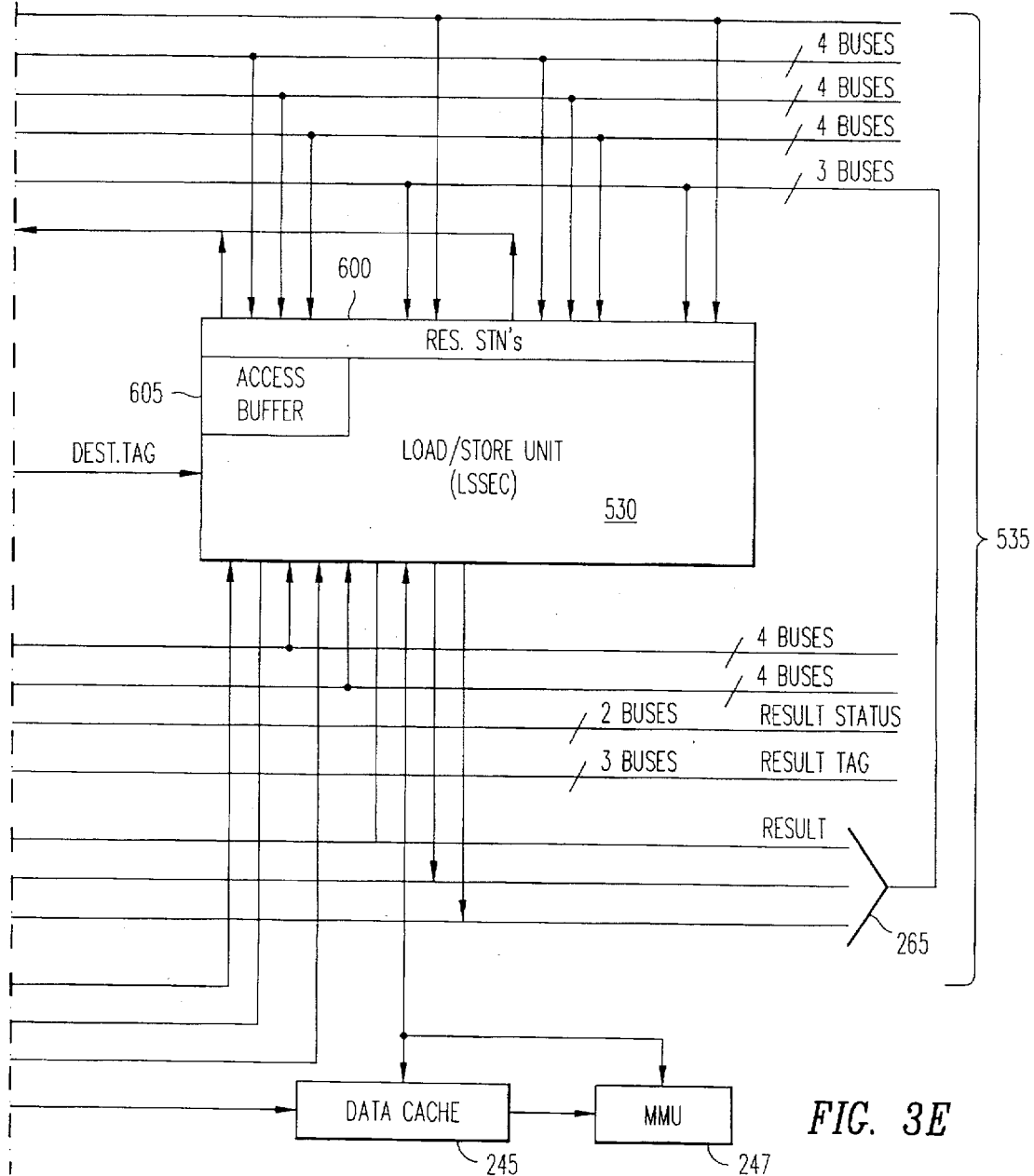

As seen in FIG. 3A, a 32 bit Fetch PC (FPC) bus, FPC(31:0), is coupled between instruction cache (ICACHE) 205 and fetcher 257 of decoder (IDECODE) 210. More particularly, the FPC bus extends between FPC block 207 in ICACHE 205 and fetcher 257. The Fetch PC or FPC block 207 in instruction cache 205 controls the speculative fetch program counter, designated FPC, located therein. FPC block 207 holds the program count, FPC, associated with the instructions which fetcher 257 prefetches ahead of the dispatch of instructions by decoder 210 to the functional units. The FPC bus indicates the location for the ICACHE to go on an exception or branch prediction. The fetch PC block 207 uses branch prediction information stored in instruction cache 205 to prefetch instructions (4 wide) into decoder 210. The Fetch PC block can either predict sequential accesses, in which case it increments the current Fetch PC by 16 bytes when a new block is required, or branch to a new block. The new branch positions can either be received from the instruction cache for predicted branches, or from the branch functional unit on misprediction or exceptions. The Fetch PC or FPC is to be distinguished from the retire PC discussed earlier.

The Fetch PC (FPC) is incremented at PH1 and the next block is read out of ICACHE 205, although IDECODE 210 will stall fetcher 257 by asserting HOLDIFET if it has not dispatched all the instructions from the first block. The function of the HOLDIFET signal is to hold the instruction fetch because the four instructions in instruction register 258 cannot advance.

Fetcher 257 also assists in the performance of branch prediction. The branch prediction is an output of instruction cache 205. When a branch is predicted, the four instructions of the next block which is predicted are output by instruction cache 205 onto instruction lines INS0, INS1, INS2 and INS3. An array IC_NXTBLK (not shown) in instruction cache 205 defines for each block in the cache what instructions are predicted executed in that particular block and also indicates what the next block is predicted to be. In the absence of a branch, execution would always be sequential block by block. Thus, branches that are taken are the only event which changes this block oriented branch prediction. In other words, in one embodiment of the invention, the sequential block by block prediction changes only when a branch predicted not taken is taken and subsequently mispredicted.

The first time a block containing a branch instruction is sent to decoder 210 (IDECODE), subsequent fetching is sequential, assuming the branch will not be taken. When the branch is executed and some time later turns out to actually be taken, branch prediction unit (branch unit) 520 notifies ICACHE 205, which updates the prediction information for that block to reflect 1) the branch was taken, 2) the location within the block of the branch instruction and 3) the location in the cache of the target instruction. Fetcher 257 is also redirected to begin fetching at the target. The next time that block is fetched, fetcher 257 notes that it contains a branch that was previously taken and does a nonsequential fetch with the following actions: 1) instruction valid bits are set only up to and including the branch's delay slot; Branch delay is a concept of always executing the instruction after a branch and is also referred to as delayed branching. This instruction is already prefetched in a scalar RISC pipeline, so that in the event of a branch there is no overhead lost in executing it. 2) an indication that the branch was predicted taken is sent along with the block to decoder 210; 3) the cache index for the next fetch is taken from the prediction information; (The cache index is the position within the cache for the next block that is predicted executed when a branch occurs. Note that the cache index is not the absolute PC. Rather, the absolute PC is formed by concatenating the TAG at that position with the cache index.) 4) the block at this cache index is fetched and a predicted target address is formed from the block's tag and the prediction information is placed in the Branch FIFO (BRN FIFO) 261; 5) valid bits for this next block are set starting with the predicted target instruction.

The Branch FIFO 261 is used to communicate the target address predicted by fetcher 257 to the branch functional unit (BNRSEC) 550. It is noted that, although shown separately, the Branch FIFO 261 is considered to be a part of branching section BRNSEC 550. Branch FIFO 261 is loaded with the PC of the instruction where the branch was predicted taken as well as the target. When the branch instruction is actually dispatched, the branch instruction is compared to the entry in the Branch FIFO, namely the PC stored therein. If there is a match, then the entry is flushed from the Branch FIFO and the branch instruction is returned to reorder buffer 240 as predicted successfully. If there is a misprediction, then the PC that is correct is provided to reorder buffer 240.

The prediction bit is dispatched by decoder 210 along with the branch instruction to branch unit 520. The prediction bit indicates whether a particular branch was predicted taken from the information stored in the IC_NXTBLK array.

When branch unit 520 executes the instruction, the outcome is compared with the prediction and, if taken, the actual target address is compared with the entry at the top of the Branch FIFO (waiting if necessary for it to appear). If either check fails, branch unit 520 redirects fetcher 257 to the proper target address and updates the prediction. Note that this is how a cache miss is detected for a predicted non-sequential fetch, rather than by fetcher 257. The prediction information contains only a cache index, not a full address, so the tag of the target block cannot be checked for a hit; the target address is assumed to be the address of the block at that index as specified by its tag. If the actual target block has been replaced since the branch was last executed, this will result in a miscompare and correction upon execution. When a misprediction does occur, many instructions past the branch may have been executed, not just its delay slot.

One branch prediction unit which can be used as branch prediction unit 520 is described in U.S. Pat. No. 5,136,697, W. M. Johnson, entitled "System For Reducing Delay For Execution Subsequent To Correctly Predicted Branch Instruction Using Fetch Information Stored With Each Block of Instructions In Cache, issued Aug. 4, 1992, the disclosure of which is incorporated herein by reference.

III (B) Instruction Flow—Decode, Register File Read, Dispatch

The instructions advance to IDECODE 210 one block at a time and occupy specific locations in instruction register 258 corresponding to their positions in the memory block (0=earliest in sequence). Accompanying each instruction is its predecode information and a valid bit.

The primary function of IDECODE 210 is to classify instructions according to the functional units that will handle the instructions and dispatch the instructions to those functional units. This is done by broadcasting four 3-bit instruction type codes (INSTYPn) to all the functional units, and in any given cycle asserting a signal for each instruction that is being dispatched (XINSDISP(3:0)). (In this document, some signals appear with and without the X designation. The X, such as in the XINSDISP signal, indicates that a false assertion discharges the bus.) AS seen in FIG. 3, microprocessor 500 includes 4 TYPE buses, INSTYPn(7:0), for the purpose of broadcasting the type codes to the functional units. A respective TYPE bus is provided for each of the four instructions of a particular block of instructions.

When a particular functional unit detects a TYPE signal corresponding to its type, that functional unit knows which one of the four instructions of the current block of instructions in the current dispatch window of IDECODE 210 it is to receive because of the position of the detected type signal on the type bus. The type bus has four sections corresponding to respective dispatch positions of the IDECODE 210. That functional unit also determines which function it is to perform on the operand data of that instruction by the operation code (opcode) occurring on that section of the dispatch information bus corresponding to the detected type. Also, since the functional unit knows which instruction it is to execute, it will align its hardware with the respective destination tag bus, DEST. TAG(0:3), and operand data bus for receiving the operand data and the destination tag.

As instructions are dispatched, their valid bits are reset and their type becomes "null". All four instructions of a particular block must be dispatched before the next block of instructions is fetched. All four instructions of a block may be dispatched at once, but the following events can, and often do occur, to slow this process down: 1) Class conflict—this occurs when two or more instructions need the same functional unit. Integer codes are important for microprocessor 500. For this reason, one embodiment of the invention includes two ALUs to reduce the occurrence of class conflict among the functional units: ALU0, ALU1, SHFSEC, BRNSEC, LSSEC, FPTSEC and SRBSEC. Instructions are dispatched to SRBSEC 512 only at serialization points. In other words, only instructions which must be executed serially are sent to SRBSEC 512. 2) Functional unit unable to accept instructions. 3) Register file (RF) 235 ports not available—in this embodiment, there are only four RF read ports, not eight as one might expect for feeding eight operand buses. It has been found that having such a reduced number of read ports is not as limiting as it might first appear since many instructions do not require two operands from register file 235 or can be satisfied via operand forwarding by ROB 240. Other embodiments of the invention are contemplated wherein a greater number of RF read ports, such as eight, for example are employed to avoid a potential register file port not available situation. 4) Lack of space in reorder buffer 240—each instruction must have a corresponding reorder buffer entry (or as in the case of double and extended precision floating point instructions, two reorder buffer entries are provided), and the reorder buffer indicates through ROBSTAT(3:0) how many of the predicted instructions it can find a place for. As seen in FIG. 3A, a status bus designated ROBSTAT (3:0) is coupled between reorder buffer (ROB) 240 and decoder (IDECODE) 210. ROBSTAT (3:0) indicates from the ROB to IDECODE how many of the four current instructions have an ROB entry allocated. It is noted here that it is possible to fill up the entries of the ROB. 5) Serialization—some instructions modify state which is beyond the scope of the mechanisms that preserve sequential state—these instructions must be executed in program order with respect to surrounding instructions (for example, MTSR, MFSR, IRET instructions).

When one of the above listed five conditions occurs, the affected instruction stops dispatch; no subsequent instructions may be dispatched even though there may be nothing else holding them up. For each dispatch position there is a set of A and B operand buses (also referred to as XRDnAB/XRDnBB buses) that supply source operands to the functional units. Register file 235 is accessed at PH2 in parallel with decode and the operands are driven on these buses at PH1. If an instruction which will modify a source register is still in execution, the value in the Register File 235 is invalid. This means that Register File 235 and ROB 240 do not contain the data and therefore a tag is substituted for the data. Reorder buffer (ROB) 240 keeps track of this and is accessed in parallel with Register File access. Note that operand unavailability or register conflicts are of no concern for dispatch. ROB 240 can be viewed as a circular buffer with a predetermined number of entries and a head and tail pointer.

When an instruction is dispatched, an entry in the ROB is reserved for its destination register. Each entry in the ROB consists of: 1) the instruction's destination register address; 2) space for the instruction's result (which may require two entries for a double precision operation or a CALL/JMPFDEC type of instruction), as well as exception status information; and 3) bits to indicate that a) an entry has been allocated and b) a result has returned.

Entries are assigned sequentially beginning at the tail pointer. The Allocate bit is set to indicate the instruction has been dispatched. The Allocate bit is associated with each ROB entry. The Allocate bit indicates that a particular ROB entry has been allocated to a pending operation. The Allocate bit is deallocated when an entry retires or an exception occurs. A separate valid bit indicates whether a result has completed and has been written to the register file. The address of an entry (called the result or destination tag) accompanies the corresponding instruction from dispatch through execution and is returned to ROB 240 along with the instruction's result via one of the result buses.

In more detail, the destination tags are employed when an instruction is dispatched to a functional unit and the result tags are employed when the instruction returns, that is, when the result returns from the functional unit to the ROB. In other words, destination tags are associated with the dispatched instructions and are provided to the functional unit by the reorder buffer to inform the functional unit as to where the result of a particular instruction is to be stored.

In more detail, the destination tag associated with an instruction is stored in the functional unit and then forwarded on the result bus. Such destination tags are still designated as destination tags when they are transmitted on the result bus. These tags are compared with operand tags in the reservation stations of the other functional units to see if such other functional units need a particular result. The result from a particular functional unit is forwarded back to the corresponding relative speculative position in the ROB.

The result of an instruction is placed in the ROB entry identified by the instruction's destination tag which effectively becomes the result tag of that instruction. The valid bit of that particular ROB entry is then set. The results remain there until it is their turn for writeback to the register file. It is possible for entries to be allocated faster to ROB 240 than they are removed, in which case ROB 240 will eventually become full. The reorder buffer full condition is communicated via the ROBSTAT (3:0) bus back to decoder 210. In response, decoder 210 generates the HOLDIFET signal to halt instructions from being fetched from ICACHE 205. It is thus seen that the ROB full condition will stall dispatch by decoder 210.

Returning to a discussion of the handling of operands, it is noted that the results that are waiting in ROB 240 for writeback can be forwarded to other functional units if needed. This is done by comparing the source register addresses of instructions in IDECODE 210 with the destination register addresses in the ROB, in parallel with register file access at decode time. For the most recent address matches which occur for the A and B source operands and which have the result Valid bit set, ROB 240 drives the corresponding results on the appropriate operand buses in place of register file 235. When this match occurs, ROB 240 activates the OVERRIDE line between ROB 240 and register file 235 to instruct register file 235 not to drive any operands on the A and B operand buses.

For example, assume that decoder 210 is decoding the instruction ADD R3, R5, R7 which is defined to mean add the contents of register R3 to the contents of register R5 and place the results in register R7. In this instance, the source register addresses R3 and R5 decoded in IDECODE are compared with the destination register addresses in ROB 240. Assume for purposes of this example that the result R3 is contained in ROB 240 and that the result R5 is contained in register file 235. Under these circumstances, the compare between source address R3 in the decoded instruction and the destination register address R3 in ROB 240 would be positive. The result in the ROB entry for register R3 is retrieved from ROB 240 and is broadcast on the operand A bus for latching by the reservation station of the appropriate functional unit, namely ALU0 or ALU1. Since a match was found with an ROB entry in this case, the OVERRIDE line is driven to prevent register file 235 from driving the A operand bus with any retired R3 value it may contain.

In the present example, the compare between the source address R5 in the decoded instruction and the destination register addresses contained in ROB 240 is not successful. The result value R5 contained in register file 235 is thus driven onto the B operand bus where that result is broadcast to the functional units, namely ALU0 for execution. When both the A operand and B operand are present in a reservation station of the ALU0 functional unit, the instruction is issued to ALU0 and is executed by ALU0. The result (result operand) is placed on the result bus 265 for transmission to the reservation stations of other functional units which are looking for that result operand. The result operand is also provided to ROB 240 for storage therein at the entry allocated for that result.

Even if a desired operand value is not yet in ROB 240 (as indicated by an asserted Valid bit), the instruction can still be dispatched by decoder 210. In this case, ROB 240 sends the index of the matching entry (i.e. the result tag of the instruction that will eventually produce the result) to the functional unit in place of the operand. It is again noted that there are effectively eight A/B tag buses (ie. 4 A tag buses and 4 B tag buses, namely TAGnAB(4:0) and TAGnBB(4:0) wherein n is an integer) that correspond to the eight operand buses. The most significant bit (MSB) of a tag indicates when a tag is valid.

When more than one ROB entry has the same destination register tag, the most recent entry is used. This distinguishes between different uses of the same register as a destination by independent instructions, which otherwise would artificially decrease available parallelism. (This is known as a Write-after-Write hazard.)

The predecode information that is generated when caching instructions comes into play in decode. It is noted that the predecode information passes from ICACHE 205 to IDECODE 210 over the PREDECODE line.

Predecoding operates in the following fashion. For each instruction, there is a predecode signal, PREDECODE, which includes a 2 bit code that speeds up allocation of ROB entries by indicating how many entries are needed (some instructions require one entry, some instructions require two entries). For example, the add instruction ADD (RA+RB) →RC requires one entry for the single 32 bit result which is to be placed in register RC. It contrast, the multiply instruction DFMULT (RA+RB)(double precision) requires two ROB entries to hold the 64 bit result. In this particular embodiment of the invention, each ROB entry is 32 bits wide. This 2-bit code further indicates how many result operands will result from a given instruction (ie. none—e.g. branches, one—most, or two—double precision). The predecode information includes two additional bits which indicate whether or not a register file access is required for A and B operands. Thus, there are 4 bits of predecode information per 32 bit instruction in microprocessor 500. These bits enable efficient allocation of the register file ports in PH1 prior to the PH2 access. If an instruction is not allocated the register file ports that it needs, but ROB 240 indicates the operands can be forwarded, the instruction may still be dispatched anyway.

III (C) Instruction Flow—Functional Units, Reservation Stations

FIG. 3 shows that all of the functional units of microprocessor 500 reside on a common data processing bus 535.

Data processing bus 535 is a high speed bus due to its relatively wide bandwidth. Each of the functional units is equipped with two reservation stations at its input. Other embodiments of the invention are contemplated wherein a greater or lesser number of reservation stations are employed at the functional units.

To review, integer unit 515 includes arithmetic logic units ALU0 and ALU1. ALU0 is provided with reservation stations 540 and ALU1 is provided with reservation stations 545. Branching unit 520 (BRNSEC) is furnished with reservation stations 550 at its input. Floating point unit (FPTSEC) 525 includes floating point add unit 555 which is provided with reservation stations 560. Floating point unit 525 further includes a floating point convert unit 565 which is equipped with reservation stations 570. Floating point unit 525 also includes a floating point multiply unit 575 which is equipped with reservation stations 580. And finally, floating point unit 525 further includes a floating point divide unit 585 which is furnished with reservation stations 590 at its input. Load/store unit 530 also resides on data processing bus 535 and includes reservation stations 600.

As seen in FIG. 3, the main inputs to each functional unit (ie. to each reservation station associated with a functional unit) are provided by the constituent buses of main data processing bus 535, namely:

1) the four OPCODE buses from IDECODE 210 (designated INSOPn(7:0) wherein n is an integer from 0–3);

2) the four instruction type buses from IDECODE 210 (designated INSTYPn(7:0) wherein n is an integer from 0–3);

3) the four four-bit dispatch vector buses from IDECODE 210 (designated XINSDISP(3:0);

4) the four pairs of A operand buses and B operand buses (designated XRDnAB/XRDnBB(31:0)) wherein n is an integer from 0–3);

5) the four pairs of associated A/B tag buses (designated TAGnAB/TAGnBB(4:0) wherein n is an integer from 0–3);

6) a result bus 265 including 3 bidirectional result operand buses (designated XRES0B(31:0), XRES1B(31:0), XRES2B(31:0);

7) two result tag buses (designated XRESTAG0B/XRESTAG1B(2:0)) and 8) two result status buses (designated XRESSTAT0B and XRESSTAT1B(2:0)

One or more reservation stations are positioned in front of each of the above functional units. A reservation station is essentially a first-in-first-out (FIFO) buffer at which instructions are queued while waiting for execution by the functional unit. If an instruction is dispatched with a tag in place of an operand, or the functional unit is stalled or busy, the instruction is queued in the reservation station, with subsequent instructions queuing up behind it. (Note that issue within a particular functional unit is strictly in-order). If the reservation station fills up, a signal indicating this is asserted to IDECODE. This causes dispatch to stall if another instruction of the same type is encountered.

Instruction dispatch takes place as follows: Each reservation station includes reservation station logic that watches the instruction TYPE buses (at PH2) for a corresponding instruction type. The reservation station then selects the corresponding opcode, A and B operand and A and B operand tag buses when such an instruction type is encountered. If two or more instructions are seen that will execute in the associated functional unit, the earlier one with respect to program order takes precedence. The instruction is not accepted by the reservation station however until it sees the corresponding dispatch bit set (XINSDISP(n) at PH1).

At that point, if the required operands are available, and provided that the functional unit is not stalled for some reason or busy, and further provided that no previous instructions are waiting in the reservation station, the instruction will immediately go into execution in the same clock cycle. Otherwise, the instruction is placed in the reservation station. If an instruction has been dispatched with an operand tag in place of an operand, the reservation station logic compares the operand tag with result tags appearing on the result tag buses (XRESTAG0B and XRESTAG1B). If a match is seen, the result is taken from the corresponding result bus of result bus group 265. This result is then forwarded into the functional unit if it enables the instruction to issue. Otherwise, the result is placed in the reservation station as an operand where it helps complete the instruction and the corresponding tag valid bit is cleared. Note that both operands may be simultaneously forwarded from either or both of the general purpose result buses.

The three result buses forming result bus 265 include two general purpose result buses, XRES0B(31:0) and XRES1B(31:0), and further include one result bus dedicated to branches and stores, XRES2B(31:0). Since result bus XRES2B(31:0) is dedicated to branches and stores, the results that it handles (like the Branch PC address, for example) are not forwarded. The functional units monitor result buses XRES0B(31:0) and XRES1B(31:0) whereas reorder buffer (ROB) 240 monitors all three result buses.

As instructions wait in the reservation station, any valid operand tags are likewise compared with result tags and similar forwarding is done. Result forwarding between functional units and within a functional unit is done in this manner. This tagging, in conjunction with the reservation stations, allows instructions to execute out of order in different functional units while still maintaining proper sequencing of dependencies, and further prevents operand hazards from blocking execution of unrelated subsequent instructions. The instruction types and A/B tags are available in PH2 while the decision to issue is made in the subsequent PH1.

Operands in the reservation station have a tag and valid bit if they were not sent actual operand data. In other words, if an instruction is dispatched to the reservation station and a particular operand is not yet available, then an operand tag associated with that operand is instead provided to the reservation station in place of the actual operand. A valid bit is associated with each operand tag. As results are completed at the functional units the results are provided to the result buses which are coupled to the other functional units and to ROB 240. The results are compared against operand tags in the reservation stations and if a hit occurs, the tag valid bit is cleared and the operand from the result bus is forwarded to the location in the functional unit designated for operands. In other words, a tag compare on result tags 0 and 1 that matches any entry in a reservation station forwards the value into that station.

Determining which instruction source (the reservation station or one of the four incoming buses coupled to the reservation station) is the next candidate for local decoding and issue is done in PH2 by examining the Reservation Station Valid bit for the entry at the head of the reservation station and the decoded/prioritized instruction type buses; an entry in the reservation station takes precedence. In a functional unit with two reservation stations, the two reservation stations form a first-in-first-out (FIFO) arrangement wherein the first instruction dispatched to the reservation station forms the head of the FIFO and the last instruction dispatched to the FIFO forms the tail of the FIFO.

Local decoding by the functional unit means that by monitoring the type bus the functional unit first determines that an instruction of its type is being dispatched. Then once the functional unit identifies an instruction which it should process, the functional unit examines the corresponding opcode on the opcode bus to determine the precise instruction which the functional unit should execute.

In this embodiment of the invention, execution time depends on the particular instruction type and the functional unit which is executing that instruction. More particularly, execution time ranges from one cycle for all ALU, shifter, branch operations and load/stores that hit in the cache, to several cycles for floating point, load/store misses and special register operations. A special register is defined as any not general purpose register which is not renamed.

The functional units arbitrate for the result buses as follows: Result Bus 2 is used for stores which don't return an operand and also for branches which return the calculated target address. It is noted that branches have priority. General purpose Result Buses 0 and 1 handle results from either ALU0 or ALU1, from shifter unit 510, from floating point unit 525, and also loads and special register accesses.

Figure 4:
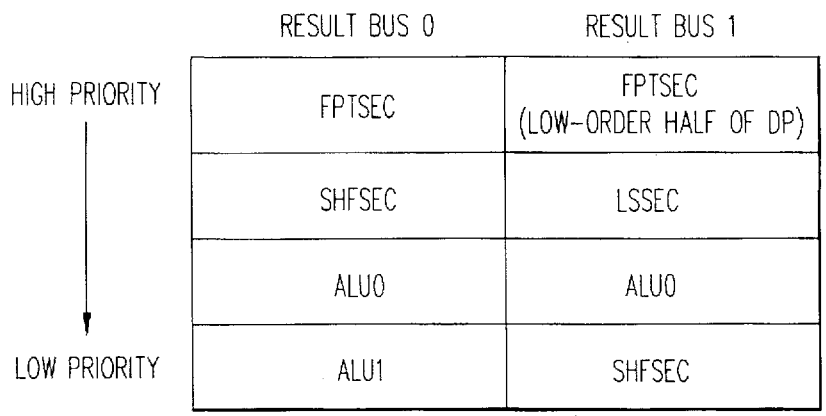
FIG. 4 is a chart representing the priority which functional units receive when arbitrating for result buses.

The priority among the functional units with respect to obtaining access to Result Bus 0 (also designated XRES0B (31:0) and Result Bus 1 (also designated XRES1B(31:0) is set forth in FIG. 4. In the chart of FIG. 4, the term "low-order half of DP" means the lower half of a double precision number. Microprocessor 500 employs 32 bit operand buses to send a double precision (DP) number. More particularly, when a double precision number is transmitted over the operand buses, the number is transmitted in two 32 bit portions, namely an upper 32 bit portion and a lower 32 bit portion. The upper and lower portions are generally transmitted over two cycles and 2 operand buses. The denial of a request for access to a particular result bus by a functional unit will stall that functional unit and may propagate back to decode as a reservation station full condition.

Results include a 3-bit status code (RESULT STATUS) indicating the type of result (none, normal or exception, plus instruction specific codes, namely data cache miss, assert trap and branch misprediction). In one embodiment, a result also includes a 32-bit result operand and detailed execution or exception status depending on the unit and instruction. The result buses 235 are used to return results to ROB 240 as well as for forwarding results to the functional unit reservation stations. All of the result information is stored in ROB 240, but functional units only look at the result status code and result operand.

Most functional units operate in the manner described above. However, the Special Register Block Section (SRBSEC) 512 and Load/Store Section (LSSEC) 530 are somewhat different. The SRBSEC functional unit keeps machine state information such as status and control registers which are infrequently updated and which are not supported by register renaming. Moves to and from the special registers of SRBSEC 512 are always serialized with respect to surrounding instructions. Thus, the SRBSEC, while being a separate functional unit, does not need a reservation station since serialization assures that operands are always available from register file 235. Examples of instructions which are executed by the SRBSEC functional unit are the "move to special register" MTSR and "move from special register" MFSR instructions. Before executing such an instruction which requires serialization, microprocessor 500 serializes or executes all speculative states before this instruction. The same special register block as employed in the AM29000 microprocessor manufacturing by Advanced Micro Devices may be employed as SRBSEC 512.

The load/store section LSSEC 530 uses a reservation station in the same manner as the other functional units. Load/store section 530 controls the loading of data from data cache 245 and the storing of data in data cache 245. However, with respect to execution of instructions, it is the most complex functional unit. The LSSEC is closely coupled with the data cache (DCACHE) 245 and memory management unit (MMU) 247. Microprocessor 500 is designed such that any action that modifies data cache 245 or main memory 255 may not be undone. Moreover, such modification must take place in program order with respect to surrounding instructions. This means that the execution of loads that miss in the data cache, and all stores, must be coordinated with retire logic 242 in the ROB 240. This is done using a mechanism called the Access Buffer 605, which is a FIFO where these operations are queued until the corresponding ROB entries are encountered by the ROB retire logic.

One data cache which can be employed as data cache (DCACHE) 245 and one load/store section which can be employed as load/store section (LSSEC) 530 is described in the U.S. patent application entitled "High Performance Load/Store Functional Unit And Data Cache" (Attorney Docket No. M2281), filed concurrently herewith and assigned to the instant assignee, the disclosure of which is incorporated herein by reference. More information with respect to addressing of instruction caches and data caches is provided in the copending U.S. patent application entitled "Linearly Addressable Microprocessor Cache" (Attorney Docket No. M-2412), filed concurrently herewith and assigned to the instant assignee, the disclosure of which is incorporated herein by reference.

Access buffer 605 is located in LSSEC 530. In one embodiment, access buffer 605 is a 2–4 word FIFO of stores (hit/miss) or loads that miss. A store that hits cannot be written until it is next to execute. However, an access or store buffer allows this state to be held in a temporary storage which can subsequently forward data references in a manner similar to the way the ROB forwards register references. The access buffer finally writes to data cache 245 (CACHE) when the access buffer contents are next in program order. In other words, an access buffer or store buffer is a FIFO buffer which stores one or more load/store instructions so that other load/store instruction can continue to be processed. For example, access buffer 605 can hold a store while a subsequent load is being executed by load/store unit LSSEC 530.

Access buffers, which are also known as store buffers, and a load/store functional unit used in conjunction with a data cache are discussed in more detail in copending patent application entitled High Performance Load/Store Functional Unit And Data Cache, filed concurrently herewith and assigned to the instant assignee, the disclosure of which is incorporated herein by reference.

The function of ROB retire logic 242 is to determine which instructions are to be retired into register file 235 from ROB 240. The criteria for such retirement of an ROB entry are that the entry be valid and allocated, that the result has been returned from a functional unit, and that the entry has not been marked with a misprediction or exception event.

A store operation requires two operands, namely,memory address and data. When a store is issued, it is transferred from the LSSEC reservation station 600 to the Access Buffer 605 and a store result status is returned to ROB 240. The store may be issued even though the data is not yet available, although the address must be there. In that case, the Access Buffer will pick up the store data from result buses 235 using the tag in a manner similar to a reservation station. As the store is issued, the translation lookaside buffer (TLB) 615 lookup is done in memory management unit (MMU) 247 and the Data Cache is accessed to check for a hit.

The physical address from the MMU and the page portion of the virtual address along with status info from the data cache is placed in the Access Buffer. In other words, the cache is physically addressed. If a TLB miss occurs, this is reflected in the result status and an appropriate trap vector is driven on Result Bus 2—no other action is taken at that time. (The TLB lookup for loads is done the same way, although any trap vector goes on Result Bus 1.) A trap vector is an exception. Microprocessor 500 takes a TLB trap to load a new page into physical memory and update the TLB. This action may take several hundred cycles but it is a relatively infrequent event. Microprocessor 500 freezes the PC, stores out the microprocessor registers, executes the vector, restores the register state, then executes an interrupt return.

When the Store reaches the head of the Access Buffer (which will be immediately if it's empty) it waits for ROB 240 to assert a signal designated LSRETIRE which indicates that the corresponding ROB entry has reached the retire stage; it then proceeds with the cache access. The access may be delayed however if the cache is busy completing a previous refill or doing a coherency operation. Meanwhile, ROB 240 will carry on and may encounter another store instruction. To keep that store instruction from being retired before LSSEC is ready to complete it, handshaking is employed as follows. LSSEC 530 provides ROB 240 with a signal indicating when LSSEC has completed an operation by asserting LSDONE. It is noted that ROB 240 stalls on a store (or load) if it has not seen LSDONE since the previous store was retired.

A load operation that hits in data cache 245 does not have to be coordinated with ROB 240. However, a miss must be coordinated with ROB 240 to avoid unnecessary refills and invalid external references past a mispredicted branch. When a load is issued, the cache access is done right away (provided the cache is not busy). If there is a hit in the cache, the result is returned to the ROB on the Result Bus with a normal status code. If there is a miss, the load is placed in the Access Buffer 605 and a load_miss result code is returned. When the ROB 240 retire logic 242 encounters this condition, it asserts LSRETIRE and the refill starts with the desired word being placed on the Result Bus with a load_valid result status code as soon as it comes along (no wait for refill to finish). It is noted that ROB 240 can't retire a load upon asserting LSRETIRE like it does for a store. Rather, ROB 240 must wait for the data to return.

A load may be processed even if there are previous uncompleted store operations waiting in the Access Buffer. When allowing a load to be done out-of-order with respect to stores, microprocessor 500 ensures that the load is not done from a location that is yet to be modified by a previous (with respect to program order) store. This is done by comparing the load address with any store addresses in Access Buffer 605, in parallel with the cache access. If none match, the load goes ahead. If one does match (the most recent entry if more than one), then the store data is forwarded from Access Buffer 605 to the result bus 265 instead of the cache data. Any cache miss that may have occurred is ignored (ie. no refill occurs). If the store data is not yet present, the load stalls until the store data arrives. Moreover, these actions desirably prevent memory accesses from unnecessarily inhibiting parallelism.

Additional load/store considerations are now discussed. For 1K byte and 2K byte page sizes, the translation lookaside buffer (TLB) lookup is done prior to the cache access. This causes an additional cycle of load/store latency. It is also noted that when LSSEC "completes" a load or store, this does not mean the associated cache activity is completed. Rather, there may still be activity in either the ICACHE or DCACHE, the BIU, and externally, such as a refill.

Access Buffer forwarding is not done for partial-word load/store operations. If a word-address match is detected and there is any overlap between the load and store, the load is forced to look like a cache miss and is queued in access buffer 605 so that it will execute after the store (and may or may not actually hit in the cache). If there is no overlap, the load proceeds as though there were no address match.

It is noted that load/store multiple instructions are executed in serialized fashion, that is, when load/store multiple operation are being executed, no other instructions are executed in parallel. A load or store (load/store) multiple instruction is a block move to or from the register file. This instruction includes a given address, a given register, and a count field. An example of a load/store multiple instruction is LOADM (C,A,B) wherein C is the destination register, A is the address register and B is the number of transfers.

It is also noted that loads misses don't necessarily cause a refill. Rather, the page may be marked as uncachable, or the load may have been satisfied from access buffer.

III (D) Instruction Flow—Reorder Buffer and Instruction Retiring

As results are returned to ROB 240, they are written into the entry specified by the result tag, which will be somewhere between the head and tail pointers of the ROB. The retire logic 242, which controls writeback, the execution of stores and load misses, traps and updating of PC0, PC1 and PC2, looks at entries with valid results in program order.

PC0, PC1 and PC2 are mapped registers containing the PC values of DEC, EXEC and WRITEBACK0,1. The signal DEC, EXEC and WRITEBACK 0,1 refer to the stages decode, execute and writeback from the scalar AM29000 pipeline, the AMD2900 being a microprocessor available from Advanced Micro Devices, Inc. These signals are used to restart the pipeline upon an exception. More than one PC is used because of delayed branching. PC0, PC1 and PC2 are used on an interrupt or trap to hold the old value of DEC, EXEC and WRITEBACK0,1 to which microprocessor 500 can return upon encountering a branch misprediction or exception. PC0, PC1 and PC2 are used on interrupt return for restarting the pipeline, and are contained in retirement logic 242 in reorder buffer 240. PC1 maps the current retire PC.

As entries with normal results are encountered, the result operands (if any) are written to the register file (RF) 235 locations specified in the entries. There are two RF write ports (WR), so two result operands may be retired to the register file at the same time. ROB 240 can additionally retire one store and one branch, for a maximum of four instructions being retireable per microprocessor cycle.

Other states such as CPS bits and FPS Sticky bits may also be updated at this time. CPS refers to the current processor status, CPS indicates program state and condition code registers. FPS refers to floating point status register bits. FPS indicates status/condition code registers for the floating point functional unit 525. FPS Sticky Bits are bits that can be set by a set condition and not cleared on clear condition. FPS Sticky Bits are used for rounding control on floating point numbers. For example, if microprocessor 500 subtracts or shifts a value, some of the least significant bits (LSB's) may be shifted off the mantissa. The FPS Sticky Bits give an indication that this condition has occurred.

An entry in ROB 240 whose results have not yet returned causes further processing to stall until the results come back. Nothing past that entry may be retired, even if valid. When a store result is encountered, ROB 240 gives the go-ahead to the load/store section to actually do the store and then retires the instruction. When a load miss result is encountered, ROB 240 gives the go-ahead to execute the load. When the load completes, the requested load operand is returned to ROB 240 with load hit status, which allows the instruction to be retired and which is also seen by any reservation stations waiting for that operand. When a branch result is encountered, ROB 240 uses it to update PC1

The architectural state of the microprocessor is the current state of the retirement PC in the program. The speculative state of the microprocessor is all of the entries in the reorder buffer, in the decoder and the current value of the FETCHPC. These form the current speculative queue of instructions which is dynamically updated. On exception or misprediction, all of the speculative state can be cleared, but not the architectural state, since it is the current state of the register file.

Earlier it was mentioned that instructions beyond a mispredicted branch's delay slot may be executed before the misprediction is apparent. This occurrence is sorted out by ROB 240. When a misprediction is detected, any undispatched instructions are cleared and fetcher 257 is redirected. None of the functional units are notified of the misprediction (the branch unit 520 does however set "cancel" bits in any valid entries in its own reservation station 550 so that those branches execute harmlessly and return to ROB 240 without causing mispredictions.)

When such a misprediction occurs, the corresponding entry in the ROB is allocated as being mispredicted. When the subsequent entries are forwarded from the functional unit, they are marked as completed but mispredicted. The retire logic 242 in reorder buffer 240 ignores these entries and de-allocates them.

At the same time, the branch result status, which indicates taken/not-taken and correct/incorrect prediction, is returned to ROB 240. A mispredict result causes the ROB to immediately set a Cancel bit in all entries from the second one after the branch entry (to account for the delay slot) to the tail pointer. In the second cycle following this occurrence, decode will begin dispatching the target instructions, which are assigned tags as usual starting from the tail pointer. When the cancelled entries are encountered by ROB retire logic 242, they are discarded. Load/store unit 530 is notified of any cancellations for which it is waiting on a go-ahead from the ROB via an LSCANCEL signal which is transmitted on an LSCANCEL line between ROB 240 and load/store section LSSEC 530. The LSCANCEL signal indicates any pending store or load miss in access buffer 605 which is to be cancelled. Access buffer 605 behaves as a FIFO and the next oldest store is the instruction which is cancelled. More detail with respect to one load/store section and access buffer which may be employed as load/store section LSSEC 530 and access buffer (store buffer) 605 is found in the copending patent application entitled "High Performance Load/Store Functional Unit And Data Cache" (Attorney Docket No.M-2281), the disclosure of which is incorporated herein by reference.

When an exception occurs in the execution of a particular instruction, no global action is required. Rather, the exception status is merely reflected in the result status returned to ROB 240. The appropriate trap vector number is generally returned in place of the normal result operand (except in cases where the RF update is not inhibited, in which case the ROB generates the vector number). The trap vector number is the number that indicates which of the may kinds of traps has occurred and where to go upon the occurrence of a particular trap. Typical examples which result in the occurrence of a trap are a divide by zero, arithmetic overflow and a missing TLB page. When ROB 240 encounters the exception status in the process of retiring instructions, it initiates a trap operation which consists of clearing all entries from ROB 240, asserting an EXCEPTION signal to all functional units to clear them (and IDECODE), generating a trap vector per the Vf bit and redirecting the fetcher 257 to trap handling code. The Vf bit indicates whether a trap should be taken as an external fetch (as a load from a table of vectors) or internally generated by concatenating a constant with the vector number. The Vf bit is a feature of the architecture of the Advanced Micro Devices Am29000 microprocessor series.

It is noted that the data stored in register file 235 represents the current execution state of the microprocessor. However, the data stored in ROB 240 represents the predicted execution state of the microprocessor. When an instruction is to be retired, the corresponding result stored in ROB 240 is transmitted to register file 235 and is then retired.

III (E). Instruction Flow Timing

To illustrate the operation of superscalar microprocessor 500 in terms of instruction flow timing, Table 2 is provided below. Table 2 depicts the pipeline stages of microprocessor 500 together with significant events which occur during each of those stages. The stages of the pipeline are listed below in the first column of Table 2.

TABLE 2

| 1)Fetch | PH1 | Instruction fetch address is formed (Fetch PC (FPC)). |
| | PH2 | ICACHE is accessed. |
| 2)Decode | PH1 | Instruction block is driven to decode on XInB; Register File ports are assigned and Stack Pointer addition is performed. |
| | PH2 | Instructions are classified and dispatching is set up; Opcodes, types and operand tags are broadcast to units; Register File is accessed; RA/RB fields checked against ROB contents. |
| 3)Execute | PH1 | A/B operand buses are driven by RF/ROB, or operands may by picked off a result bus, dispatch bits (XINDISP) are asserted; instruction issues or is placed in reservation station; result bus requested. |
| | PH2 | Instruction executes; functional unit signals its reservation station's full/empty status to dispatch; [branch misprediction determined (late PH2)]. |
| 4)Result Forward | PH1 | Result buses granted to functional units, result driven on result bus to ROB (and is available for result bus forwarding to any unit); [Fetch PC (FPC) updated with correct target PC.] |
| | PH2 | ROB examines entry for retiring; [cache access for branch target]. |
| 5)Write-back | PH1 | Result is driven to Register File and written back; PC1 updated [branch target block driven to decode]. |
| | PH2 | [branch target block at decode] |

Table 2 shows what happens in each phase (PH1 and PH2 of each microprocessor cycle) as a basic integer instruction flows through microprocessor 500 with no stalls, as well as branch correction timing (in brackets).

III (F). Memory Management Unit, Data Cache and Bus Interface Unit

Memory Management Unit (MMU) 247 is essentially the same as in the AM29050 microprocessor manufactured by Advanced Micro Devices, Inc. MMU 247 translates virtual addresses to physical addresses for instruction fetch as well as for data access. A difference with respect to instruction fetch between the AM29050 and microprocessor 500 is that in the AM29050 the MMU is consulted on a reference to the branch target cache BTC whereas microprocessor 500 does not employ a branch target cache and does not consult the MMU for a BTC reference. The branch target cache is a cache of branch targets only. The branch target cache forms part of the scalar pipeline of the Am29050 microprocessor manufactured by Advanced Micro Devices. The BTC fetches instructions once per clock cycle.

To further reduce the demand on MMU 247 for instruction fetch address translations, ICACHE 205 contains a one-entry translation lookaside buffer (TLB) 615 to which ICACHE refers on cache misses. The TLB is refilled when a translation is required that does not hit in the one entry TLB. Thus, TLB 615 is refilled as needed from the MMU. Since MMU 247 is not closely coupled to ICACHE 205, this reduces refill time and also desirably reduces the load on the MMU.

Data cache 245 is organized as a physically-addressed, 2 way set associative 8K cache. In this embodiment, for page sizes less than 4K, the address translation is done first. This requirement is true for 1K and 2K page sizes, and increases the latency of loads that hit to two cycles. However, 4K page sizes, which have one bit of uncertainty in the cache index, are handled by splitting the cache into two 4K arrays which allows access to both possible blocks. A 4-way compare is done between the two cache tags and the two physical addresses from the MMU to select the right one.

Data cache 245 implements a mixed copyback/writethrough policy. More particularly, write misses are done as writethrough, with no allocation; write hits occur only on blocks previously allocated by a load, and may cause a writethrough, depending on cache coherency. Microprocessor 500 supports data cache coherency for multiprocessor systems and efficient I/O of cacheable memory using the known MOESI—Modified Owned Exclusive shared Invalid (Futurebus) protocol. The MOESI protocol indicates 1 of 5 states of a particular cache block. Whereas microprocessor 500 of FIG. 3 employs the MOESI protocol, the later discussed microprocessor of FIG. 6 employs the similar MESI protocol.

Bus interface unit (BIU) 260 employs the same external interface as the AMD29030 microprocessor manufactured by Advanced Micro Devices, Inc. In addition, BIU 260 employs a single internal 32 bit bus for addresses, instructions, and data, namely internal address data (IAD) bus 250.

In this particular embodiment, main memory 255, alternatively referred to as external memory, is a single flat space with only a distinction between I/O and data/instruction. In the particular embodiment shown, memory 255 includes no read only memory (ROM) and exhibits no distinction between instructions and data. Other types of external memory arrangements may alternatively be employed as main memory 255.

As seen in FIG. 3, BIU 260, ICACHE 205, DCACHE 245, MMU 247 and SRBSEC 512 are all tied together by the 32-bit IAD bus 250. IAD bus 250 is used mainly for communication between the BIU 260 and the caches (ICACHE 205, DCACHE 245), for external accesses on cache misses and coherency operations. IAD bus 250 handles both addresses and data. It is a static bus, with BIU 260 driving during PH1 and all other units driving during PH2. Any request for the IAD bus 250 must go through bus arbitration and granting which is provided by bus arbitration block 700 shown in FIG. 5. To conserve space, bus arbitration block 700 is not shown in the block diagram of microprocessor 500 of FIG. 3.

Arbitration for the IAD bus includes bus watching (for cache coherency) which gets first priority in the arbitration activities. A request for the IAD bus is made during early PH1 and is responded to in very late PH1. If a functional unit is granted the IAD bus in PH1, it may drive an address onto the IAD bus during the following PH2 and request some action by the BIU (for example, instruction fetch, load)

IAD bus 250 is a relatively low frequency address, data and control bus that links all the major arrays in microprocessor 500 to each other and the external bus. IAD bus 250 provides relatively low frequency transfers of operations such as bus watching, cache refill, MMU translations and special register updates to mapped arrays. In one embodiment of the invention, IAD bus 250 includes 32 bits onto which address and data are multiplexed. IAD 250 bus 250 also includes 12 control lines, namely a read control line and a write control line for each of the blocks coupled thereto, namely for ICACHE, DCACHE, the TLB, the SRBSEC, the LSSEC and the BIU.

Figure 5:
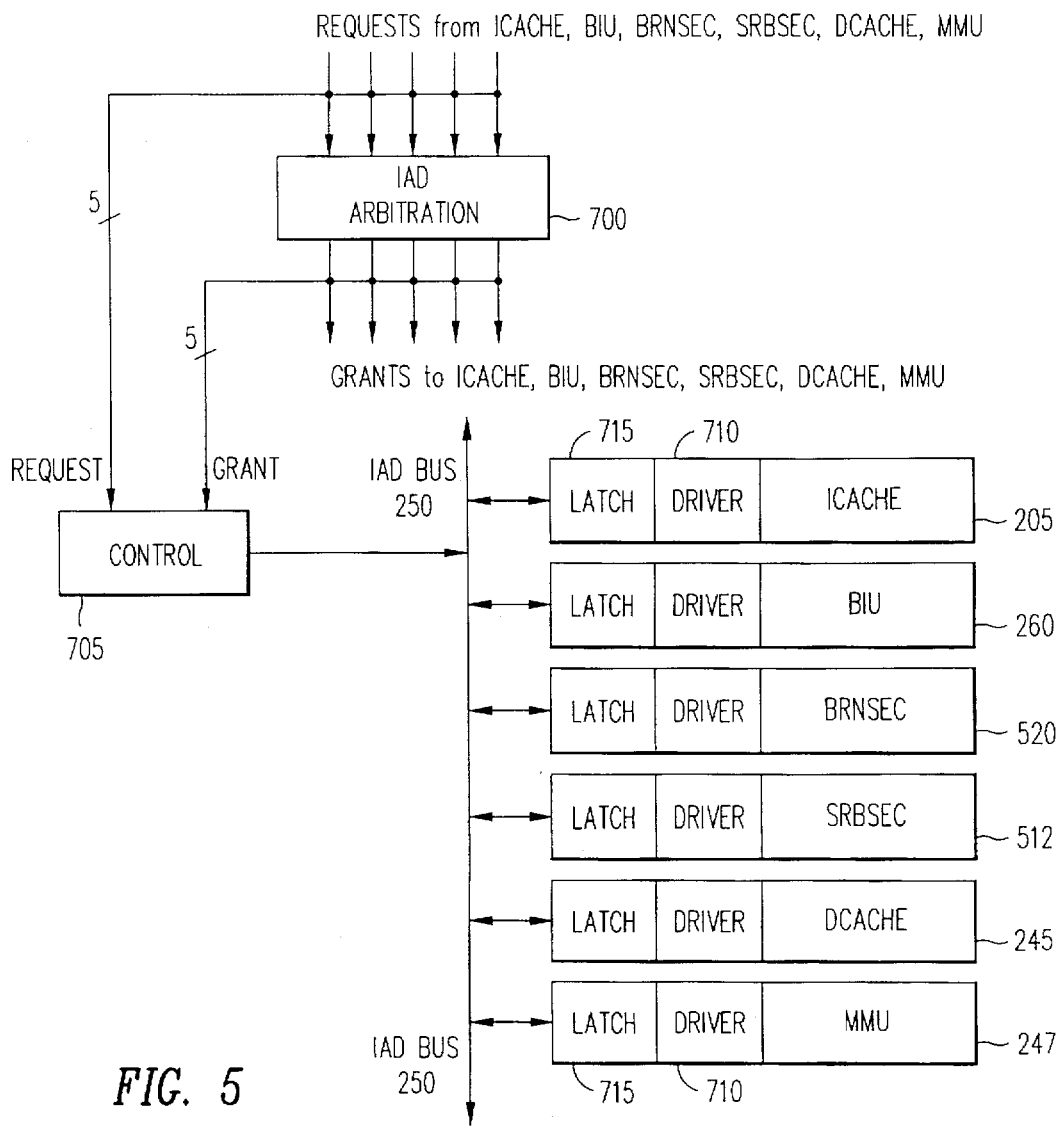
FIG. 5 is a block diagram of the internal address data bus arbitration arrangement in the microprocessor of the invention.

The IAD arbitration block 700 shown in FIG. 5 employs a request/grant protocol to determine which component (ICACHE 205, BIU 260, BRNSEC 520, DCACHE 245, SRBSEC 512 or MMU 247) is granted access to IAD bus 250 at any particular time. The external memory 255 via BIU 260 is granted the highest priority for bus watching purposes. Bus watching is part of data consistency protocol for microprocessor 500. Since microprocessor 500 can include modified data which can be held locally in the data cache, such data is updated when writes to memory occur. Microprocessor 500 also provides the modified data if a read occurs to a modified block which is locally held in the data cache. A copy back scheme with bus watching is employed in the caching operation of microprocessor 500.

As seen in FIG. 5, a respective request line is coupled between IAD arbitration block 700 and each of ICACHE 205, BIU 260, BRNSEC 520, DCACHE 245, SRBSEC 512 or MMU 247. Each of these request lines is coupled to control logic 705, the output of which is coupled to driver 710. IAD arbitration block 700 includes a respective grant line for each of ICACHE 205, BIU 260, BRNSEC 520, DCACHE 245, SRBSEC 512 or MMU 247. When a particular component desires access to IAD bus 250, that component transmits a request signal to IAD arbitration block 700 and to control 705. For example, assume that BIU 260 desires to gain access to IAD bus 250 to perform a memory access. In that case, BIU 260 transmits an IAD bus access request to IAD arbitration block 700 and control 705. IAD arbitration block 700 determines the priority of requests when multiple requests for access to IAD bus 250 are present at the same time. Arbitration block 700 then issues a grant on the grant line of the particular device which it has decided should be granted access to the IAD bus according the priority scheme. In the present example, a grant signal is issued on the BIU grant line and, BIU 260 then proceeds to access IAD bus 250.

The output of control circuit 705 is coupled to IAD bus 250. Each of the following components ICACHE 205, BIU 260, BRNSEC 520, SRBSEC 512, DCACHE 245 and MMU 247 are equipped with a driver circuit 710 to enable such components to drive IAD bus 250. Each of these components is further equipped with a latch 715 to enable these components to latch values from IAD bus 250. Control circuit 705 provides the request grant protocol for the IAD bus. A functional unit locally realizes that access to the IAD bus is desired and sends a request to arbitration block 700. Arbitration block 700 takes the highest priority request and grants access accordingly. Latch 715 signifies the read of the requested data if a transfer is occurring to this block. Driver 710 signifies the driving of the locally available value, to drive some other position where another block will read it. Going through this bus arbitration to gain access to IAD bus 250 adds some latency, but has been found to nevertheless provide acceptable performance. Providing microprocessor 500 with IAD bus 250 is significantly more cost effective than providing dedicated paths among all the sections listed above which are connected to the IAD bus.

Figure 5A:
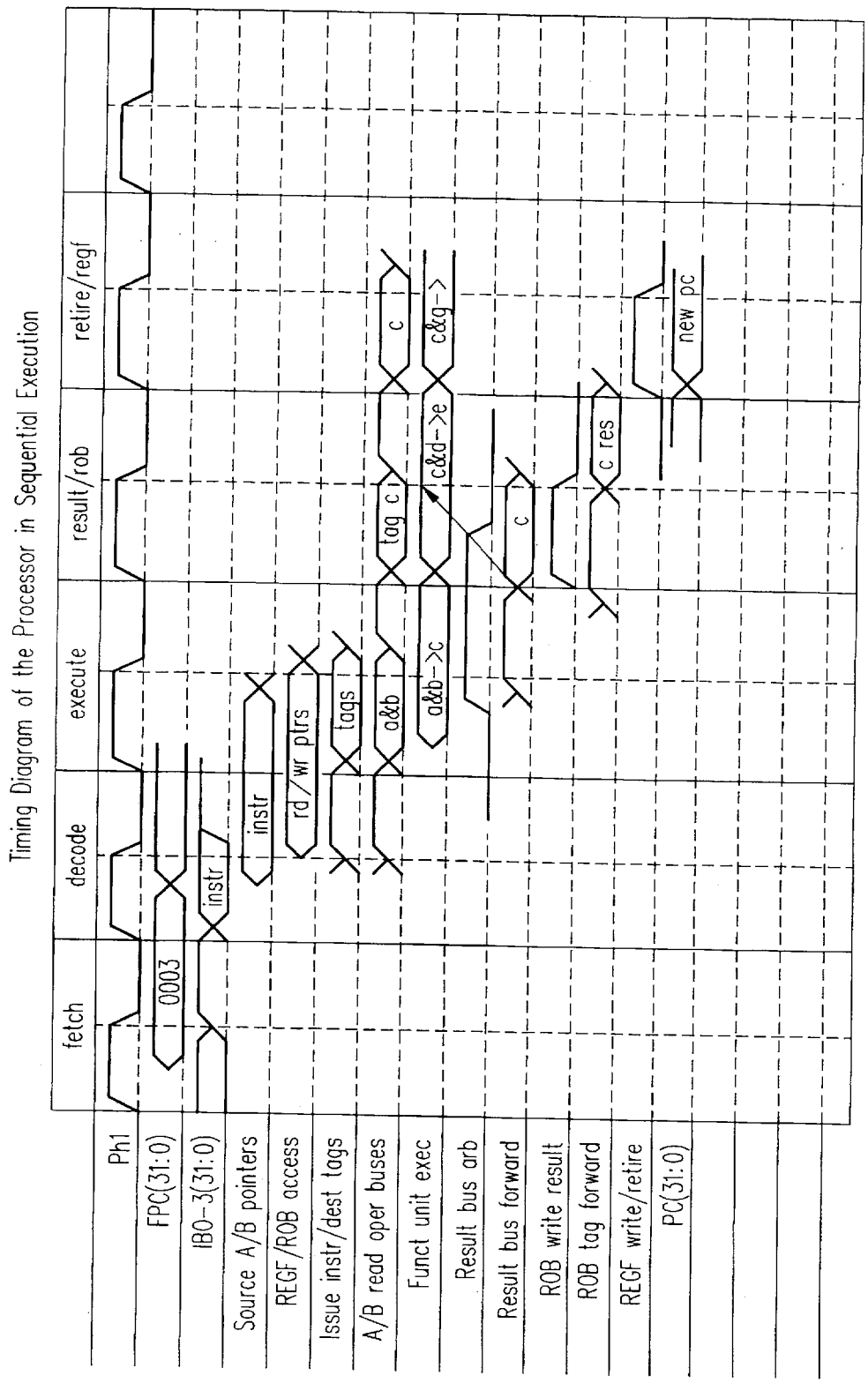
FIG. 5A is a timing diagram of the operation of the microprocessor of FIG. 3 throughout the multiple stages of the pipeline thereof during sequential processing.

FIG. 5A is a timing diagram illustrating the status of selected signals in microprocessor 500 throughout the multiple stages of the pipeline thereof. FIG. 5A shows such pipeline for sequential processing. In contrast, the timing diagram of FIG. 5B shows a similar timing diagram for microprocessor 500 except that the timing diagram of FIG. 5B is directed to the case where a branch misprediction and recovery occurs.

Figure 5B:
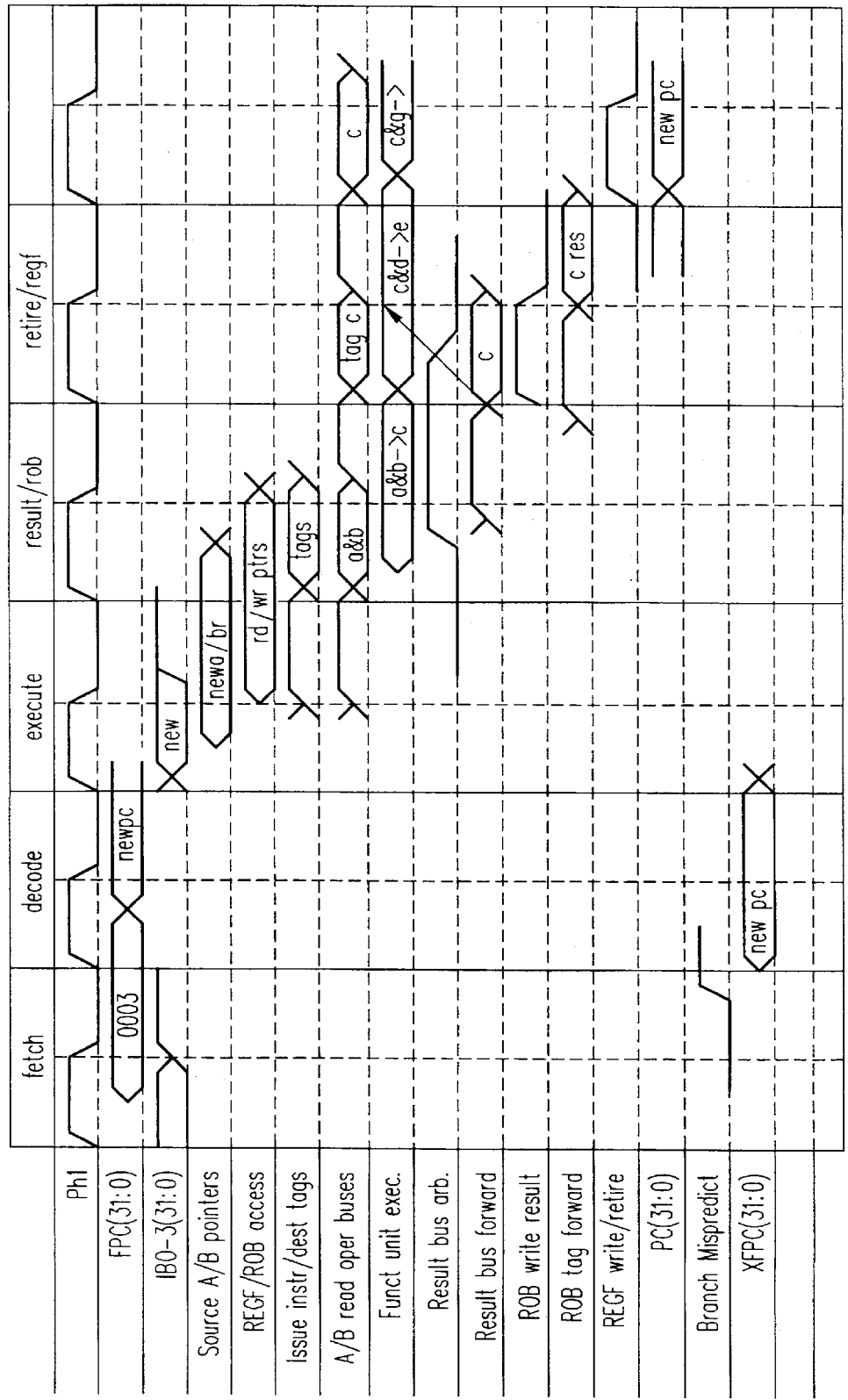
FIG. 5B is a timing diagram similar to the timing diagram of FIG. 5A but directed to the case where a branch misprediction and recovery occurs.

More specifically, FIG. 5A and 5B depict the operation of microprocessor 500 throughout the five effective pipeline stages of fetch, decode, execute, result/ROB (result forward —result forwarded to the ROB), retire/register file (writeback—operand retired from the ROB to the register file). The five stages of the microprocessor pipeline are listed horizontally at the top of these timing diagrams. The signals which compose these timing diagrams are listed vertically at the left of the diagrams and are listed as follows: The Ph1 signal is the clocking signal for microprocessor 500. FPC (31:0) is the fetch PC bus (FPC). IR0-3 (31:0) represent the instruction buses. The timing diagrams also shows the source A/B pointers which indicate which particular operands that a particular decode instruction needs in the ROB. The timing diagram also includes REGF/ROB access which indicates register file/ROB access. The Issue instr/dest tags signal indicates the issuance of instructions/destination tags. The A/B read operand buses signal indicates the transfer of A and B operands on the A and B operand buses. The Funct unit exec. signal indicates execution of an issued instruction at a functional unit. The Result bus arb signal indicates abritration for the result bus. The Result bus forward signal indicates the forwarding of results on the result bus once such results are generated by the functional unit. The ROB write result signal indicates that the result is written to the ROB. The ROB tag forward signal indicates the forwarding of an operand tag from the ROB to a functional unit. The REGF write/retire signal indicates the retirement of a result from the ROB to the register file. The PC(31:0) signal indicates the program counter (PC) which is updated whenever an instruction is retired as no longer being speculative.

In the timing diagrams of FIG. 5A, the pipeline is illustrated for executing a sequential instruction stream. In this example, the predicted execution path is actually taken as well as being available directly from the cache. Briefly, in the fetch pipeline stage, instructions are fetched from the cache for processing by the microprocessor. An instruction is decoded in the decode pipeline stage and executed in the execute pipeline stage. It is noted that the source operand buses and result buses are 32 bits in width which corresponds to the integer size. Two cycles are required of an instruction buses operand buses to drive a 64-bit value for a double precision floating point operation.

In the Result pipeline stage, operand values are forwarded directly from the functional unit which generated the result to other functional units for execution. In clock phase PH1 of the result stage, the location of the speculative instruction is written with the destination result as well as any status. In other words, the result generated by a functional unit is placed in an entry in the reorder buffer and this entry is given an indication of being valid as well as being allocated. In this manner, the reorder buffer can now directly forward operand data for a requested operand rather than forwarding an operand tag. In clock phase PH2 of the result pipeline stage, the newly allocated tag can be detected by subsequent instructions that require the tag to be one of their source operands. This is illustrated in the timing diagram of FIG. 5A by the direct forwarding of result "c" via ROB tag forwarding onto the source A/B operand buses as indicated by the arrow in FIG. 5A. It is noted that in FIG. 5A, "a" and "b" are operands which yield a result ace and that "c" and "d" are operands which yield a result "e".

The retire pipeline stage, which is the last stage of the pipeline, is where the real Program Counter (PC) or retire PC is kept. In the PH1 clock phase of the retire pipeline stage, the result of the operation is written from the reorder buffer to the register file and the retire PC is updated to reflect this writeback. In other words the retire PC is updated to include the instruction which was just retired to the register file as being no longer speculative. The entry for this instruction or result in the reorder buffer is de-allocated. Since the entry is de-allocated, subsequent references to the register "c" will result in a read from the register file instead of a speculative read from the reorder buffer.

FIG. 5B shows the same 5 pipeline stages as the timing diagram of FIG. 5A. However, the timing diagram of FIG. 5B shows the operation of microprocessor 500 when a branch misprediction occurs. XFPC designates an inversion of the FPC bus signal.

IV. An Alternative Embodiment of the Superscalar Microprocessor

Whereas the superscalar microprocessor embodiment described above is most advantageously used to process RISC programs wherein all instruction opcodes are the same size, the embodiment of the microprocessor now described as microprocessor 800 is capable of processing instructions wherein the opcodes are variable in size. For example, microprocessor 800 is capable of processing so-called X86 instructions which are employed by the familiar Intel™ instruction set which uses variable length opcodes. Microprocessor 800 employs a RISC core which is similar to the RISC core of microprocessor 500 above. The term "RISC core" refers to the central kernel of microprocessor 500 which is an inherently RISC (Reduced Instruction Set Computer) architecture including the functional units, reorder buffer, register file and instruction decoder of microprocessor 500.

Figure 6B:
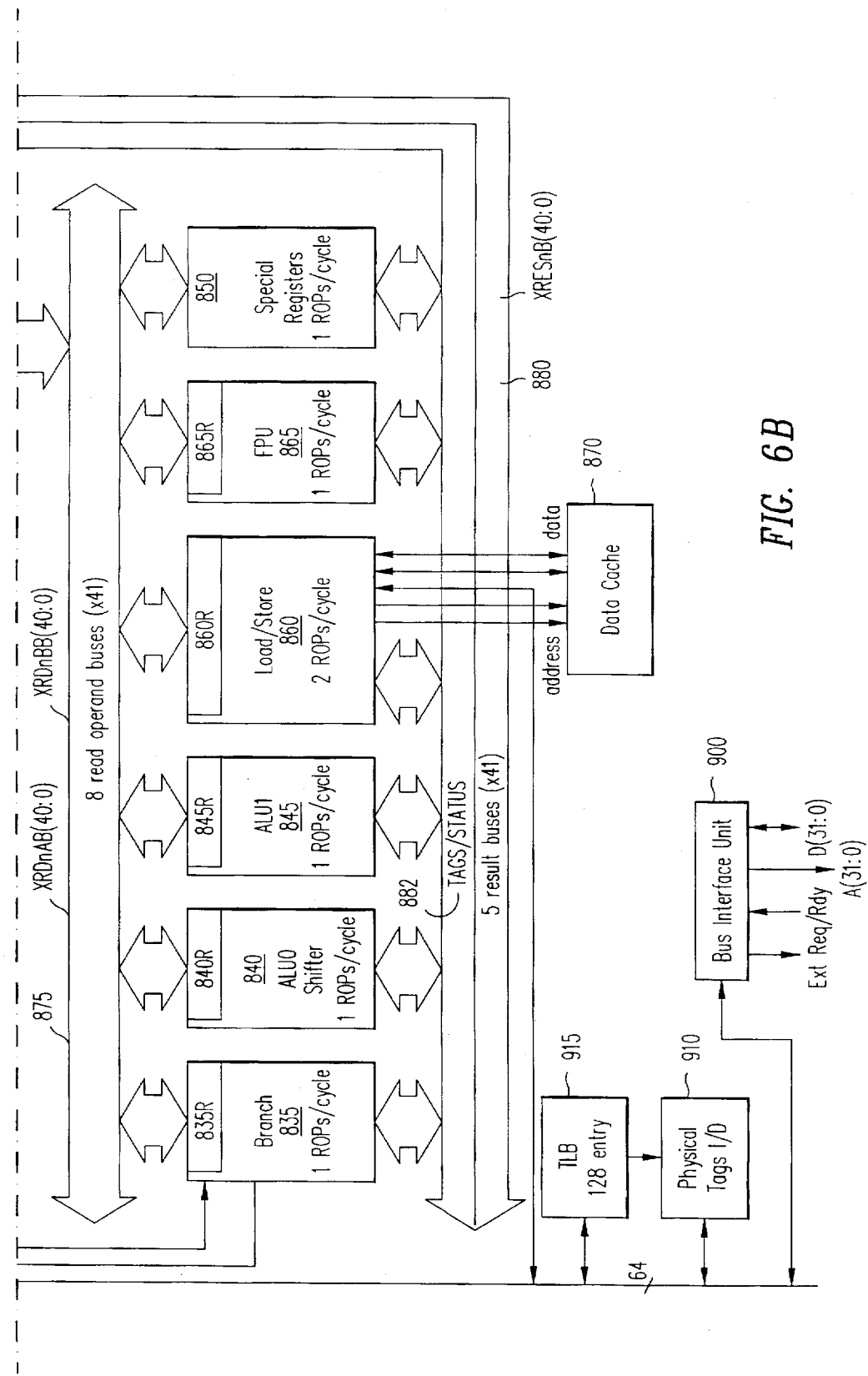

The architecture of microprocessor 800 is capable of taking so-called CISC (Complete Instruction Set Computer) instructions such as those found in the Intel™ X86 instruction set and converting these instructions to RISC-like instructions (ROP's) which are then processed by the RISC core. This conversion process takes place in decoder 805 of microprocessor 800 as illustrated in FIG. 6, 6A, and 6B. Decoder 805 decodes CISC instructions, converts the CISC instructions to ROP'S, and then dispatches the ROP's to functional units for execution. More detail with respect to the structure and operation of decoder 805 is found in the co-pending patent application entitled "Superscalar Instruction Decoder" (Attorney Docket No. M-2280) filed concurrently herewith and assigned to the instant assignee, the disclosure of which is incorporated herein by reference.

The ability of microprocessor 800 to supply the RISC core thereof with a large number of instructions per clock cycle is one source of the significant performance enhancement provided by this superscalar microprocessor. Instruction cache (ICACHE) 810 is the component of microprocessor 800 which provides this instruction supply as a queue of bytes or byte queue (byte Q) 815. In this particular embodiment of the invention, instruction cache 810 is a 16K byte effective four-way set associative, linearly addressed instruction cache.

As seen in FIG. 6, the byte Q 815 of instruction cache 810 is supplied to instruction decoder 805. Instruction decoder 805 maps each instruction provided thereto into one or more ROP's. The ROP dispatch window 820 of decoder 805 includes four dispatch positions into which an instruction from ICACHE 810 can be mapped. The four dispatch positions are designated as D0, D1, D2, and D3. In a first example, it is assumed that the instruction provided by byte Q 815 to decoder 805 is an instruction which can be mapped to two ROP dispatch positions. In this event, when this first instruction is provided to decoder 805, decoder 805 maps the instruction into a first ROP which is provided to dispatch position D0 and a second ROP which is provided to dispatch position D1. It is then assumed that a subsequent second instruction is mappable to three ROP positions. When this second instruction is provided by byte Q 815 to decoder 805, the instruction is mapped into a third ROP which is provided to dispatch position D2 and a fourth ROP which is provided to dispatch position D3. The ROP's present at dispatch positions D0 through D3 are then dispatched to the functional units. It is noted that the remaining third ROP onto which the second instruction is mapped must wait for the next dispatch window to be processed before such ROP can be dispatched.

Information with respect to which particular bytes that instruction cache 810 is to drive out into byte Q 815 is contained in branch prediction block 825 which is an input to instruction cache 810. Branch prediction block 825 is the next block array indicating on a block by block basis the next predicted branch location. Branch prediction functional unit 835 executes branches in a manner similar to that of BRNSEC 520 of microprocessor 500 of FIG. 3. Instruction cache 810 is also equipped with a prefetcher block 830 which fetches requested instruction cache misses from external memory.

Microprocessor 800 includes four integer functional units to which the four ROP positions of decoder 805 can be issued, namely, branch functional unit 835, ALU0/shifter functional unit 840, ALU1 functional unit 845, and special register functional unit 850. Branch functional unit 835 has a one cycle latency such that one new ROP can be accepted by branch functional unit 835 per clock cycle. Branch unit 835 includes a two entry reservation station 835R. For purposes of this document, a reservation station including two entries is considered to be synonymous with two reservation stations. Branch function unit 835 handles all X86 branch, call, and return instructions. It also handles conditional branch routines.

ALU0/shifter functional unit 840 exhibits a one cycle latency. One new ROP can be accepted into unit 840 per clock cycle. ALU0/shifter functional unit 840 includes a two entry reservation station 840R which holds up to two speculative ROP's. All X86 arithmetic and logic calculations go through this functional unit or alternatively the other arithmetic logic unit ALU1, 845. Moreover, shift. rotate or find first one instructions are provided to ALU0/shifter function unit 840.

The ALU1 functional unit 845 exhibits a one cycle latency as well. It is noted that one new ROP can be accepted by ALU1 functional unit 845 per clock cycle. The ALU1 functional unit includes a two entry reservation station 845R which holds up to two speculative ROP's. All X86 arithmetic and logic calculations go through this function unit or the other arithmetic logic unit, ALU0. ALU0 and ALU1 allow up to two integer result operations to be calculated per clock cycle.

The special register functional unit 850 is a special block for handling internal control, status, and mapped state that is outside the X86 register file 855. In one embodiment of the invention, special register functional unit 850 has no reservation station because no speculative state is pending when an ROP is issued to special register functional unit 850. Special register block 850 is similar in structure and function to the special register block 512 described earlier in this document.

A load/store functional unit 860 and a floating point functional unit 865 is coupled to ROP dispatch window 820 of decoder 805. Load/store functional unit 860 includes a multiple entry reservation station 860R. Floating point functional unit 865 includes two reservation stations 865R. A data cache 870 is coupled to load/store functional unit 860 to provide data storage and retrieval therefor. Floating point functional unit 865 is linked to a 41 bit mixed integer/floating point operand bus 875 and result buses 880. In more detail, operand buses 875 include eight read operand buses exhibiting a 41 bit width. Result buses 880 include 5 result buses exhibiting a 41 bit width. The linkage of floating point unit to the mixed integer/floating point operand and result buses allows one register file 855 and one reorder buffer 885 to be used for both speculative integer and floating point ROP's. Two ROP's form an 80 bit extended precision operation that is input from floating point reservation station 865R into an 80 bit floating point core within floating point function 865.

The 80 bit floating point core of floating point functional unit 865 includes a floating point adder, a floating point multiplier and a floating point divide/square root functional units. The floating point adder functional unit within floating point unit 865 exhibits a two cycle latency. The floating point adder calculates an 80 bit extended result which is then forwarded. The floating point multiplier exhibits a six cycle latency for extended precision multiply operations. A 32×32 multiplier is employed for single precision multiplication operations. The 32×32 multiplier within floating point functional unit 865 is multi-cycled for 64 bit mantissa operations which require extended precision. The floating point divide/square root functional unit employs a radix-4 interactive divide to calculate 2 bits/clock of the 64 bit mantissa.

It is noted that in the present embodiment wherein the bus width of the A/B operand buses is 41 bits, that with respect to those A/B operand buses running to the integer units, 32 bits is dedicated to operands and the remaining 9 bits is control information. It should also be noted that other embodiments of the invention are contemplated wherein the bus width of the A/B operand buses is not 41 bits, but rather is 32 bits or other size. In such a 32 bit operand bus width arrangement, control lines separate from the operand bus are employed for transmission of control information.

Load store functional unit 860 includes a four entry reservation station 860R. Load store functional unit 860 permits two load or store operations to be issued per clock cycle. The load store section also calculates the linear address and checks access rights to a requested segment of memory. The latency of a load or store operation relative to checking a hit/miss in data cache 870 is one cycle. Up to two load operations can simultaneously access data cache 870 and forward their operation to result buses 880. Load store section 860 handles both integer and floating point load and store operations.

As seen in FIG. 6A, microprocessor 800 includes a register file 855 which is coupled to a reorder buffer 885. Both register file 855 and reorder buffer 885 are coupled via operand steering circuit 890 to operand buses 875. Register file 855, reorder buffer 885 and operand steering circuit 890 cooperate to provide operands to the functional units. As results are obtained from the functional units, these results are transmitted to reorder buffer 885 and stored as entries therein.

In more detail, register file 855 and reorder buffer 885 provide storage for operands during program execution. Register file 855 contains the mapped X86 registers for both the integer and floating point instructions. The register file contains temporary integer and floating point registers as well as for holding intermediate calculations. In this particular embodiment of the invention, all of the registers in register file 855 are implemented as eight read and four right latches. The four right ports thus provided allow up to two register file destinations to be written per clock. This can be either one integer value per port or one-half a floating point value per port if a floating point result is being written to the register file. The eight read ports allow four ROPS with two source read operations each to be issued per clock cycle.

Reorder buffer 885 is organized as a 16 entry circular FIFO which holds a queue of up to 16 speculative ROP's. Reorder buffer 885 is thus capable of allocating 16 entries, each of which can contain an integer result or one-half of a floating point result. Reorder buffer 885 can allocate four ROP's per clock cycle and can validate up to five ROP's per clock cycle and retire up to four ROP'S into register file 855 per clock cycle. The current speculative state of microprocessor 800 is held in reorder buffer 885 for subsequent forwarding as necessary. Reorder buffer 885 also maintains a state with each entry that indicates the relative order of each ROP. Reorder buffer 885 also marks missed predictions and exceptions for handling by an interrupt or trap routine.

Reorder buffer 885 can drive the eight operand buses 875 with eight operands, respectively. Reorder buffer 885 can receive up to five results per clock cycle on the five result buses 880. It is noted that the operand buses are eight 41 bit shared integer/floating point buses. The eight operand buses correspond to the four ROP dispatch positions in ROP dispatch window 820 of decoder 805. Each of the four ROP dispatch positions can have a source A read operand and a source B read operand. Each of the four A and B read operand bus pairs thus formed are dedicated to a fixed ROP and source read location in ROP dispatch window 820.

Register file 855 and reorder buffer 885 are the devices in microprocessor 800 which drive read operand buses 875. If no speculative destination exists for a decoded ROP, that is if an operand requested by the ROP does not exist in the reorder buffer, then the register file supplies the operand. However, if a speculative destination does exist, that is if an operand requested by the decoded ROP does exist in the reorder buffer, then the newest entry in the reorder buffer for that operand is forwarded to a functional unit instead of the corresponding register. This reorder buffer result value can be a speculative result if it is present in the reorder buffer or a reorder buffer tag for a speculative destination that is still being completed in a functional unit.

The five result buses 880 are 41 bit buses. It is also noted that the read operand and result buses are inputs and outputs to all of the integer functional units. These same read operand and result buses are also inputs and outputs to the floating point reservation station 865R of the floating point functional unit 865. The floating point reservation station 865R converts the 41 bit operand and result buses to 80 bit extended precision buses that it routes to its constituent dedicated function units as necessary.

The integer and floating point functional units of microprocessor 800 are provided with local buffering of ROP's via the reservation stations of those units. In most of these functional units, this local buffering takes the form of two entry reservation stations organized as FIFO's. The purpose of such reservation stations is to allow the dispatch logic of decoder 805 to send speculative ROP's to the functional units regardless of whether the source operands of such speculative ROP's are currently available. Thus, in this embodiment of the invention a large number of speculative ROP's can be issued (up to 16) without waiting for a long calculation or a load to complete. In this manner, much more of the instruction level parallelism is exposed and microprocessor 800 is permitted to operate closer to its peak performance.

Each entry of a reservation station can hold two source operands or tags plus information with respect to the destination and opcode associated with each of the entries. The reservation stations can also forward source operand results which the reorder buffer has marked as being pending (those operands for which the reorder buffer has marked by instead providing an operand tag rather than the operand itself) directly to other functional units which are waiting for such results. In this particular embodiment of the invention, reservation stations at the functional units typically accept one new entry per clock cycle and can forward one new entry per clock cycle to the functional unit.

An exception to this is the load/store section 860 which can accept and retire two entries per clock cycle from its reservation station. Load/store section 860 also has a deeper reservation station FIFO of four entries.

All reservation station entries can be deallocated within a clock cycle should an exception occur. If a branch misprediction occurs, intermediate results are flushed out of the functional units and are deallocated from the reorder buffer.

Microprocessor 800 includes an internal address data bus 895 which is coupled to instruction cache 810 via prefetch unit 830 and to bus interface unit 900. BUS interface unit 900 is coupled to a main memory or external memory (not shown) so that microprocessor 800 is provided with external memory access. IAD bus 895 is also coupled to load/store functional unit 860 as shown in FIG. 6.

A data cache 870 is coupled to load/store unit 860. In one particular embodiment of the invention, data cache 870 is an 8k byte, linearly addressed, two way set associative, dual access cache. Address and data lines couple data cache 870 to load/store functional unit 860 as shown. More specifically, data cache 870 includes two sets of address and data paths between cache 870 and load/store unit 860 to enable two concurrent accesses from load/store functional unit 860. These two accesses can be between 8 and 32 bit load or store accesses aligned to the 16 byte data cache line size. Data cache 870 is organized into 16byte lines or blocks. In this particular embodiment, data cache 870 is linearly addressed or accessed from the segment based address, but not a page table based physical address. Data cache 870 includes four banks which are organized such that one line in the data cache has 4 bytes in each of the 4 banks. Thus, as long as the linear address of bits [3:2] of the two accesses are not identical, the two accesses can access the data array in cache 870 concurrently.

Data cache 870 is two-way associative. It takes the two linear addresses in phase PH1 of the clock and accesses its four banks. The resultant load operations complete in the following clock phase PH2, and can then drive one of the result buses. Requests by functional units for the result busses are arbitrated with requests from the other functional units that desire to write back a result.

Instruction cache 810 and data cache 870 include a respective instruction cache linear tag array and a data cache linear tag array corresponding to the addresses of those instructions and data entries which are stored in these cache's. As seen in FIG. 6B, microprocessor 800 also includes a physical tags I/D block 910 which is coupled to IAD bus 895 for the purpose of tracking the physical addresses of instructions and data in instruction cache 810 and data cache 870, respectively. More specifically, physical tags I/D block 910 includes physical instruction/data tag arrays which maintain the physical addresses of these cache's. The physical instruction tag array of block 910 mirrors the organization for the corresponding linear instruction tag array of the instruction cache 810. Similarly, the organization of the physical data tag array within block 910 mirrors the organization of the corresponding linear data tag array within instruction cache 810.

The physical I/D tags have valid, shared, and modified bits, depending on whether they are instruction cache or data cache tags. If a data cache physical tag has a modified bit set, this indicates that the data element requested is at the equivalent location in the linear data cache. Microprocessor 800 will then start a back-off cycle to external memory and write the requested modified block back to memory where the requesting device can subsequently see it.

A translation lookaside buffer (TLB 915) is coupled between IAD bus 895 and physical tags I/D block 910 as shown. TLB 915 stores 128 linear to physical page translation addresses and page rights for up to 128 4K byte pages. This translation lookaside buffer array is organized as a four-way set associative structure with random replacement. TLB 915 handles the linear to physical address translation mechanism defined for the X86 architecture. This mechanism uses a cache of the most recent linear to physical address translations to prevent searching external page tables for a valid translation.

Bus interface unit 900 interfaces IAD bus 895 to external apparatus such as memory. IAD bus 895 is a global 64 bit shared address/data/control bus that is used to connect the different components of microprocessor 800. IAD bus 895 is employed for cache block refills, writing out modified blocks, as well as passing data and control information to such functional blocks as the special register unit 850, load/store functional unit 860, data cache 870, instruction cache 810, physical I/D tags block 910 and translation lookaside buffer 915 as well as bus interface unit 900.

V. Operational Overview of the Alternative Embodiment

When a CISC program is executed, the instructions and data of the CISC program are loaded into main memory from whatever storage media was employed to store those instructions and data. Once the program is loaded into the main memory which is coupled to bus interface unit 900, the instructions are fetched in program order into decoder 805 for dispatch and processing by the functional units. More particularly, four instructions are decoded at a time by decoder 805. Instructions flow from main memory to bus interface unit 900, across IAD bus 895, through prefetch unit 830, to instruction cache 810 and then to decoder 805. Instruction cache 810 serves as a depository of instructions which are to be decoded by decoder 805 and then dispatched for execution. Instruction cache 810 operates in conjunction with branch prediction unit 835 to provide decoder 805 with a four instruction-wide block of instructions which is the next predicted block of instructions to be speculatively executed.

More particularly, instruction cache 810 includes a store array designated ICSTORE which contains blocks of instructions fetched from main memory via bus interface unit 900. ICACHE 810 is a 16K byte effective linearly addressed instruction cache which is organized into 16 byte lines or blocks. Each cache line or block includes 16 X86 bytes. Each line or block also includes a 5 bit predecode state for each byte. ICACHE 810 is responsible for fetching the next predicted X86 instruction bytes into instruction decoder 805.

ICACHE 810 maintains a speculative program counter designated FETCHPC (FPC). This speculative program counter FETCHPC is used to access the following three separate random access memory (RAM) arrays that maintain the cache information. In more detail, the three aforementioned RAM arrays which contain the cache information include 1) ICTAGV, an array which maintains the linear tags and the byte valid bits for the corresponding block in the store array ICSTORE. Each entry in the cache includes 16 byte valid bits and a 20 bit linear tag. In this particular embodiment, 256 tags are employed. 2) The array ICNXT-BLK maintains branch prediction information for the corresponding block in the store array ICSTORE. The ICNXT-BLK array is organized into four sets of 256 entries, each corresponding to a 16K byte effective X86 instruction. Each entry in this next block array is composed of a sequential bit, a last predicted byte, and a successor index. 3) The ICSTORE array contains the X86 instruction bytes plus 5 bits of predecode state. The predecode state is associated with every byte and indicates the number of ROP's to which a particular byte will be mapped. This predecode information speeds up the decoding of instructions once they are provided to decoder 805. The byte queue or ICBYTEQ 815 provides the current speculative state of an instruction prefetch stream provided to ICACHE 810 by prefetch unit 830. More information with respect an instruction cache which may be employed as ICACHE 810 is provided in the copending patent application entitled "Speculative Instruction Queue And Method Therefor Particularly Suitable For Variable Byte-Length Instructions" (Attorney Docket No. M-2279) filed concurrently herewith and assigned to the instant assignee, the disclosure of which is incorporated herein by reference.

Decoder 805 (IDECODE) performs instruction decode and dispatch operations in microprocessor 800. More particularly, decoder 805 performs the two stages of the microprocessor pipeline referred to as Decode 1 and Decode 2. During the beginning of Decode 1, the bytes that are prefetched and predicted executed are driven to the byte queue at a designated fill position. These bytes are then merged with independent bytes in the byte queue 815. In the decode to a pipeline stage, reorder buffer entries are allocated for corresponding ROP's that may issue in the next clock phase.

Decoder 805 takes raw X86 instruction bytes and predecode information from byte queue 815 and allocates them to four ROP positions in ROP dispatch unit 820. Decoder 805 determines which particular functional unit each ROP should be transmitted to. A more detailed discussion of one decoder which may be employed as decoder 805 is found in the U.S. Patent Application entitled "Superscalar Instruction Decoder" by David B. Witt and Michael D. Goddard (Attorney Docket No.M-2280), the disclosure of which is incorporated herein by reference. The ICACHE and decoder circuitry permits microprocessor 800 to decode and drive four ROP's per clock cycle into a RISC-like data path. The four ROP's are dispatched to the functional units which send results back to reorder buffer 385 and to other functional units which require these results.

Register file 855 and reorder buffer 885 work together to provide speculative execution to instructions in the program stream. A more detailed discussion of register file 855, reorder buffer 885 and the integer core of microprocessor 800 is now provided with reference to FIG. 7. The integer core of microprocessor 800 is designated as integer core 920 and includes the branch prediction unit 835, ALU0, ALU1, and special register 860.

In this particular embodiment, register file 855 is organized as 12 32 bit registers (integer registers) and 24 41 bit registers (floating point registers). These registers are accessed for up to four ROP's in parallel from decoder 805. Register file pointers provided by decoder 805 determine which particular register or registers are requested as operand values in a particular ROP as well as the size of the access.

It is noted that register file 855 contains the architectural state of microprocessor 800 whereas reorder buffer 885 contains the speculative state of microprocessor 800. The timing of register file 855 is such that it is accessed in phase PH2 of the decode 2 pipeline stage with up to 8 parallel read pointers. In response to reception of these up to 8 read pointers, register file 855 then drives the operand values thus selected onto the corresponding operand buses in the following PH1 phase of the clock.

Figure 7:
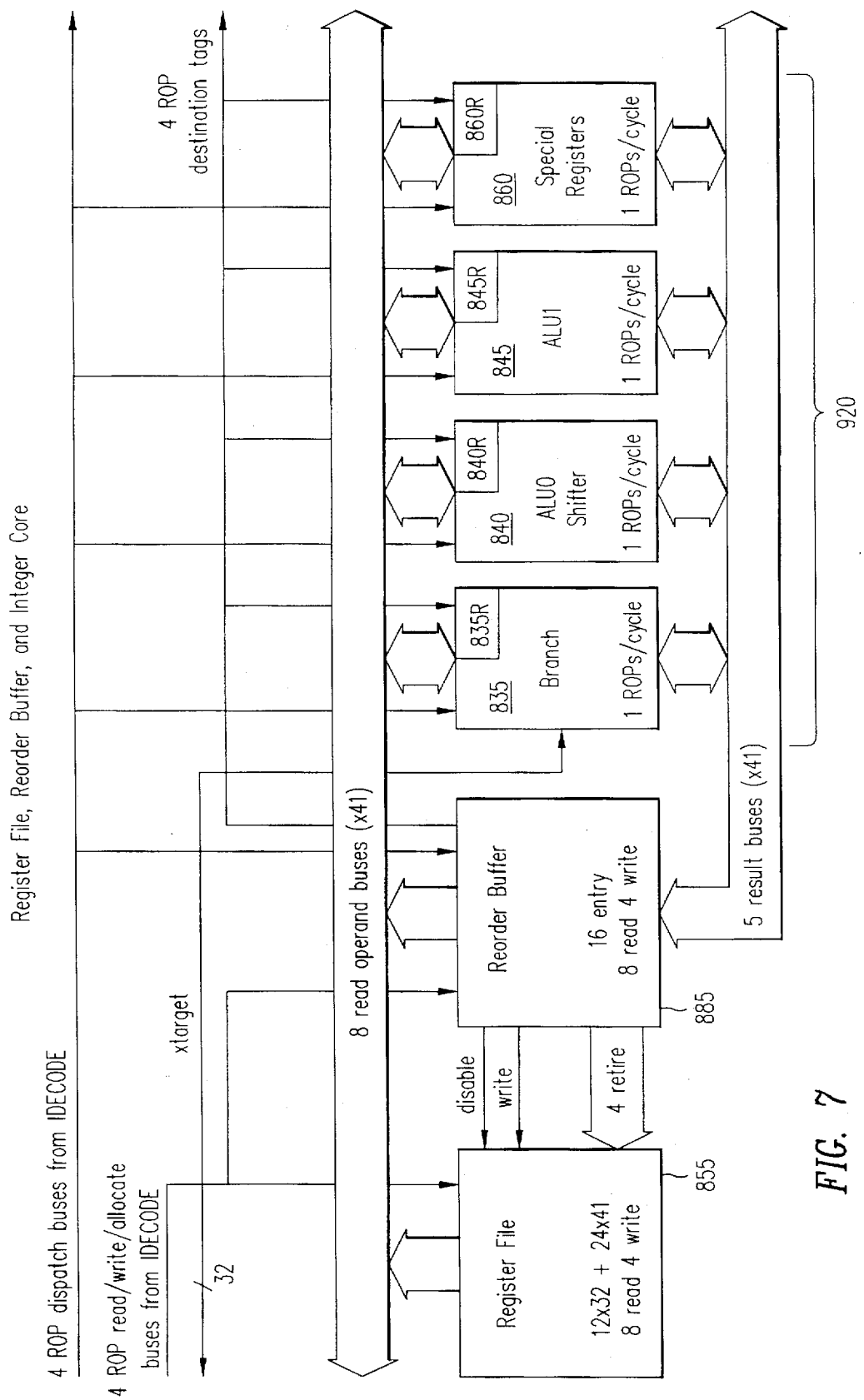
FIG. 7 is a block diagram of the register file, reorder buffer and integer core of the microprocessor of FIG. 6.

A disable bus is shown in FIG. 7 coupling reorder buffer 885 to register file 855. The disable bus is 8 lines wide and includes 8 override signals which indicate to register file 855 that the requested read value has been found as a speculative entry in reorder buffer 885. In this instance, register file 855 is subject to an override and is not permitted to place a requested read operand value on an operand bus. Rather, since a speculative entry is present in reorder buffer 885, reorder buffer 885 will then provide either the actual operand value requested or an operand tag for that value.

Reorder buffer 885 includes 16 entries in this particular embodiment and operates as a queue of speculative ROP result values. As seen in more detail in FIG. 8, reorder buffer 885 includes two pointers which correspond to the head and the tail of the queue, namely the head pointer and the tail pointer. Shifting an allocation of the queue to dispatched ROP's occurs by incrementing or decrementing these pointers.

The inputs provided to reorder buffer 885 include the number of ROP's that decoder 805 wants to attempt to allocate therein (up to 4 ROP's per block), source operand pointer values for these four ROP's, and the respective destination pointer values. Reorder buffer 885 then attempts to allocate these entries from its current speculative queue. Provided entry space is available for dispatched ROP's, entries are allocated after the tail pointer.

More particularly, when entries are requested from decoder 805, the next entries from the head of the queue are allocated. The number of a particular entry then becomes the destination tag for that particular ROP from decoder 805. The destination tag is driven at the corresponding ROP position to the functional unit along with the particular instruction to be executed. A dedicated destination tag bus designated "14 ROP destination tags" is shown in FIG. 7 as an output from reorder buffer 885 to the functional units of integer core 920 and the remaining functional units of microprocessor 800. The functional units are thus provided with destination information for each ROP to be executed such that the functional unit effectively knows where the result of an ROP is to be transmitted via the result buses.

From the above, it is seen that speculatively executed result values or operands are temporarily stored in reorder buffer 885 until such result operands are no longer speculative. A pool of potential operand values is thus provided by reorder buffer 885 for use by subsequent ROP's which are provided to and decoded by decoder 805.

Figure 8:
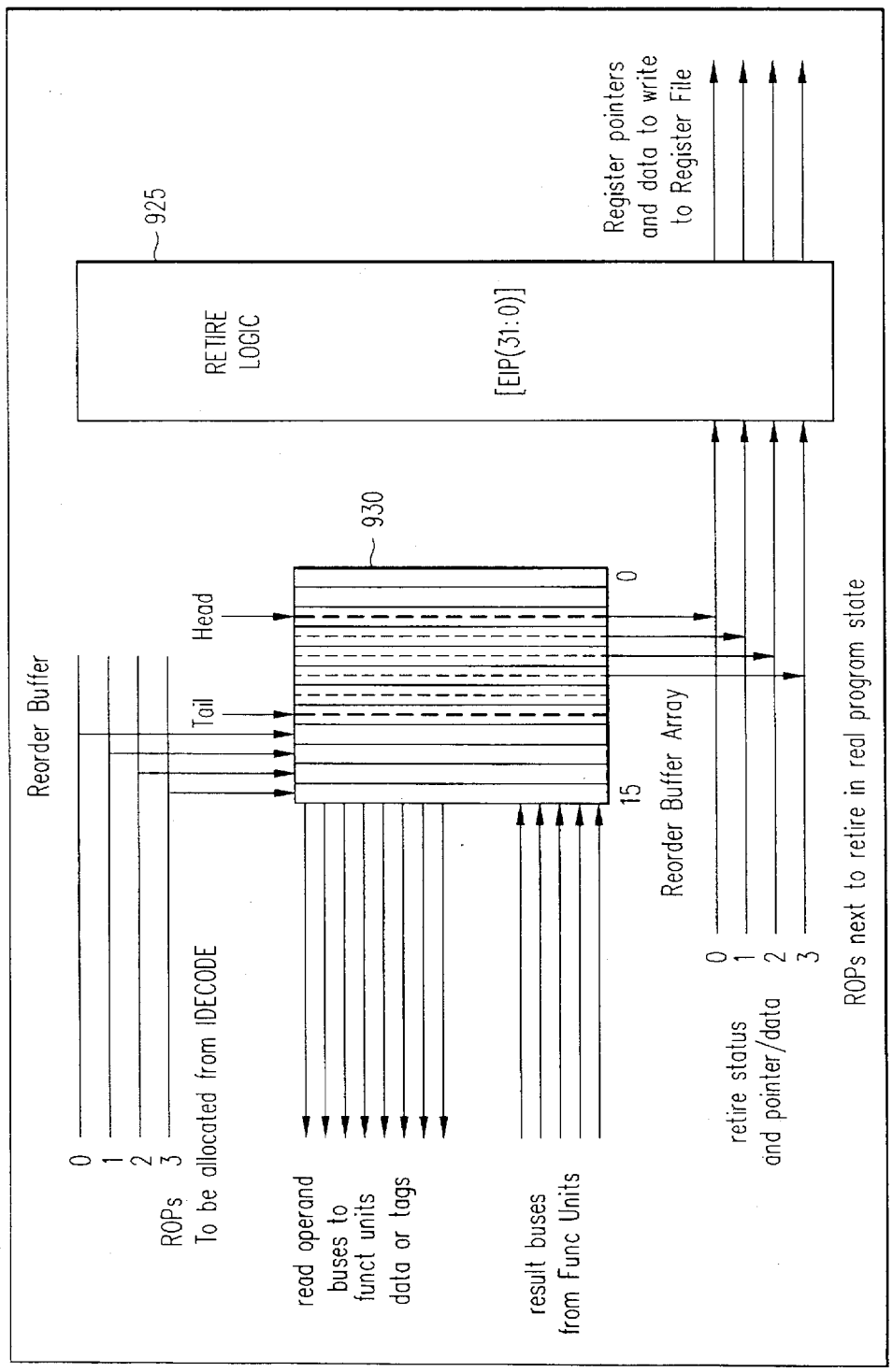
FIG. 8 is a more detailed block diagram of the reorder buffer of FIG. 7.

When entries exist in reorder buffer 885, the original register number (i.e. EAX) is held in the reorder buffer entry that was allocated for a particular ROP result. FIG. 8 shows the entries that are in a speculative state between the tail and head pointers by dashed vertical lines in those entries. Each reorder buffer entry is referenced back to its original destination register number. When any of the 8 read pointer values from the 4 ROP positions of ROP dispatch unit 820 match the original register number associated with an entry, the result data of that entry is forwarded if valid or the tag is forwarded if the operation associated with that entry is still pending in a functional unit.

Reorder buffer 885 maintains the correct speculative state of new ROP's dispatched by decoder 805 by allocating these ROP's in program order. The 4 ROP's then scan from their present position down to the tail position of the reorder buffer queue looking for a match on either of their read operands. If a match occurs in a particular reorder buffer entry, then the corresponding read port in register file 855 is disabled and either the actual result operand or operand tag is presented to the operand bus for reception by the appropriate functional unit. This arrangement permits multiple updates of the same register to be present in the reorder buffer without affecting operation. Result forwarding is thus achieved.

As shown in FIG. 8, reorder buffer 885 includes retire logic 925 which controls the retirement of result operands stored in the reorder buffer queue or array 930. When a result operand stored in queue 930 is no longer speculative, such result operand is transferred under retire logic control to register file 855. To cause this to occur, the retire logic interfacing the retirement of ROP's, the writeback to the register file, and the state of the last 4 ROP entries are scanned. The retire logic 925 determines how many of the allocated ROP entries now have valid results. The retire logic also checks how many of these ROP entries have writeback results to the register file versus ROP's with no writeback. Moreover, the retire logic scans for taken branches, stores and load misses. If a complete instruction exists within the last 4 ROP's, then such ROP is retired into the register file. However, if during scanning an ROP entry, a status is found indicating an exception has occurred on a particular ROP, then all succeeding ROP's are invalidated, and a trap vector fetch request is formed with the exception status information stored in the ROP entry.

Moreover, if a branch misprediction status is encountered while scanning the ROP's in the reorder buffer, then the retire logic invalidates these ROP entries without any writeback or update of the EIP register until the first ROP is encountered that was not marked as being in the mispredicted path. It is noted that the EIP register (not shown) contained within retire logic 925 (see FIG. 8) holds the program counter or retire PC which represents the rolling demarcation point in the program under execution which divides those executed instructions which are nonspeculative from those instructions which have been executed upon speculation. The EIP or retire PC is continually updated upon retirement of result operands from reorder buffer 885 to register file 855 to reflect that such retired instructions are no longer speculative. It is noted that reorder buffer 885 readily tracks the speculative state and is capable of retiring multiple X86 instructions or ROP's per clock cycle. Microprocessor 800 can quickly invalidate and begin fetching a corrected instruction stream upon encountering an exception condition or branch misprediction.

Figure 9:
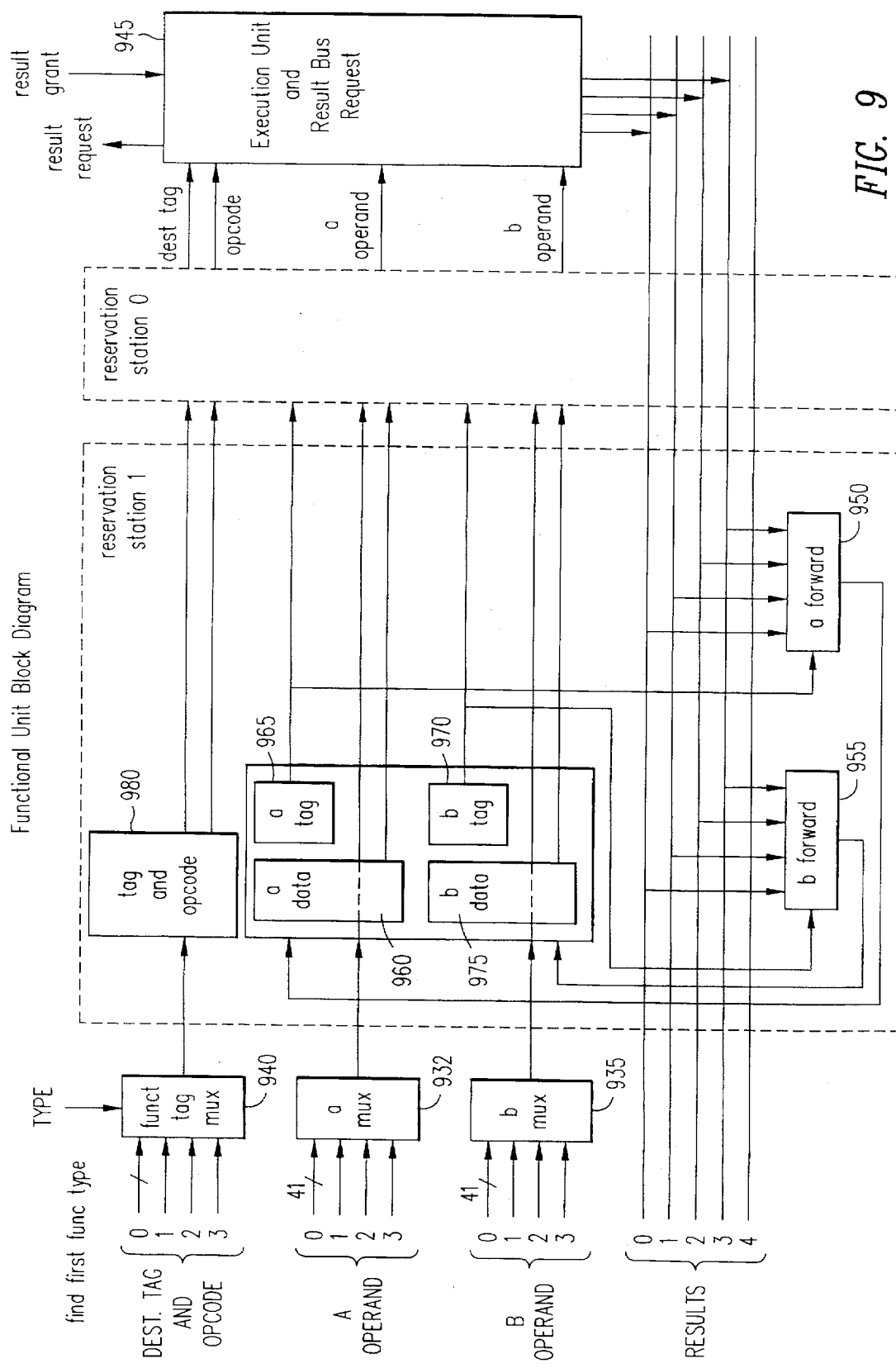
FIG. 9 is a block diagram of a generalized functional unit employed by the microprocessor of FIG. 6.

The general organization of the functional units of microprocessor 800 is now described with reference to a generalized functional unit block diagram shown for purposes of example in FIG. 9. It should be recalled that ROP's containing an opcode, an A operand, a B operand, and a destination tag are being dispatched to the generalized functional unit of FIG. 9. In the leftmost portion of FIG. 9, it is seen that four A operand buses are provided to a (1:4) A operand multiplexer 932 which selects the particular A operand from the instructions dispatched thereto. In a similar manner, the four B operand buses are coupled to a (1:4) B operand multiplexer 935 which selects the particular B operand for the subject instruction which the functional unit of FIG. 9 is to execute. Four destination/opcode buses are coupled to a multiplexer 940 which selects the opcode and destination tag for the particular instruction being executed by this functional unit.

This functional unit monitors the type bus at the "find first FUNC type" input to multiplexer 940. More particularly, the functional unit looks for the first ROP that matches the type of the functional unit, and then enables the 1:4 multiplexers 932, 935, and 940 to drive the corresponding operands and tag information into reservation station 1 of the functional unit of FIG. 9. For example, assuming that execution unit 945 is Arithmetic Logic Unit 1 (ALU1) and that the instruction type being presented to the functional unit at the TYPE input of multiplexer 940 is an ADD instruction, then the destination tag, opcode, A operand and B operand of the dispatched instruction is driven into reservation station 1 via the selecting multiplexers 932, 935, and 940.

A second reservation station, namely reservation station 0 is seen between reservation station 1 and execution unit 945. The functional unit of FIG. 9 is thus said to include two reservation stations, or alternatively, a reservation station capable of holding two entries. This two entry reservation station is implemented as a FIFO with the oldest entry being shown as reservation 0. The reservation stations 0 and 1 can hold either operands or operand tags depending upon what was sent to the functional unit on the operand buses from either register file 855 or reorder buffer 885.

To achieve result forwarding of results from other functional units which provide their results on the five result buses, the functional unit includes A forwarding logic 950 and B forwarding log 955. A forwarding logic 950 scans the five result buses for tags to match either the source A operand and when a match occurs, A forwarding logic 950 routes the corresponding result bus to the A data portion 960 of reservation station 1. It should be noted here that when an A operand tag is provided via multiplexer 930 instead of the actual A operand, then the A operand tag is stored at the location designated A tag 965. It is this A operand tag stored in A tag position 965 which is compared with the scanned result tags on the five result buses for a match. In a similar manner, B forward logic 955 scans the five result buses for any result tags which match the B operand tag stored in B operand tag position 970. Should a match be found, the corresponding result operand is retrieved from the result buses and stored in B data location 975. The destination tag and opcode of the ROP being executed by the functional unit are stored in tag and opcode location 980.

When all information necessary to execute an ROP instruction has been assembled in the functional unit, the ROP instruction is then issued to execution unit 945 for execution. More particularly, the A operand and the B operand are provided to execution unit 945 by the reservation station. The opcode and destination tag for that instruction are provided to execution unit 945 by the tag and opcode location 980. The execution unit executes the instruction and generates a result. The execution unit then arbitrates for access to the result bus by sending a result request signal to an arbitrator (not shown). When the execution unit 945 is granted access to the result bus, a result grant signal is received by execution unit 945 from the arbitrator. Execution unit 945 then places the result on the designated result bus.

The result is forwarded to other functional units with pending operands having the same tag as this result. The result is also provided to reorder buffer 885 for storage therein at the entry associated with the destination tag of the executed ROP.

In actual practice, the functional unit arbitrates for the result bus while the instruction is executing. More particularly, when a valid entry is present in the functional unit, namely when all operand, opcode and destination tag information necessary for execution have been assembled, the instruction is issued to execution unit 945 and the functional unit arbitrates for the result bus while execution unit 945 is actually executing the instruction. It is noted that each reservation station contains storage for the local opcode as well as the destination tag. This tag indicates the location that the ROP will eventually write back to during the result pipeline stage. This destination tag is also kept with each entry in the reservation station and pushed through the FIFO thereof.

While a generalized functional unit block diagram has been discussed with respect to FIG. 9, execution unit 945 may be any of branch prediction unit 835, ALU0/Shifter 840, ALU1 845, load/store 860, floating point unit 865 and special register 850 with appropriate modification for those particular functions.

Upon a successful grant of the result bus to the particular functional unit, the result value is driven out on to the result bus and the corresponding entry in the reservation station is cleared. The result buses include a 41 bit result, a destination tag and also status indication information such as normal, valid and exception. In the pipelined operation of microprocessor 800, the timing of the functional unit activities just described occurs during the execute stage. During clock phase Ph1, the operands, destination tags and opcodes are driven as the ROP is dispatched and placed in a reservation station. During the Ph2 clock phase, the operation described by the OP code is executed if all operands are ready, and during execution the functional unit arbitrates for the result buses to drive the value back to the reorder buffer.

Figure 10:
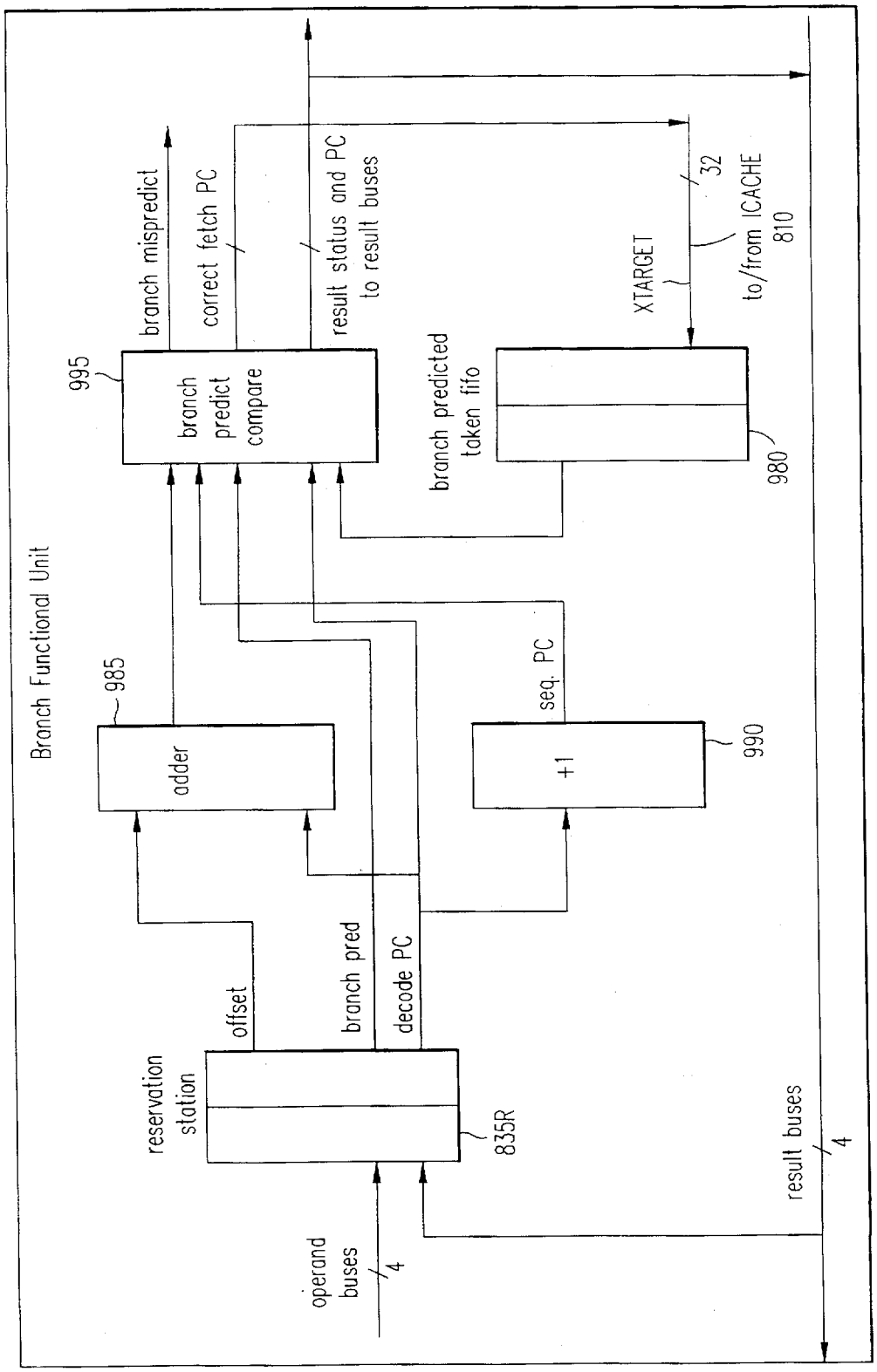
FIG. 10 is a block diagram of a branch functional unit employed by the microprocessor of FIG. 6.

FIG. 10 is a more detailed representation of branch functional unit 835. Branch functional unit 835 handles all non-sequential fetches including jump instructions as well as more complicated call and return micro-routines. Branch unit 835 includes reservation station 835R, and a branch FIFO 980 for tracking predicted taken branches. Branch functional unit 835 also includes an adder 985, an incrementer 990, and a branch predict comparator 995 all for handling PC relative branches.

Branch functional unit 835 controls speculative branches by using the branch predicted taken FIFO 980 shown in FIG. 10. More specifically, every non-sequential fetch predicted by the instruction cache 810 is driven to branch predicted FIFO 980 and latched therein along with the PC (program counter) of that branch. This information is driven on to the target bus (XTARGET) and decode PC buses to the branch functional unit. When the corresponding branch is later decoded and issued, the PC of the branch, offset, and prediction information is calculated locally by branch functional unit 835. If a match occurs, the result is sent back correctly to reorder buffer 885 with the target PC and a status indicating a match. If a branch misprediction has occurred, the correct target is driven to both instruction cache 810 to begin fetching as well as reorder buffer 885 to cancel the succeeding ROPs contained in the missed predicted branch. In this manner, execution can be restarted at the correct target PC and corruption of the execution process is thus prevented. Whenever a missed prediction does occur, branch functional unit 835 sends both the new target address as well as the index to the block where the prediction information was to update this array. This means that the microprocessor begins fetching the new correct stream of instructions while simultaneously updating the prediction array information. It is noted that the microprocessor also accesses the prediction information with the new block to know which bytes are predicted executed. The ICNXTBLK array is dual ported so that the prediction information can be updated though a second port thereof. The prediction information from the block where the misprediction occurs is information such as sequential/non-sequential, branch position, and location of the first byte predicted executed within the cache array.

Adder 985 and incrementer 990 calculate locally the current PC+offset of the current branch instruction, as well as the PC+instruction length for the next PC if sequential. These values are compared by comparator 995 against the predicted taken branches in a local branch taken queue (FIFO 980) for predicting such branches.

The major internal buses of microprocessor 800 are now summarized as a prelude to discussing timing diagrams which depict the operation of microprocessor 800 throughout its pipeline stages. It is noted that a leading X on a bus line indicates a false bus that is dynamically precharged in one phase and conditionally asserted in the other phase. The microprocessor 800 internal buses include:

FPC (31:0)—Ph1, static. This fetch PC bus is used for speculative instruction prefetches from the instruction cache 810 into byte queue 815. The FPC bus is coupled to FPC block 813 within ICACHE 810 which performs substantially the same function as FPC block 207 of microprocessor 500 of FIG. 3.

XTARGET (41:0)—Ph1 dynamic. This bus communicates the target PC for redirection of mispredicted branches and exceptions to the instruction cache and branch prediction units (825/835).

XICBYTEnB (12:0) Ph1, dynamic. This bus is the output of the instruction cache store array ICSTORE of the currently requested prefetched X86 instruction plus corresponding predecode information. In this particular embodiment, a total of 16 bytes can be asserted per clock cycle aligned such that the next predicted executed byte fills the first open byte position in the byte queue.

BYTEQn (7:0) Ph1, static. This represents the queue of predicted executed X86 instruction bytes that have been prefetched from the instruction cache. In this particular embodiment, a total of 16 bytes are presented to the decode paths of decoder 805. Each byte contains predecode information from the instruction cache with respect to the location of instruction start and end positions, prefix bytes, and opcode location. The ROP size of each X86 instruction is also included in the predecode information. The predecode information added to each byte represents a total of 6 bits of storage per byte in the byte queue, namely 1 valid bit plus 5 predecode bits.

IAD (63,0)—Ph1 dynamic. IAD bus 895 is the general interconnect bus for major microprocessor 800 blocks. It is used for address, data, and control transfer between such blocks as well as to and from external memory all as illustrated in the block diagram of FIG. 6.

XRDnAB (40:0) Ph1, dynamic. This designation represents the source operand A bus for each ROP provided to the functional units and is included in operand buses 875. More specifically, it includes a total of four 41 bit buses for ROP 0 through ROP 3. A corresponding tag bus included in the operand buses indicates when a forwarded tag from reorder buffer 885 is present instead of actual operand data from reorder buffer 885.

XRDnBB (40:0)—Ph1, dynamic. This designation indicates the source operand B bus for each ROP sent to the functional units. This bus structure includes four 41 bit buses for ROP 0 through ROP 3 and is included in the eight read operand buses 875. It is again noted that a corresponding tag bus indicates when a forwarded operand tag is present on this bus instead of actual operand data from reorder buffer 885.

XRESnB (40:0)—Ph1, dynamic. This designation indicates result bus 880 for 8, 16, 32 bit integers, or ½ an 80 bit extended result. It is noted that corresponding tag and status buses 882 validate an entry on this result bus.

Figure 11:
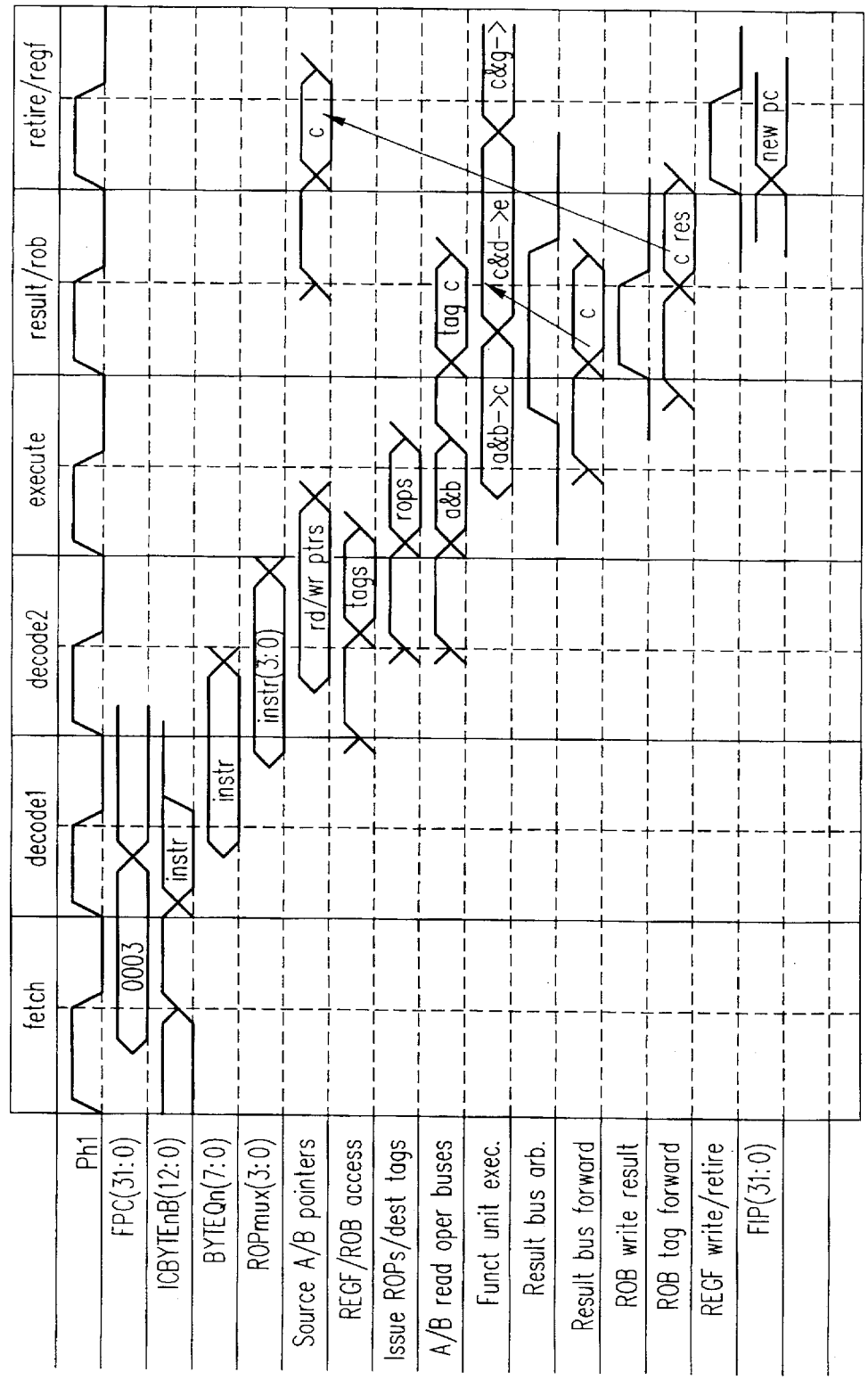
FIG. 11 is a timing diagram of the operation of the microprocessor of FIG. 6 during sequential execution.

Microprocessor 800 includes a six stage pipeline including the stages of fetch, decode1, decode2, execute, result/ROB and retire/register file. For clarity, the decode stage has been divided into decode1 and decode2 in FIG. 11. FIG. 11 shows the microprocessor pipeline when sequential execution is being conducted. The successive pipeline stages are represented by vertical columns in FIG. 11. Selected signals in microprocessor 800 are presented in horizontal rows as they appear in the various stages of the pipeline.

The sequential execution pipeline diagram of FIG. 11 portrays the following selected signals:

"Ph1" which represents the leading edge of the system clocking signal. The system clocking signal includes both Ph1 and Ph2 components.

"FPC(31:0)" which denotes the fetch PC bus from byte queue 815.

"ICBYTEnB (12:0)" which is the ICBYTE bus from the ICSTORE array of instruction cache 810 which is coupled to byte queue 815.

"BYTEQn (7:0)" which is the byte queue bus. "ROPmux (3:0)" which is a decoder signal which indicates the instruction block and predecode information being provided to the decoder.

"Source A/B pointers" which are the read/write pointers for the A and B operands provided by decoder 805 to reorder buffer 815. Although not shown explicitly in FIG. 6, the source pointers are the register file values that are inputs into both the register file and the reorder buffer from the decode block.

"REGF/ROB access" indicates access to the register file and reorder buffer for the purpose of obtaining operand values for transmission to functional units.

"Issue ROPs/dest tags" indicates the issuance of ROPs and destination tags by decoder 805 to the functional units.

"A/B read oper buses" indicates the reading of the A and B operand buses by the functional units to obtain A and B operands or tags therefore.

"Funct unit exec" indicates execution by the functional units. It is noted that in FIGS. 11 and 12, the designations a&b→c and c&d→e and c&g→ indicate arbitrary operations and are in the form "source 1 operand, source 2 operand→destination". More specifically, the designated source registers are registers, namely temporary or mapped X86 registers. In the a&b→c example, the "c" value represents the destination and shows local forwarding from both the result buses as well as the reorder buffer to subsequent references in the predicted executed stream.

"Result Bus arb" indicates the time during which a functional unit is arbitrating for access to result bus 880 for the purpose of transmission of the result to the reorder buffer and any other functional units which may need that result since that unit holds an operand tag corresponding to such result.

"Result bus forward" indicates the time during which results are forwarded from a functional unit to other functional units needing that result as a pending operand.

"ROB write result" indicates the time during which the result from a functional unit is written to the reorder buffer.

"ROB tag forward" indicates the time during which the reorder buffer forwards operand tags to functional units in place of operands for which it presently does not yet have results.

"REGF write/retire" indicates the time during which a result is retired from the FIFO queue of the reorder buffer to the register file.

"EIP (31:0)" indicates the retire PC value. Since an interrupt return does not have delayed branches, the microprocessor can restart upon an interrupt return with only one PC. The retire PC value or EIP is contained in the retire logic 925 of reorder buffer 885. The EIP is similar to the retire PC already discussed with respect to microprocessor 500. Retire logic 925 performs a function similar to the retire logic 242 of microprocessor 500.

The timing diagram of FIG. 11 shows microprocessor 800 executing a sequential stream of X86 bytes. In this example, the predicted execution path is actually taken as well as being available directly from the instruction cache.

The first stage of instruction processing is the instruction fetch. As shown, this clock cycle is spent conducting instruction cache activities. Instruction cache 810 forms a new fetch PC (FPC) during Ph1 of the clock cycle and then accesses the cache arrays of the instruction cache in the second clock cycle. The fetch PC program counter (shown in the timing diagram as FPC (31:0)) accesses the linear instruction cache's tag arrays in parallel with the store arrays. Late in clock phase Ph2 of the fetch, a determination is made whether the linear tags match the fetch PC linear address. If a match occurs, the predicted executed bytes are forwarded to the byte queue 815.

In addition to accessing the tag and store arrays in instruction cache, the fetch PC also accesses the block prediction array, ICNXTBLK. This block prediction array identifies which of the X86 bytes are predicted executed and whether the next block predicted executed is sequential or nonsequential. This information, also accessed in Ph2, determines which of the bytes of the currently fetched block will be driven as valid bytes into byte queue 815.

Byte queue 815 may currently have X86 bytes stored therein that have been previously fetched and not yet issued to functional units. If this is the case, a byte filling position is indicated to instruction cache 810 to shift the first predicted byte over by this amount to fill behind the older X86 bytes.

It is noted that since the branch prediction information occurs in clock phase Ph2 of the fetch, the next block to be prefetched by prefetch unit 830 can be sequential or non-sequential since in either case there is one clock cycle in which to access the cache arrays again. Thus, the branch prediction arrays allow a branch out of the block to have the same relative performance as accessing the next sequential block thus providing performance enhancement.

The Decode1/Decode2 pipeline stages are now discussed. During the beginning of decode1, the bytes that were prefetched and predicted executed are driven into byte queue 815 at the designated fill position. This is shown in the timing diagram of FIG. 11 as ICBYTEnB (12:0) asserting in Ph1 of decode1. These bytes are then merged with any pending bytes in the byte queue. The byte queue contains the five bits of predecode state plus the raw X86 bytes to show where instruction boundaries are located. The head of the byte queue is at the beginning of the next predicted executed X86 instruction. In the middle of clock phase Ph1 of decode1, the next stream of bytes from the instruction cache is merged with the existing bytes in byte queue 815 and the merged stream is presented to decoder 805 for scanning. Decoder 805 determines the number of ROPs each instruction takes and the position of the opcode to enable alignment of these opcodes to the corresponding ROP issue positions D0, D1, D2, and D3 with the ROP at D0 being the next ROP to issue. Decoder 805 maintains a copy of the program counters PC's of each of the X86 instructions in byte queue 815 by counting the number of bytes between instruction boundaries, or detecting a branch within the instruction cache and attaching the target PC value to the first X86 byte fetched from that location.

Utilizing the OP code and ROP positioning information, as well as the immediate fields stored in byte queue 815, decoder 805 statically determines the following information during clock phase Ph2 of decode1 and clock phase Ph1 of decode2: 1) functional unit destination, 2) source A/B and destination operand pointer value, 3) size of source and destination operations, and 4) immediate address and data values if any. By the end of clock phase Ph1 of decode2 all the register read and write pointers are resolved and the operation is determined. This is indicated in the timing diagram of FIG. 11 by the assertion of the source A/B pointer values.

In the decode2 pipeline stage depicted in the timing diagram of FIG. 11, the reorder buffer entries are allocated for corresponding ROPs that may issue in the next clock phase. Thus, up to four additional ROPs are allocated entries in the 16 entry reorder buffer 885 during the Ph1 clock phase of decode 2. During the Ph2 clock phase of decode2, the source read pointers for all allocated ROPs are then read from the register file while simultaneously accessing the queue of speculative ROPs contained in the reorder buffer. This simultaneous access of both the register file and reorder buffer arrays permits microprocessor 800 to late select whether to use the actual register file value or to forward either the operand or operand tag from the reorder buffer. By first allocating the four ROP entries in the reorder buffer in Ph1 and then scanning the reorder buffer in Ph2, microprocessor 800 can simultaneously look for read dependencies with the current ROPs being dispatched as well as all previous ROPs that are still in the speculative state. This is indicated in the timing diagram of FIG. 11 by the REGF/ROB access and the check on the tags.

In the execute pipeline stage, ROPs are issued to the functional units by dedicated OP code buses as well as the read operand buses. The dedicated OP code buses communicate the OP code of an ROP to a functional unit whereas the read operand buses transmit operands or operand tags to such functional units. The time during which the operand buses communicate operands to the functional units is indicated in the timing diagram of FIG. 11 by the designation A/B read operand buses.

In the latter part of the Ph1 clock phase of the execute pipeline stage, the functional units determine which ROPs have been issued to such functional units and whether any pending ROPs are ready to issue from the local reservation stations in such functional units. It is noted that a FIFO is maintained in a functional unit's reservation station to ensure that the oldest instructions contained in the reservation stations execute first.

In the event that an instruction is ready to execute within a functional unit, it commences such execution in the late Ph1 of the execute pipeline stage and continues statically through Ph2 of that stage. At the end of Ph2, the functional unit arbitrates for one of the five result buses as indicated by the result bus ROB signal in FIG. 11. In other words, the result bus arbitration signal is asserted during this time. If a functional unit is granted access to the result bus, then it drives the allocated result bus in the following Ph1.

The result pipeline stage shown in the timing diagram of FIG. 11 portrays the forwarding of a result from one functional unit to another which is in need of such result. In clock phase Ph1 of the result pipeline stage, the location of the speculative ROP is written in the reorder buffer with the destination result as well as any status. This entry in the reorder buffer is then given an indication of being valid as well as allocated. Once an allocated entry is validated in this matter, the reorder buffer is capable of directly forwarding operand data as opposed to an operand tag upon receipt of a requested read access. In clock phase Ph2 of the result pipeline stage, the newly allocated tag can be detected by subsequent ROPs that require it to be one of its source operands. This is shown in the timing diagram of FIG. 11 as the direct forwarding of result C via "ROB tag forward" onto the source A/B operand buses.

The retire pipeline stage is the last stage of the pipeline in the timing diagram of FIG. 11. This stage is where the real program counter (retire PC) in the form of the EIP register is maintained and updated as indicated by the bus designation EIP (31:0). As seen in FIG. 11, the EIP (31:0) timing diagram shows where a new PC (or retire PC) is generated upon retirement of an instruction from the reorder buffer to the register file. The actual act of retirementof a result from the reorder buffer to the register file is indicated by the signal designated REGF write/retire in FIG. 11. It is seen in FIG. 11 that in the clock phase Ph1 of the retire pipeline stage, the result of an operation is written to the register file and the EIP register is updated to reflect that this instruction is now executed. The corresponding entry in the reorder buffer is deallocated in the same clock phase Ph1 that the value is written from the reorder buffer to the register file. Since this entry in the reorder buffer is now deallocated, subsequent references to the register C will result in a read from the register file instead of a speculative read from the reorder buffer. In this manner the architectural state of the microprocessor is truly reflected.

Figure 12:
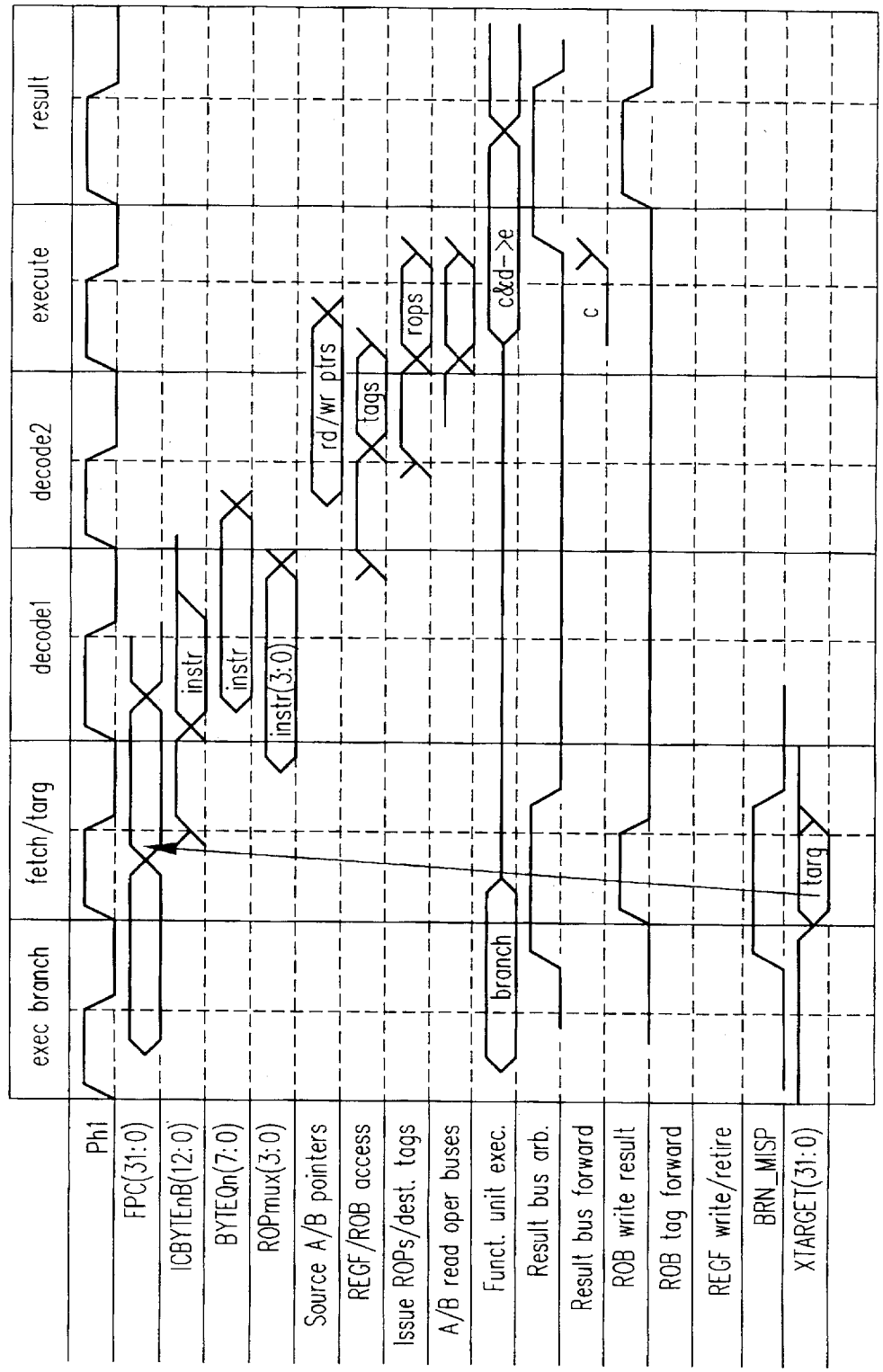
FIG. 12 is a timing diagram of the operation of the microprocessor of FIG. 6 during a branch misprediction and recovery.

FIG. 12 depicts a timing diagram of processor 800 during a branch misprediction. The timing diagram of FIG. 12 shows the same signal types as the timing diagram of FIG. 11 with the following exceptions:

The BRN_MISP signal indicates when a branch misprediction has occurred.

The XTARGET (31:0) signal denotes the time at which a predicted target branch instruction is communicated to branch unit 835.

The timing diagram of FIG. 12 shows the stages of the microprocessor 800 pipeline during a branch misprediction and recovery. This timing diagram assumes that the first cycle is the execute cycle of the branch and that the following cycles are involved in correcting the prediction and fetching the new instruction stream. It is noted that in this particular embodiment, a three cycle delay exists from the completion of execution of the branch instruction that was mispredicted to the beginning of execution of a corrected path.

The fetch stage of the pipeline depicted in FIG. 12 is similar to the normal fetch stage depicted in FIG. 11 with the exception that the XTARGET (31:0) bus is driven from branch functional unit 835 to instruction cache 810 in order to provide instruction cache 810 with information with respect to the predicted target. It is noted that the branch functional unit is the block of microprocessor 800 which determines that a branch mispredict has in fact occurred. The branch functional unit also calculates the correct target. This target is sent at the same time as a result is returned to the reorder buffer with a mispredicted status indication on result bus 880. The result bus also contains the correct PC value for updating the EIP register upon retiring the branch instruction if a real branch has occurred. The XTARGET bus is then driven on to the fetched PC bus and the instruction cache arrays are accessed. If a hit occurs, the bytes are driven to the byte queue as before.

When a missed prediction occurs, all bytes in byte queue 815 are automatically cleared in the first phase of fetch with the assertion of the signal BRN_MISP. No additional ROPs are dispatched from decoder 805 until the corrected path has been fetched and decoded.

When the result status of a misprediction is returned in clock phase Ph1 of the fetch pipeline stage to the reorder buffer, the misprediction status indication is sent to all speculative ROPs after the misprediction so that they will not be allowed to write to the register file or to memory. When these instructions are next to retire, their entries in the reorder buffer are deallocated to allow additional ROPs to issue.

With respect to the decode1 pipeline stage during a branch misprediction, the rest of the path for decoding the corrected path is identical to the sequential fetch case with the exception of the updating of the prediction information in the ICNXTBLK array of instruction cache 810. The correct direction of the branch is now written to the prediction array ICNXTBLK to the cache block therein where the branch was mispredicted.

The pipeline stages decode2, execute, result, retire during a misprediction appear substantially similar to those discussed in FIG. 11.

Figure 13:
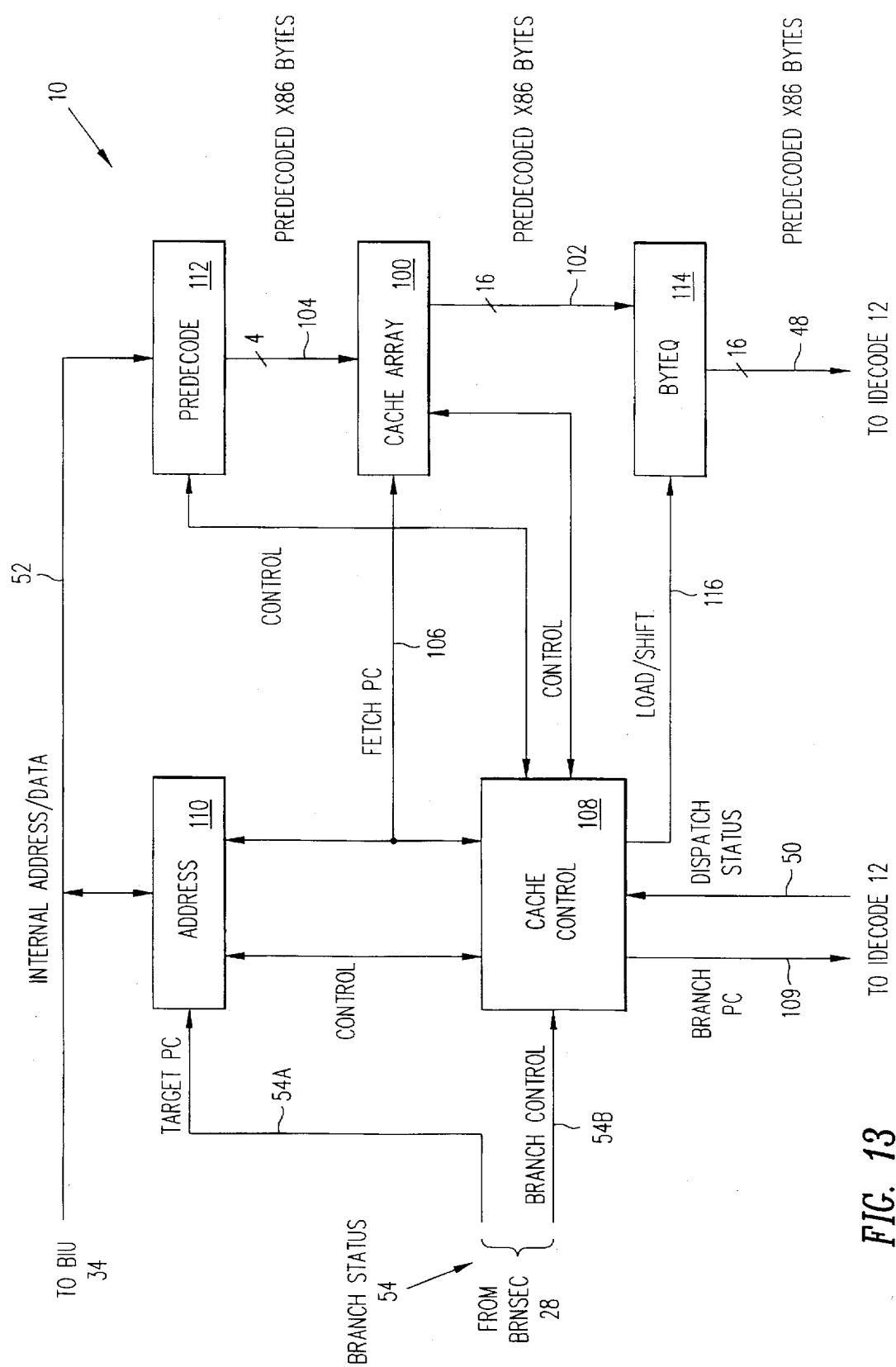
FIG. 13 is a block diagram of the instruction cache.

Referring to FIG. 13, the ICACHE 10 includes a cache control 108, which provides control signals to orchestrate the various operations of the ICACHE 10, an address block 110 which generally maintains a fetch program counter (the "Fetch PC") communicated on bus 106 for sequential and non-sequential accesses to the cache array 100, and provides address generation and X86 protection checking associated with pre-fetching instructions from either a secondary cache or external memory, a predecode block 112 which receives pre-fetched X86 instruction bytes via an internal address/ data bus 52, assigns predecode bits for each X86 instruction byte, and writes the predecoded X86 instruction bytes using a group of 4 busses 104 into a cache array 100, and a queue of predicted-executed instruction bytes (a "byte queue", or BYTEQ 114), which buffers predicted-executed instructions from the cache array 100 and presents up to 16 valid predecoded X86 instruction bytes to the IDECODE 12 on a group of 16 busses 48. The Fetch PC is preferably maintained as an X86 linear address, which is discussed more fully in co-pending, commonly-assigned U. S. patent application Ser. No. 08/146,381, Attorney Docket No. M-2412 US, filed on Oct. 19, 1993, entitled "Linearly Addressable Microprocessor Cache", naming David B. Witt as inventor, which is incorporated herein by reference in its entirety.

In operation, the ICACHE 10 pre-decodes the X86 instruction bytes when initially prefetched to facilitate the parallel decoding and mapping of up to four X86 instructions into ROPs, and the parallel dispatch of up to 4 ROPs by the IDECODE 12, all within the same clock cycle. A variety of advantageous configurations are possible for the predecode bits. For example, a group of 5 predecode bits may describe an associated X86 instruction byte as indicated in Table 1, which shows an organization for a 13-bit "predecoded byte".

TABLE 1

| | |
|---|---|
| bit12 | Indicates start byte of X86 instruction. |
| bit11 | Indicates end byte of X86 instruction. |
| bit[10:8] | Indicates the "byte type": |
| | 000- X86 opcode byte; maps to MROM routine. |
| | 001- X86 opcode byte; maps to 1 ROP. |
| | 010- X86 opcode byte; maps to 2 ROPs. |
| | 011- X86 opcode byte; maps to 3 ROPs. |
| | 100- X86 ModR/M byte. |
| | 101- X86 S-I-B byte. |
| | 110- X86 DISP/IMM byte. |
| | 111- X86 PREFIX byte. |
| bit[7:0] | "raw" X86 instruction byte. |

Storing an additional 5 predecode bits for each 8-bit X86 instruction represents about 60% overhead in the ICACHE compared to the X86 instruction bytes. However, because the X86 instructions are densely encoded and make efficient use of memory (which is, in fact, a large factor in why the X86 instruction format is so complicated) the predecoded instructions bytes are stored reasonably efficiently compared to a traditional 32-bit RISC architecture. On average, an X86 instruction is 3 bytes in length and maps into 1.3 ROPs for the optimized RISC core illustrated in FIG. 2. Therefore, each ROP (which is a RISC-like instruction similar to other traditional RISC processors) requires 30 bits of ICACHE memory, as given by Eq. 1, and which compares favorably to other RISC processors.

$$1\ ROP = \left(3\ \frac{X86\ bytes}{X86\ instr}\right) * 13\ \frac{bits}{byte}\ /1.3\ \frac{ROPs}{X86\ instr.} \quad \text{(Eq. 1)}$$

$$= 30\ bits$$

Figure 14:
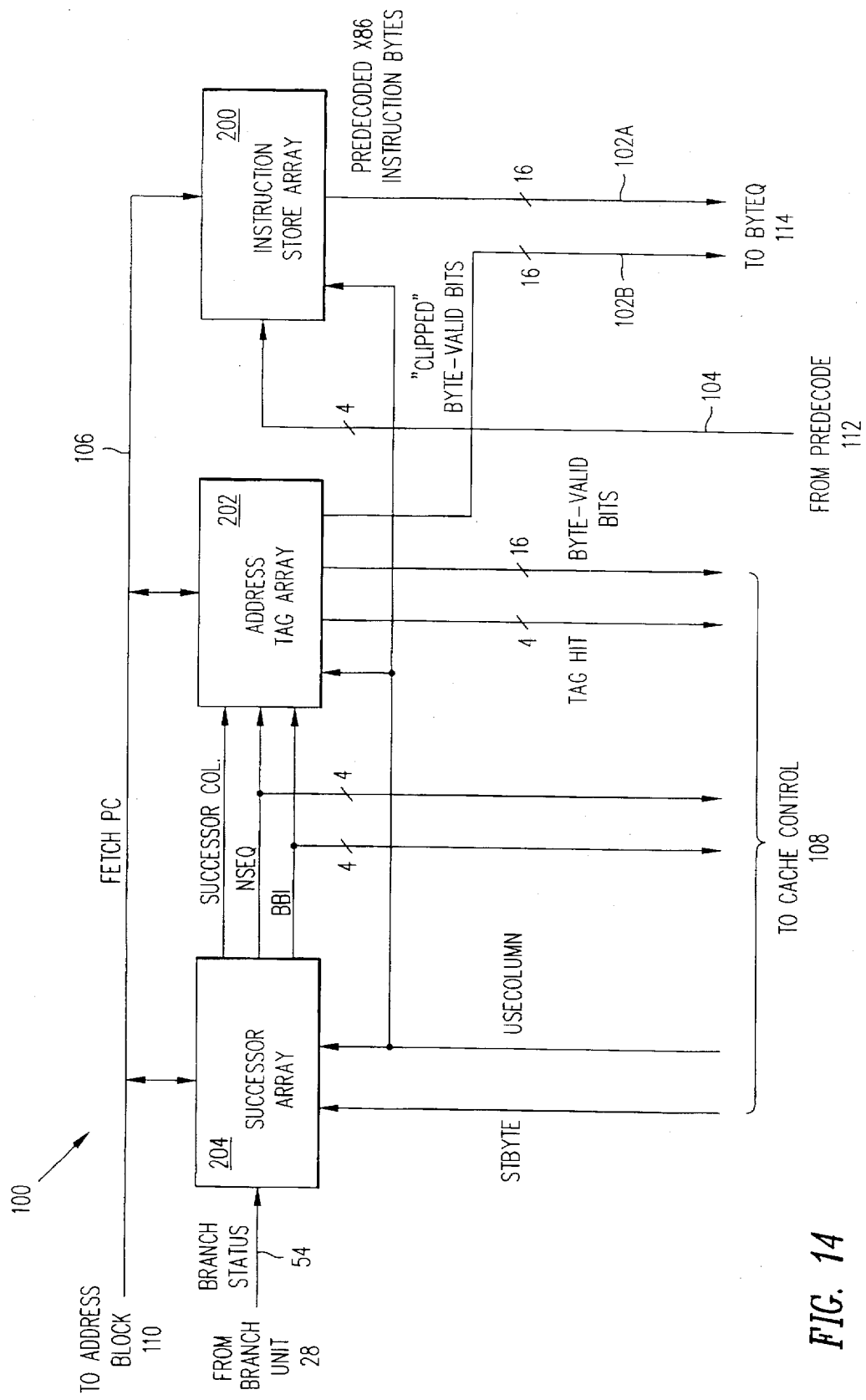
FIG. 14 is a block diagram of the cache array illustrated within the instruction cache of FIG. 13.

Referring now to FIG. 14, the cache array 100 is preferably organized into 3 main arrays: an instruction store array 200, an address tag array 202, and a successor array 204. Each of these three arrays are addressed by the Fetch PC address conveyed on bus 106. As is well known in the art of cache memory design, middle-order bits of the Fetch PC address form a cache index which is used to address these arrays and retrieve an entry from each array, upper-order bits form an address tag which is compared to the tag stored within the retrieved entry from the address tag array 202 for detecting a cache hit, and lowest order bits form an offset into the retrieved entry from the instruction store array 200 to find the byte addressed by the Fetch PC.

In the preferred embodiment, the cache array 100 is organized as a 16K byte 4-way set-associative cache. The instruction store array 200 is organized as 1024 blocks of 16 predecoded X86 instruction bytes. The address tag array 202 is dual-ported and contains 1024 entries, each composed of a 20-bit linear address tag, a single valid bit for the entire block, and 16 individual byte-valid bits, one for each of the 16 corresponding instruction bytes within the instruction store array 200. The successor array 204 is dual-ported and contains 1024 entries, each composed of a 14-bit successor index, a successor valid bit (NSEQ) which indicates when set that the successor index stored in the successor array 204 should be used to access the instruction array 200, and indicates when cleared that no branch is predicted taken within the instruction block, and a block branch index (BBI) which indicates, when the NSEQ is set, the byte location within the current instruction block of the last instruction byte predicted to be executed. The 14-bit successor index is composed of an 8-bit field used as the address index into the cache, a 2-bit field to indicate which column of the 4-way set-associative array contains the successor block of instruction bytes (thus avoiding the time otherwise required to determine which column "hits" at this address), and a 4-bit field which indicates the particular byte within the successor block which is predicted to be the next byte executed.

Figure 15:
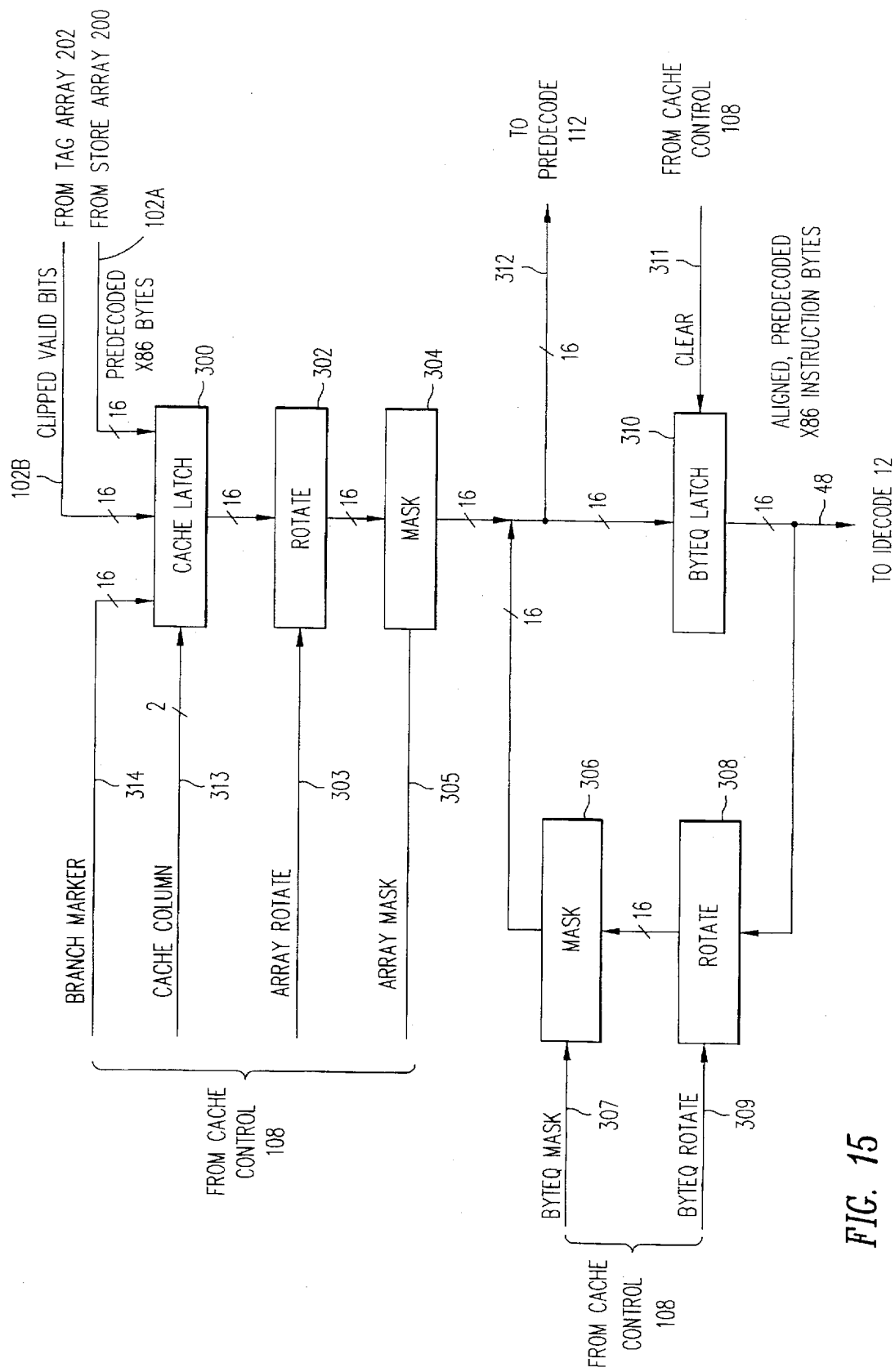
FIG. 15 is a block diagram of the byte queue illustrated within the instruction cache of FIG. 13.

Referring now to FIG. 15, the BYTEQ 114 includes a cache latch 300 which receives sixteen predecoded X86 instruction bytes conveyed on bus 102A from the instruction store array 200, sixteen corresponding "clipped" byte-valid bits conveyed on bus 102B from the address tag array 202, sixteen corresponding branch marker bits conveyed on bus 314 from the cache control 108, and a 2-bit cache column indicator, conveyed on bus 313 from cache control 108, which indicates the column (of the 4-way set-associative cache) which the corresponding instruction bytes are stored within. The cache column indicator is replicated into each of the 16 output positions of the cache latch 300. The "clipped" byte-valid bits are set for only those valid bytes which are predicted executed within a cache block (or cache line), as will be discussed herein. A rotate block 302 receives the outputs from cache latch 300 and, responsive to an array rotate signal conveyed from the cache control 108 on bus 303, rotates the byte positions by an amount to align an indicated byte position into the first position. All 16 byte positions are rotated by the same amount in a recirculating manner. A mask block 304 receives the outputs of each byte position of the rotate block 302 and selectively drives certain byte positions of a bus 312, responsive to an array mask signal conveyed from the cache control 108 on bus 305.

The state of bus 312 is latched by a byteq latch 310, which then provides the predecoded X86 instruction bytes to IDECODE 12 via the sixteen-"predecoded byte" wide bus 48 (For example, a bus 48 conveying 16 bytes of 13 bits each). The byteq 114 further includes a rotate block 308 which also receives the sixteen predecoded X86 instruction bytes conveyed on bus 48 from the byteq latch 310 and, responsive to a byteq rotate signal conveyed from the cache control 108 on bus 309, rotates the byte positions by an amount to align an indicated byte position into the first position. All 16 byte positions are rotated by the same amount in a recirculating manner. A mask block 306 receives the outputs of each byte position of the rotate block 308 and selectively drives certain byte positions of bus 312, responsive to a byteq mask signal conveyed from the cache control 108 on bus 307.

Each bit position (of each byte position) of bus 312 is precharged into, for example, a high state by precharge circuitry not shown. Subsequently, when the mask blocks 304 and 306 are enabled to drive their respective outputs, each bit position of bus 312 is discharged, for example, into a low state by either mask block 304 or mask block 306. The cache control 108 ensures that the array mask on bus 305 and the byteq mask on bus 307 provides for each byte position of bus 312 being driven by either of the mask blocks 304 or 306, but not both. Thus, bus 312 functions as a "wired-or" bus and is used to merge data from two different sources, which is then loaded into the byteq latch 310 during the next clock cycle. Such a technique utilizing a rotate function to shift instruction bytes is possible whenever the block size of the cache is identical to the length of the BYTEQ.

Figure 16:
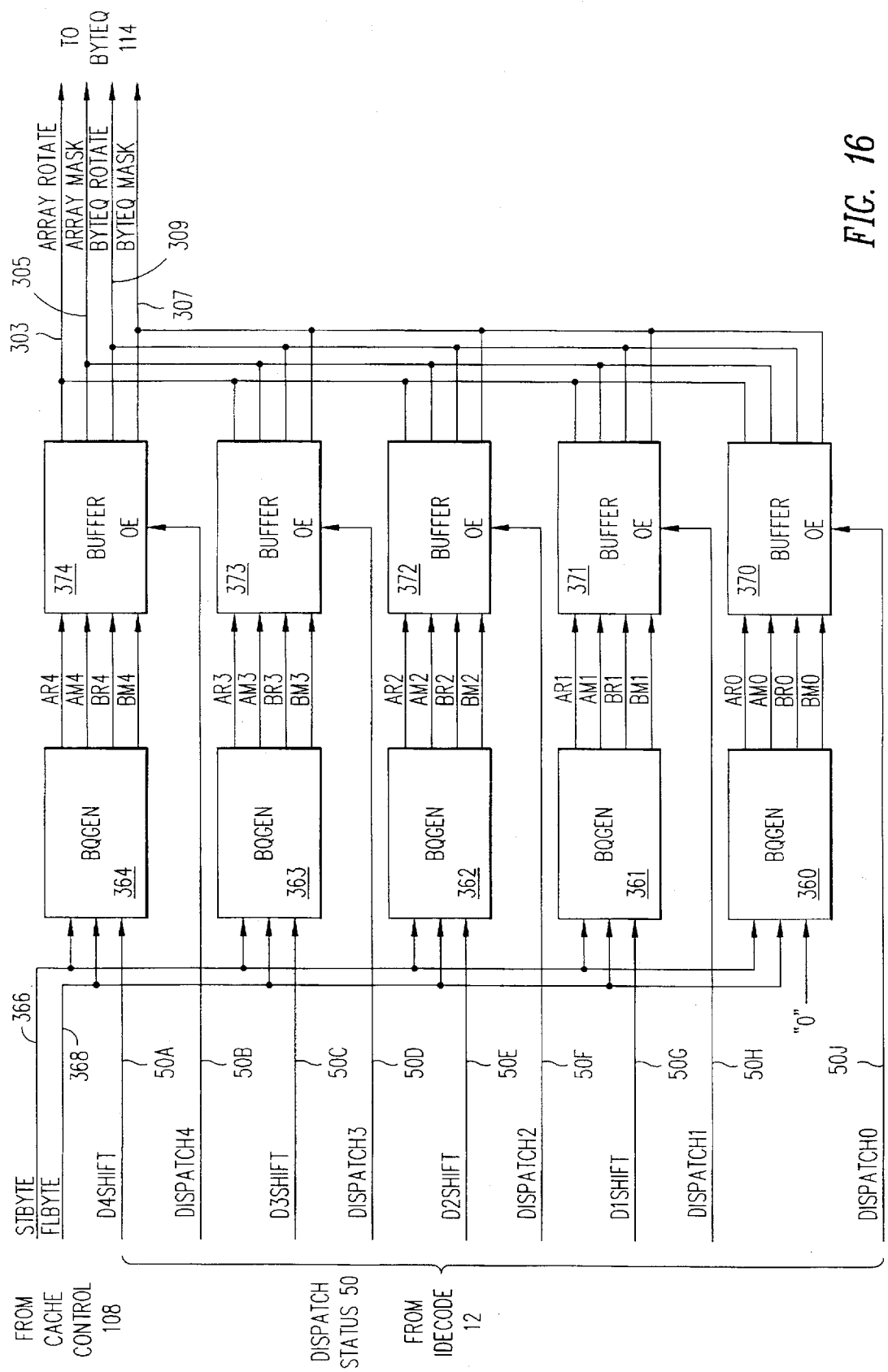
FIG. 16 is a block diagram of a portion of the byte queue control logic within the cache control block illustrated in FIG. 13.

FIG. 16 shows a portion of the cache control 108 which includes five different byteq control generation circuits (BQGEN 360-364), each driven by common STBYTE and FLBYTE pointers conveyed on busses 366 and 368, respectively. Generally, five versions of each of the four signals necessary to shift/load the byteq 114 are generated in parallel during instruction decode, each corresponding to the respective anticipated dispatch of 0, 1, 2, 3, or 4 ROPs by the IDECODE 12 during a given clock cycle. When the actual number of dispatched ROPs is known, a dispatch signal enables one of five buffers which drives one such version of these four signals onto respective busses 303, 305, 307, and 309.

For example, BQGEN 364 receives a D4SHIFT signal conveyed on bus 50A from the IDECODE 12 which indicates, for the anticipated case of all 4 ROPs being dispatched by the IDECODE 12, how many bytes the byteq 114 should be shifted for the next cycle. The IDECODE 12 generates this D4SHIFT based upon the mapping of each ROP back into the corresponding X86 instruction, and the byte-length of each X86 instruction in the byteq 114 (based upon the start byte and end byte fields in the predecoded bits). Consequently, the D4SHIFT generated by the IDECODE 12 indicates, in the case that all 4 ROPs are dispatched, the number of bytes the BYTEQ 114 should shift to completely shift out of the BYTEQ 114 all X86 instructions whose ROPs are fully dispatched. In response to the D4SHIFT signal conveyed on bus 50A, the STBYTE pointer conveyed on bus 366, and the FLBYTE pointer conveyed on bus 368, the BQGEN 364 generates four control signals, AR4, AM4, BR4, and BM4, which are then driven, responsive to a DISPATCH4 signal conveyed on bus 50B from the IDECODE 12, by a buffer 374 (having three-state outputs) to become the respective signals ARRAY ROTATE, ARRAY MASK, BYTEQ ROTATE, and BYTEQ MASK conveyed on respective busses 303, 305, 309, and 307 to the BYTEQ 114.

In a similar fashion, BQGEN 360, BQGEN 361, BQGEN 362, and BQGEN 363 receive a respective signal "0", D1SHIFT, D2SHIFT, and D3SHIFT corresponding to the respective anticipated dispatch of 0, 1, 2, and 3 ROPs by the IDECODE 12 during the current clock cycle, and generate appropriate rotate and mask signals, one set of which is gated by respective buffers 370, 371, 372, and 373 onto busses 303, 305, 309, and 307 in response to respective signals DISPATCH0, DISPATCH1, DISPATCH2, AND DISPATCH3 received from the IDECODE 12 when the actual number of dispatched ROPs is known. The BQGEN 360 generates all four BYTEQ 114 control signals because, even in the case of no ROPs being dispatched (DISPATCH0 asserted) and consequently when the BYTEQ 114 is not shifted, additional predecoded instruction bytes from the cache array 100 may continue to fill into any available byte positions in the BYTEQ 114, as indicated by the STBYTE and FLBYTE pointers.

Figure 17:
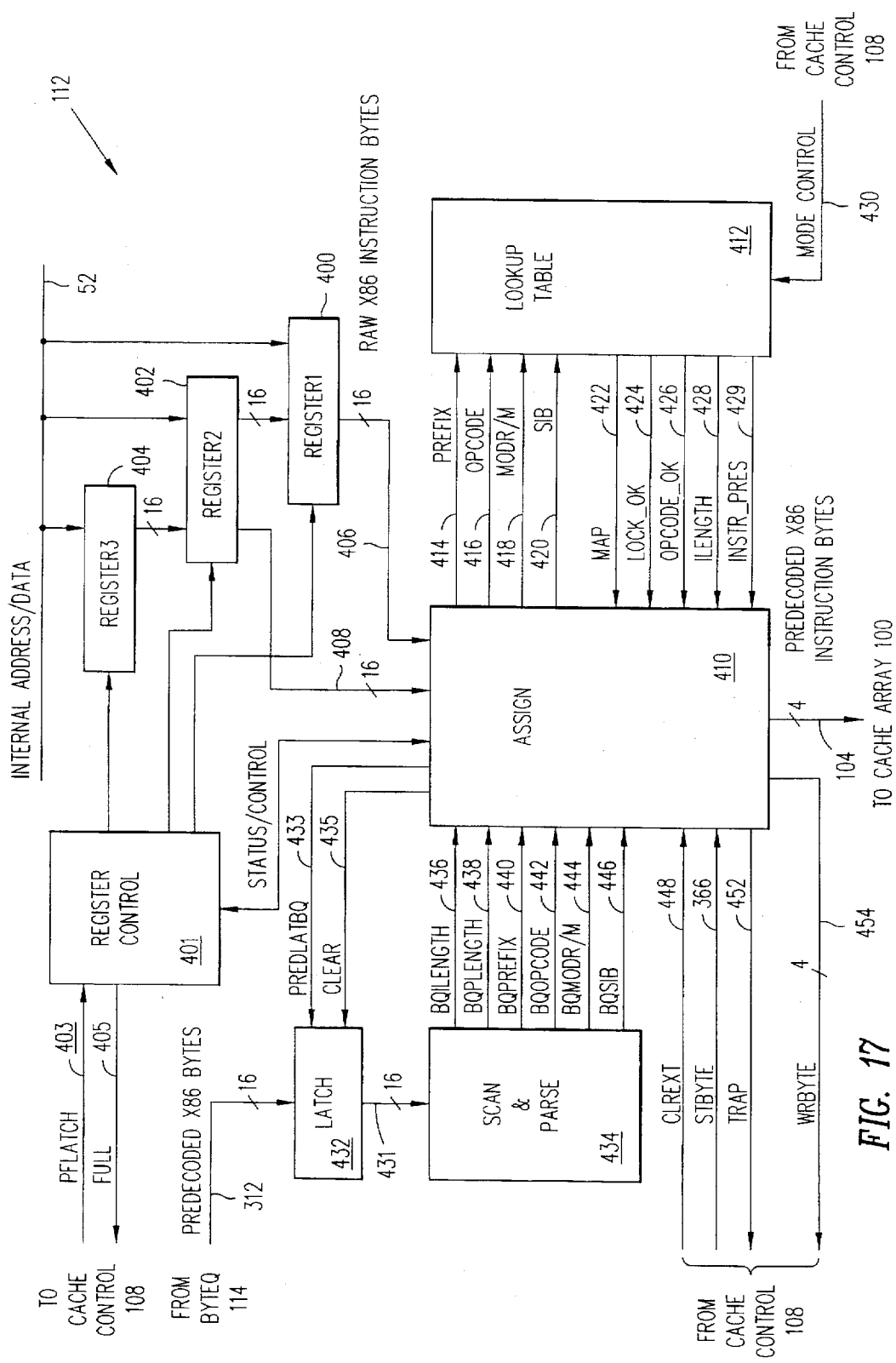

Referring now to FIG. 17, the PREDECODE 112 includes registers 400, 402, and 404 for receiving prefetched instruction bytes conveyed on internal address/data bus 52 from an instruction source (which may include a secondary cache or external memory). A request to pre-fetch instructions is received from the cache control 108 upon a cache miss in the cache array 100. A register control 401 receives a prefetch latch (PFLATCH) signal conveyed on bus 403 from the cache control 108. This PFLATCH signal is asserted to indicate that the next available register 400, 402, or 404 should latch the instruction bytes present on the internal address/data bus 52. The register control 401 generates control signals for registers 400, 402, and 404 accordingly, and also asserts a FULL signal conveyed on bus 405 back to the control 108 when all three registers are full.

As many as 32 predecoded bytes are conveyed on busses 406 and 408 to an assign block 410 which scans the instruction bytes starting at the byte indicated by the STBYTE pointer conveyed on bus 366 from the cache control 108 and which corresponds to either the prefetch address or to the byte immediately following the last complete instruction prefetched. This first byte must be either a prefix byte or an opcode byte, and is marked as a starting byte. If one or more prefix bytes are encountered before the opcode byte, each prefix byte encountered is preferably recoded and also includes any prefix information from previously encountered prefix bytes. Thus, the last prefix byte before the opcode byte becomes a consolidated prefix byte containing prefix information from all previous prefix bytes encountered in the "raw" X86 instruction. The preferred encoding for the consolidated prefix byte (as well as recoded prefix bytes) is presented in Table 3. Specific descriptions of the various prefixes for the X86 instruction set are found in the i486™ *Microprocessor Programmer's Reference Manual*, available from the Intel Corporation of Santa Clara, Calif.

TABLE 3

| | | |
|---|---|---|
| 7:5 | 000 | no segment prefix |
| | 001 | CS segment override prefix |
| | 010 | DS segment override prefix |
| | 011 | ES segment override prefix |
| | 100 | FS segment override prefix |
| | 101 | GS segment override prefix |
| | 110 | SS segment override prefix |
| | 111 | reserved |
| 4:3 | 00 | no repeat or lock prefix |
| | 01 | LOCK prefix |
| | 10 | REPNE prefix |
| | 11 | REP/REPE prefix |
| 2 | 0 | no operand size prefix |
| | 1 | operand size prefix |
| 1 | 0 | no address size prefix |
| | 1 | address size prefix |
| 0 | 0 | no two-byte opcode prefix |
| | 1 | two-byte opcode prefix |

The opcode byte is marked, for example, by setting bit10 in the field of pre-decode bits, according to the configuration described in Table 2. The consolidated prefix byte is the byte immediately preceding the opcode byte, unless the opcode byte is also marked as the starting byte, which implies no prefix is present. The byte immediately following the opcode byte is tentatively assumed to be an X86 ModR/M byte, with the next byte tentatively assumed to be an X86 S-I-B byte. The four instruction fields PREFIX (being the consolidated prefix byte), OPCODE, ModR/M, and S-I-B are then conveyed on respective busses 414, 416, 418, and 420 to a lookup table 412, which is preferably implemented as a PLA. Mode control information is conveyed on bus 430 to the lookup table 412, which returns values for MAP, LOCK_OK, OPCODE_OK, ILENGTH, and INSTR_PRES conveyed on respective busses 422, 424, 426, 428, and 429 back to the assign block 410.

The MAP value indicates the number of ROPs the current instruction maps into, which is a function of the specific operands as specified by any ModR/M and/or S-I-B byte, the mode of the processor, and the presence of any prefix bytes, among others. The P0 and P1 bits (bits 8 and 9 of Table 2) within the predecode field for the bytes of this instruction are set appropriately for the number of ROPs specified by the MAP value. The value LOCK_OK indicates whether a lock prefix is valid for the particular instruction. An illegal instruction trap is generated when a invalid lock prefix precedes an opcode by asserting the TRAP signal conveyed on bus 452 to the cache control 108. The value OPCODE_OK indicates the validity of the opcode field, which is also used to generate an illegal instruction trap when an illegal opcode is encountered. The value INSTR_PRES conveyed on bus 429 indicates the presence of enough instruction bytes to make proper determination of the other values communicated by lookup table 412. The value ILENGTH indicates the byte-length of the instruction, and is used to set the ending byte bit in the predecode field accordingly. With the end of the instruction found and all predecode bits assigned, the predecoded instruction bytes are conveyed, up to 4 bytes at a time, on bus 104 to the cache array 100. A WRBYTE signal is conveyed on bus 454 to the cache control 108 and indicates which respective predecoded bytes conveyed on bus 104 are valid and should be written into the cache array 100.

In a variable byte-length instruction format such as the X86 format, a single instruction may frequently cross cache line boundaries when written into the cache array 100. In other words, the first portion of the instruction is stored within a given cache line (or cache block) when initially cached and the remaining portion of the instruction is stored within the following cache line. Subsequent memory references may cause the cache line containing the remaining portion of the instruction to be allocated to a different memory location and written with unrelated instruction bytes. When the processor executes the given instruction again, the cache access will "miss" when attempting to access the second cache line. Such a partially cached instruction is detected by the cache control 108, which allocates a new cache line for the trailing bytes of the instruction and issues a prefetch of the instruction bytes, which are brought into the PREDECODE block 112 as before.

Rather than prefetching the cache line containing the beginning bytes of the partially cached instruction (which are already present in the cache array 100 and in the byteq 114), the beginning bytes of the instruction are instead loaded, upon the assertion of a PREDLATBQ signal conveyed on bus 433, from the byteq 114 directly into a latch 432 via bus 312. These sixteen instruction bytes are conveyed on bus 431 to a scan and parse block 434 which locates the incomplete instruction within the 16 bytes from the byteq 114. Up to four byte fields within the partial instruction and two values generated from the partial instruction are conveyed to the assign block 410 to provide a starting basis for the assignment of the predecode bits for the remainder of the instruction bytes. A BQILENGTH value, conveyed on bus 436, indicates the number of instruction bytes, beginning with the opcode byte, resident in the earlier cache line. A BQPLENGTH value, conveyed on bus 438, indicates the number of prefix bytes within the cache line occurring before the opcode byte. The consolidated prefix byte (BQPREFIX), the opcode byte (BQOPCODE), the ModR/M byte (BQMODR/M), and the S-I-B byte (BQSIB), if found within the current cache line, are conveyed on respective busses 440, 442, 444, and 446 to the assign block 410, which assigns predecode bits to the remaining bytes prefetched from memory and writes the remaining bytes into the cache array 100 as before. A CLEAR signal conveyed on bus 435 from the assign block 410 clears the latch 432 upon the successful writing of all instruction bytes for the instruction.

A CLREXT signal conveyed from the cache control 108 on bus 448 indicates a new prefetch address is forthcoming, and to clear the registers 400, 402, and 404 and discontinue predecoding of the former prefetch instruction stream.

Figure 18:
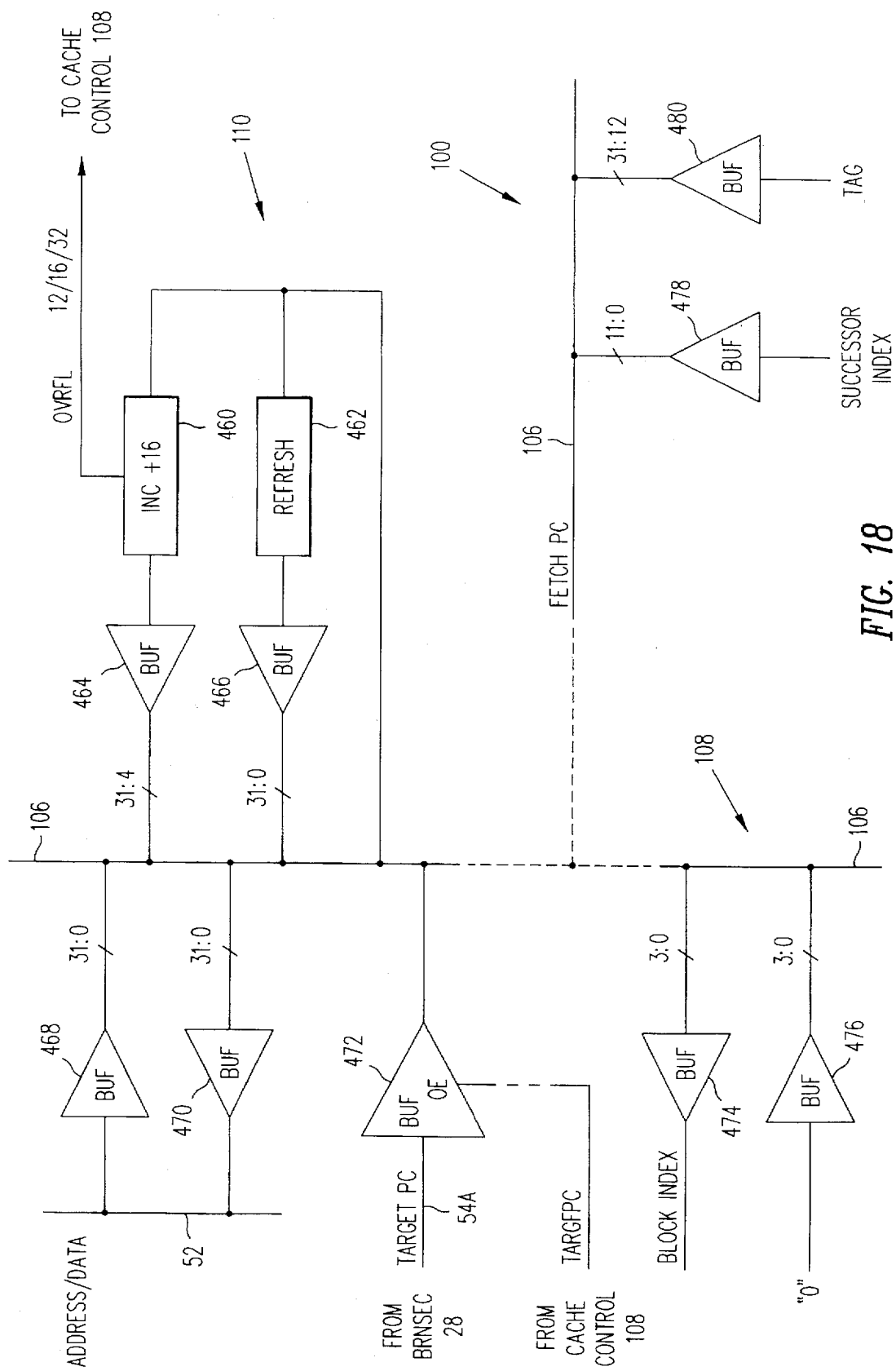

FIG. 18 illustrates portions of each of the address block 110, the cache control 108, and the cache array 100 which together generally maintain and redirect the Fetch PC conveyed on bus 106. Because this processor utilizes branch prediction to accomplish speculative execution of instructions, the Fetch PC value is a speculative fetch PC value and is not necessarily representative of the architectural state of the processor. Similar branch prediction methods are discussed in U. S. Pat. No. 5,136,697 entitled "System for Reducing Delay for Execution Subsequent to Correctly Predicted Branch Instruction Using Fetch Information Stored With Each Block of Instructions in Cache", naming William M. Johnson as inventor. Address block 110 includes a refresh latch 462 which is loaded with the current Fetch PC value on bus 106 and which value is driven back onto bus 106 by buffer 466 when the Fetch PC value is to be maintained into the next clock cycle. An incrementer 460 preferably receives the upper 28 bits of the Fetch PC (bits [31:4]) from the bus 106 and increments the Fetch PC value to address the next cache line by adding a "1" into the fourth bit position. The incremented value is driven back onto bus 106 by buffer 464 when the Fetch PC value is to be incremented for the next clock cycle while the lower 4 bits of bus 106 are forced to a "0" state by buffer 476 within the cache control 108. Thus, an arbitrary address (not quad-word aligned) initially used to prefetch an instruction stream (e.g., the target address of a branch instruction), is aligned to the next quad-word (16 byte) boundary when first incremented, and then incremented by 16 thereafter. The target address for such a branch is received from the BRNSEC 28 on bus 54. A buffer 472 drives the Target PC value onto the bus 106 when an TARGFPC signal is received from the cache control 108, as would be the case for a mispredicted branch. A buffer 474 receives the lower 4 bits of the Fetch PC conveyed on bus 106 and drives a block index which is initially loaded into the STBYTE pointer discussed earlier with respect to FIG. 9. Thus, the STBYTE pointer is set to address the first byte predicted-executed within a particular block.

A buffer 468 within the address block 110 drives the bus 106 with an address value residing on the internal address/data bus 52, as might be used to invalidate a cache block at such an address because of a subsequent write at that address (by either the same processor, as would occur in self-modifying code, or by another processor, as would be detected by bus-snooping), while a buffer 470 drives the Fetch PC value on bus 106 onto the internal address/data bus 106 for prefetching instructions from the ICACHE 10 from an external source. Buffers 478 and 480 drive the address tag value and the successor index from the cache array onto respective bits [31:12] and [11:0] of the bus 106, and are useful for branch prediction, and which is discussed more fully herewithin.

In another embodiment, the simple and common CISC instructions are encoded into one to three ROP sequences of primitive ROPs, which are then issued in parallel. The encoding is done for each dispatch position in a "fastpath," which decodes a CISC instruction into an ROP and issue it to the RISC core. The fastpath uses pre-decoded information accompanying each CISC instruction byte to determine where instruction boundaries are and the number of ROPs for each CISC instruction.

In another embodiment, complicated instructions, i.e. those requiring four or more ROPs, and infrequently used instructions are encoded using an entrypoint into microcode ROM. At the entrypoint, no additional CISC instructions are issued, so that the full issue width is available for the complex instruction. The routines issue from the four ROP positions.

Figure 19A:
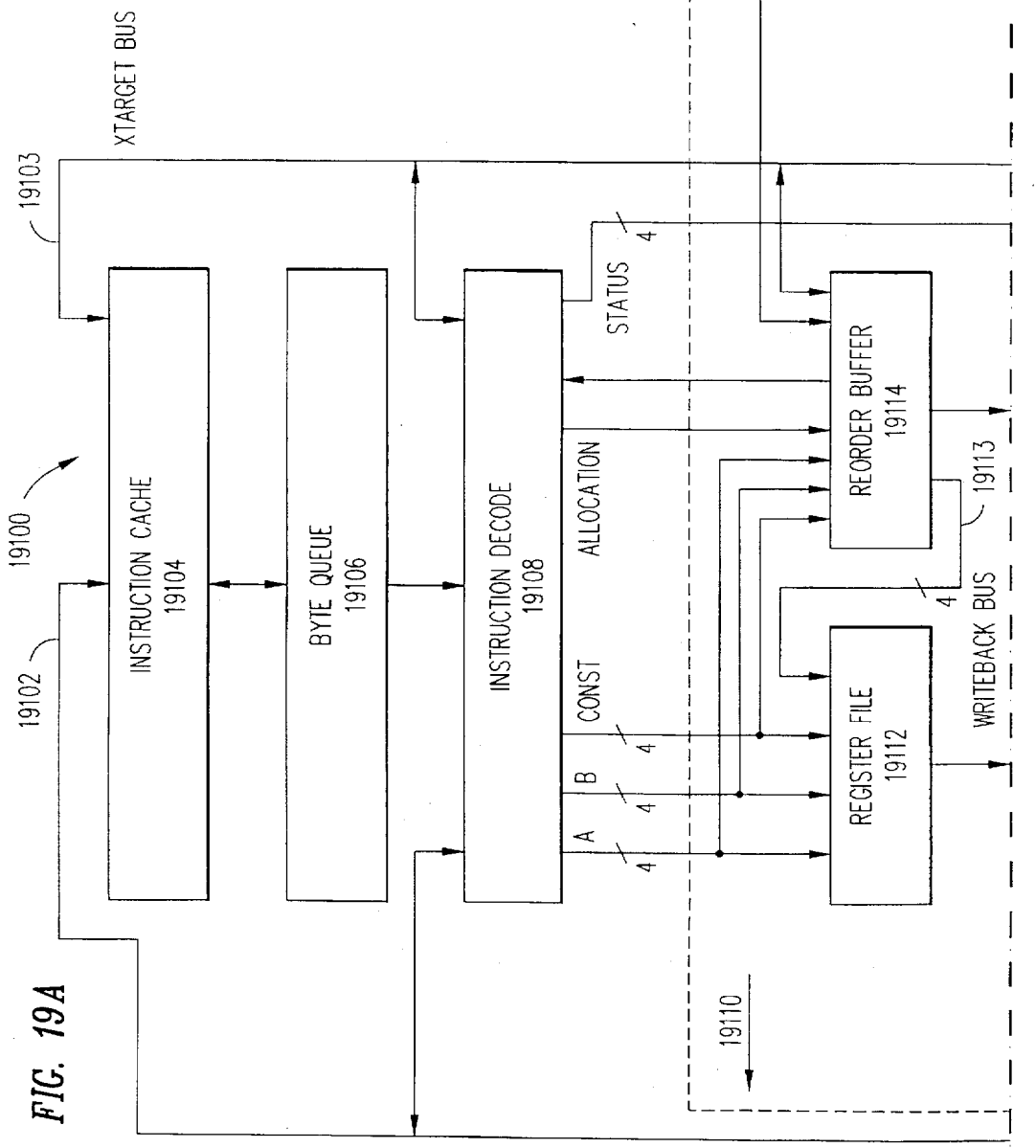
FIGS. 19, 19A, and 19 comprise a functional block diagram of a microcode ROM controller.
Figure 19A:
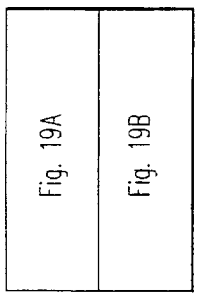
Figure 19B:
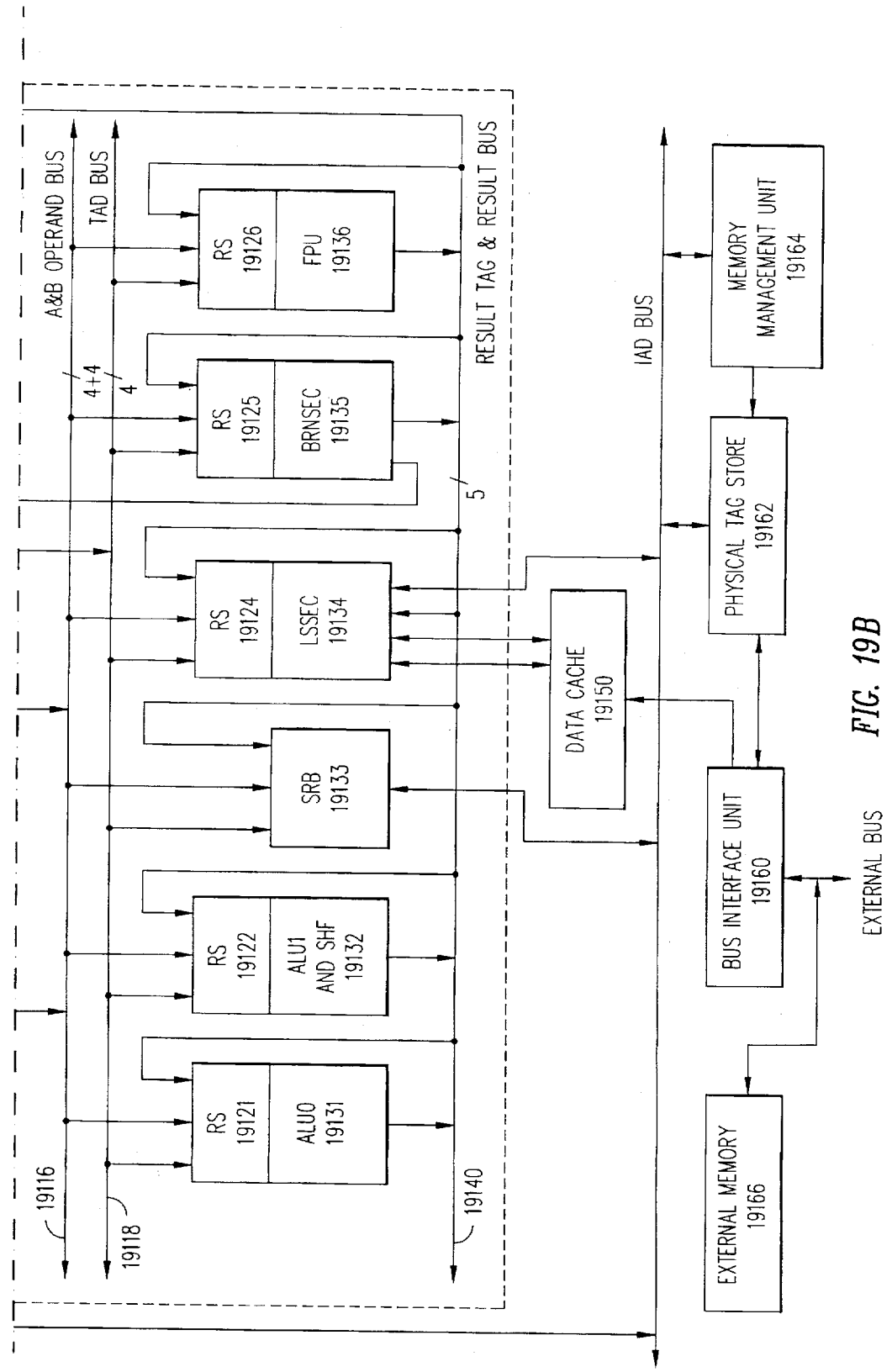

Referring now to FIG. 19, the ICACHE 19104 is a first level instruction cache which identifies and marks raw X86 instruction start and end points and encodes "pre-decode" information. The BYTEQ 19106 is a queue of instruction and pre-decode information of the "predicted executed" state. The BYTEQ 19106 is in effect an interface between the ICACHE 19104 and the IDECODE 19108, and may be integrated with either, distributed across both, or implemented as a separate unit. Depending on how many ROPs the x86 instructions map to, up to four x86 instructions can be dispatched concurrently.

The IDECODE 19108 generates type, opcode, and pointer values for all ROPs based on the pre-decoded x86 instructions in the BYTEQ 19106, and determines the number of possible x86 instruction dispatch for shifting the BYTEQ 19106. The IDECODE 19108 also maintains the program counter values of speculative ROPs, and maintains speculative mapping of floating point pointers for speculative floating point execution.

The BYTEQ 19106 functions as an interface between the ICACHE 19104 and the IDECODE 19108. Conceptually, the byte queue BYTEQ 19106 is a queue of up to sixteen entries representing zero, one or more pre-decoded x86 instructions. Each pre-decoded x86 instruction starts on an instruction start and ends on an instruction end, and consists of one or more elements. Each element includes a valid bit, an x86 instruction byte, pre-decode information of the predicted executed state, and branch misprediction information.

Figure 20:
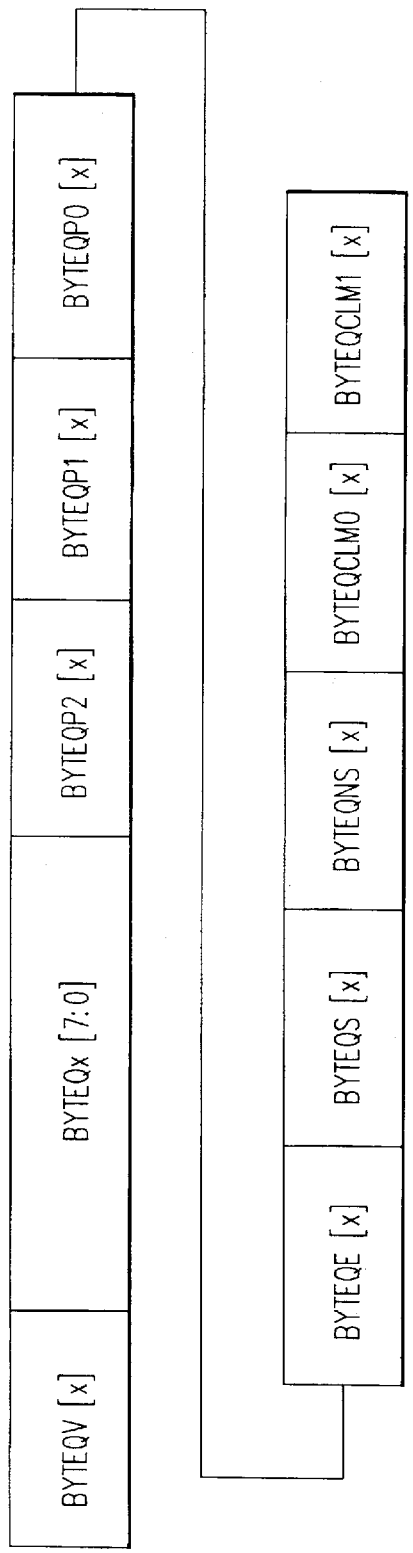
FIG. 20 is a pictorial representation of a pre-decoded x86 instruction suitable for storage in a byte queue of the processor of FIG. 19.

A general representation of a pre-decoded x86 instruction resulting from the processing of an x86 instruction in the ICACHE 19104 is shown in FIG. 20. The ICACHE 19104 parses and pre-decodes the x86 instructions, and stores the results. As x86 instructions are dispatched from the BYTEQ 19106 and subsequent x86 instructions are advanced to the head of the queue, the pre-decoded x86 instructions are copied into locations of the BYTEQ 19106 as there is space available. If one or more prefixes are present in the raw x86 instruction, the pre-decoded x86 instruction includes one or more prefix elements. The last prefix element is a consolidated prefix element containing complete prefix information for the IDECODE 19108, while the other prefix elements are re-coded prefix elements containing partial information and are not used by the IDECODE 19108. FIG. 20 shows re-coded prefix element 2002 and consolidated prefix element 2004. An OPCODE element 2010 containing an x86 instruction opcode byte follows the prefix elements 2002 and 2004. If the raw x86 instruction performs special memory addressing, the pre-decoded x86 instruction includes a mod r/m element, e.g. mod r/m element 2012. If the raw x86 instruction requires certain addressing modes, the pre-decoded x86 instruction includes an sib element; e.g. sib element 2014. If the raw x86 instruction requires displacement information for address computation or contains immediate data, the pre-decoded x86 instruction includes a displacement/immediate data element; e.g. displacement/immediate data element 2016. x86 instruction. Branch misprediction information includes FIG. 20 also shows an example of how pre-decode information is asserted. All elements in the illustrated pre-decoded x86 instruction are valid, as indicated by an asserted "v" bit. The first element of the pre-decoded x86 instruction of FIG. 20, the re-coded prefix 2002, is identified by an asserted "s" bit. The rop bits, which indicate the number of ROPs required for the x86 instruction, are not shown asserted because the re-coding operations may not yield valid rop information. The next element of the pre-decoded x86 instruction of FIG. 20 is the consolidated prefix 2004, which is accompanied by valid rop bits (all subsequent elements of the pre-decoded x86 instruction contain valid rop bits). The x86 instruction opcode element 2010 which follows is identified by an asserted "op" bit. The displacement-immediate element 2016 is marked as the last element of the pre-decoded x86 instruction by an asserted "e" bit.

Note that if the raw x86 instruction contains a two byte opcode, the first byte is handled by the ICACHE 19104 like a prefix byte so that the consolidated prefix of the pre-decoded x86 instruction immediately precedes an opcode element containing the second opcode byte of the raw x86 instruction. In this event, the re-coded prefix immediately preceding the consolidated prefix does contain valid rop bits.

Figure 21:
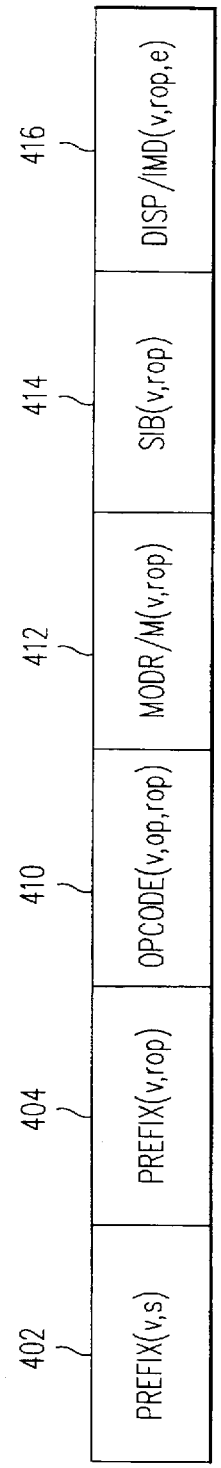
FIG. 21 is a pictorial representation of an element of the pre-decoded x86 instruction of FIG. 20.

A representative element of the BYTEQ 19106 is shown in detail in FIG. 21. Bit BYTEQV[x] indicates whether the element is valid. A byte selected from or derived from the bytes of the raw x86 instruction is contained in BYTEQx [7:0], and may be re-coded prefix information, consolidate prefix information, opcode information, mod r/m information, sib information, or displacement or immediate data information. Pre-decode information includes BYTEQP2[x], which indicates when logic 1 that the accompanying raw byte is an opcode byte; BYTEQP1[x] and BYTEQP0[x], which indicate the number of ROPs needed to execute the x86 instruction (see Table 2); BYTEQS[x], which indicates whether the accompanying raw byte is the first byte of the x86 instruction; and BYTEQE[x], which indicates whether the accompanying raw byte is the last byte of the x86 instruction. Branch misprediction information includes BYTE[x], BYTEQCLM0[x] and BYTEQCLM1 [x].

TABLE 2

| BYTEQP1 BYTEQP0 | DESCRIPTION |
| --- | --- |
| 00 | One ROP x86 instruction |
| 01 | Two ROP x86 instruction |
| 10 | Three ROP x86 instruction |
| 11 | Micro-ROM entry point |

Figure 22:
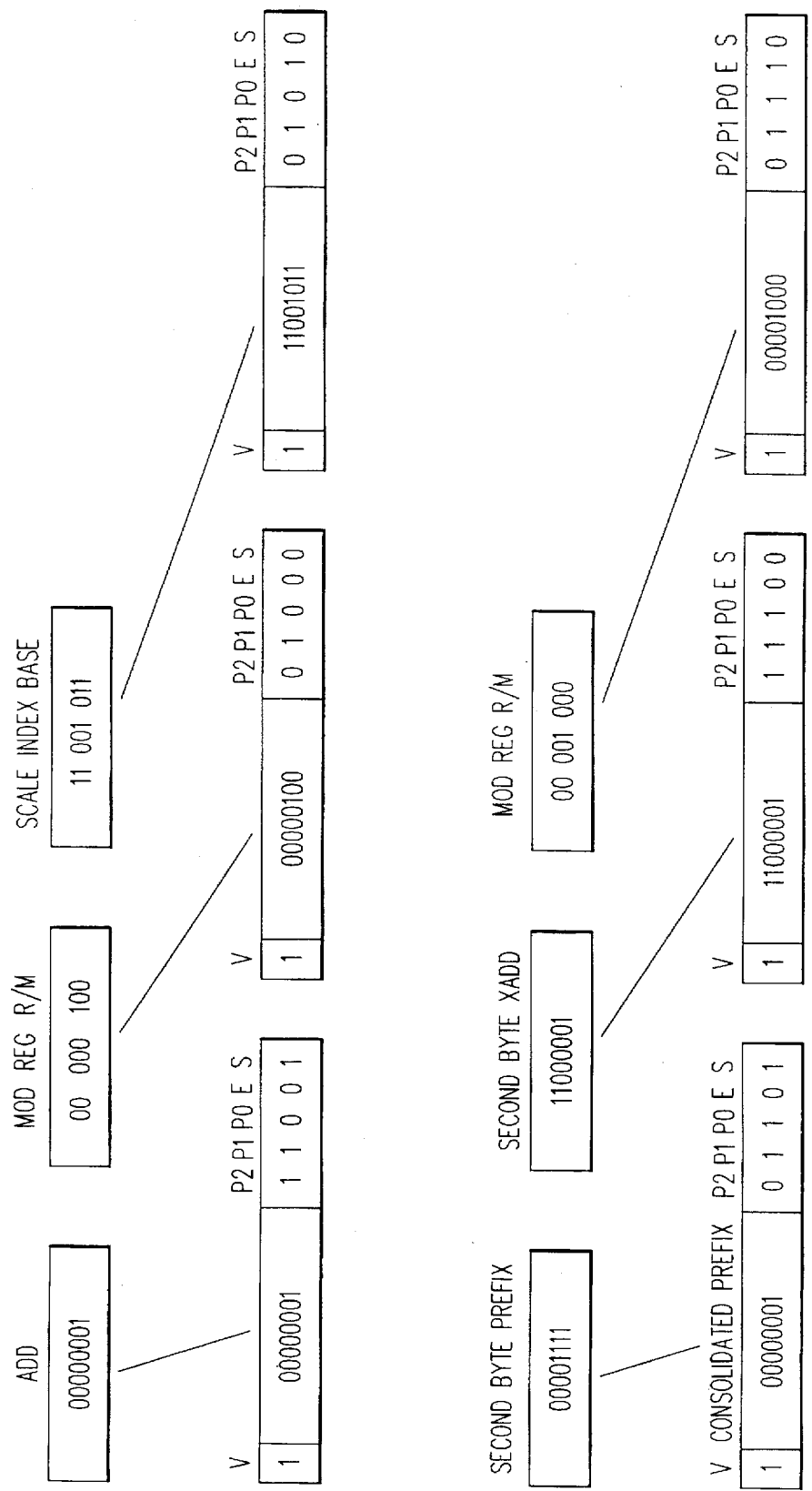
FIG. 22 is a pictorial representation of a conversion of an x86 instruction known as an ADD instruction to a pre-decoded x86 instruction.

FIG. 22 is an example of the parsing of one of the common x86 instruction forms, and how the pre-decoded x86 instruction is stored in locations of the BYTEQ 19106. Assume, for example, that the operation desired is a register to memory addition of a quantity in the 32-bit general register EAX to a quantity in the memory location pointed to by EBX+ECX*8, with the sum being placed in the memory location pointed to by EBX+ECX*8. The address mode using EBX+ECX*8 is one of the complicated x86 address modes. The instruction is represented in x86 assembly language by the single instruction.

ADD[EBX+ECX*8], EAX

One embodiment of a three operand RISC architecture would require the following sequence of three ROPs to perform an arithmetic operation equivalent to the x86 ADD instruction.

LOAD TEMP, [EBX+ECX*8]
ADD TEMP, TEMP, EAX
STORE [EBX+ECX*8], TEMP

The LOAD ROP writes the quantity stored in memory at the address determined by the quantity in EBX added to the quantity in ECX times 8 into a temporary register TEMP. The ADD ROP adds the quantity in register TEMP and the quantity in register EAX, and stores the result in register TEMP. The STORE ROP stores the quantity in register TEMP into memory at the address determined by the quantity in EBX added to the quantity in ECX times 8.

As shown in FIG. 22, the ADD register to memory instruction is contained in three raw bytes: an ADD opcode byte, a mod r/m byte, and an sib byte. The ICACHE 19104 generates appropriate pre-decode information, allocates three locations of the BYTEQ 19106 to the x86 instruction, and writes the pre-decode information and the x86 instruction bytes (branch mispredict information omitted for clarity) to the respective locations of the BYTEQ 19106. All locations are indicated as valid. No prefix byte is present. The pre-decode information for the opcode byte is 11001, indicating that the byte queue entry at the first location is an opcode of an x86 instruction requiring a sequence of three ROPs to execute, is not the last byte of the pre-decoded x86 instruction, and is the start byte of the pre-decoded x86 instruction. The pre-decode information for the mod r/m byte is 01000, indicating that the element is not an opcode, is part of an x86 instruction requiring a sequence of three ROPs to execute, is not the last byte of the pre-decoded x86 instruction, and is not the start byte of the allocated x86 instruction. The pre-decode information for the sib byte is 01010, indicating that the element is not an opcode, is part of an x86 instruction requiring a sequence of three ROPs to execute, is the last byte of the pre-decoded x86 instruction, and is not the start byte of the pre-decoded x86 instruction.

FIG. 22 also contains an example of the parsing of an x86 instruction form which maps to more than three ROPs, and how the pre-decoded x86 instruction is stored in locations of the BYTEQ 106. Assume, for example, that the operation desired is to load the quantity in memory pointed to by the EAX register into the ECX register, and then to load the sum of the quantity in memory pointed to by the EAX register and the original quantity in the ECX register into the EAX register. The instruction is represented in x86 assembly language by the single instruction:

XADD [EAX], ECX

One embodiment of a three operand RISC architecture would require the following sequence of four ROPs to perform an arithmetic operation equivalent to the x86 XADD instruction.

LOAD TEMP1, [EAX]
ADD TEMP0, TEMP1, ECX
STORE [EAX], TEMP0
OR ECX, TEMP1, 0

The LOAD ROP writes the quantity stored in memory using the address specified by the EAX register into a temporary register TEMP1. The ADD ROP adds the quantity in the TEMP1 register and the quantity in the ECX register, and stores the result in another temporary register TEMP0. The STORE ROP stores the sum in the temporary register TEMP0 in memory using the address specified by the EAX register. The OR instruction moves the quantity in the temporary register TEMP1 to the register ECX by performing a logical inclusive OR operation of the quantities in TEMP1 with zero, and placing the result in the ECX register.

As shown in FIG. 22, the XADD instruction is contained in three raw bytes: a second byte prefix byte, the second byte XADD opcode byte, and a mod r/m byte. The ICACHE 19104 generates appropriate pre-decode information, allocates all four locations of the BYTEQ 19106 to the x86 instruction, and writes the pre-decode information and the x86 instruction bytes (branch mispredict information omitted for clarity) to the respective locations of the BYTEQ 19106. All locations are indicated as valid. Note that the raw second byte prefix byte 00001111 is coded by the ICACHE 19104 and stored in the BYTEQ 19106 as the consolidated prefix 00000001. The pre-decode information for the consolidated prefix byte is 01101, indicating that the byte queue entry at the first location is not an opcode. The pre-decode information for the second byte of the XADD instruction is 11100, indicating that the byte queue entry at the second location is an opcode of an x86 instruction requiring a sequence of four ROPs to execute, is not the last byte of the pre-decoded x86 instruction, and is not the start byte of the pre-decoded x86 instruction. The pre-decode information for the mod r/m byte is 01110, indicating that the element is not an opcode and is the last byte of the pre-decoded x86 instruction.

The IDECODE 19108 is a two-stage pipelined decoder which receives pre-decoded x86 instruction bytes from the BYTEQ 19106, translates them into respective sequences of ROPs, and rapidly dispatches ROPs from a plurality of dispatch positions. To maximize the opportunity for multiple instruction issue, the translation is handled in a hardwired fast conversion path for most simple instructions, which in the embodiment of FIG. 23 applied to x86 instructions which map to three ROPs or less. Instructions which require more than three ROPs and infrequently used instructions are handled by microcode sequences contained in microcode ROM. Whether an x86 instruction maps to multiple ROP instructions or microcode ROM, the pre-decoded x86 instruction information is duplicated at multiple dispatch positions to allow each dispatch position to work independently and in parallel with other dispatch positions.

Figure 23:
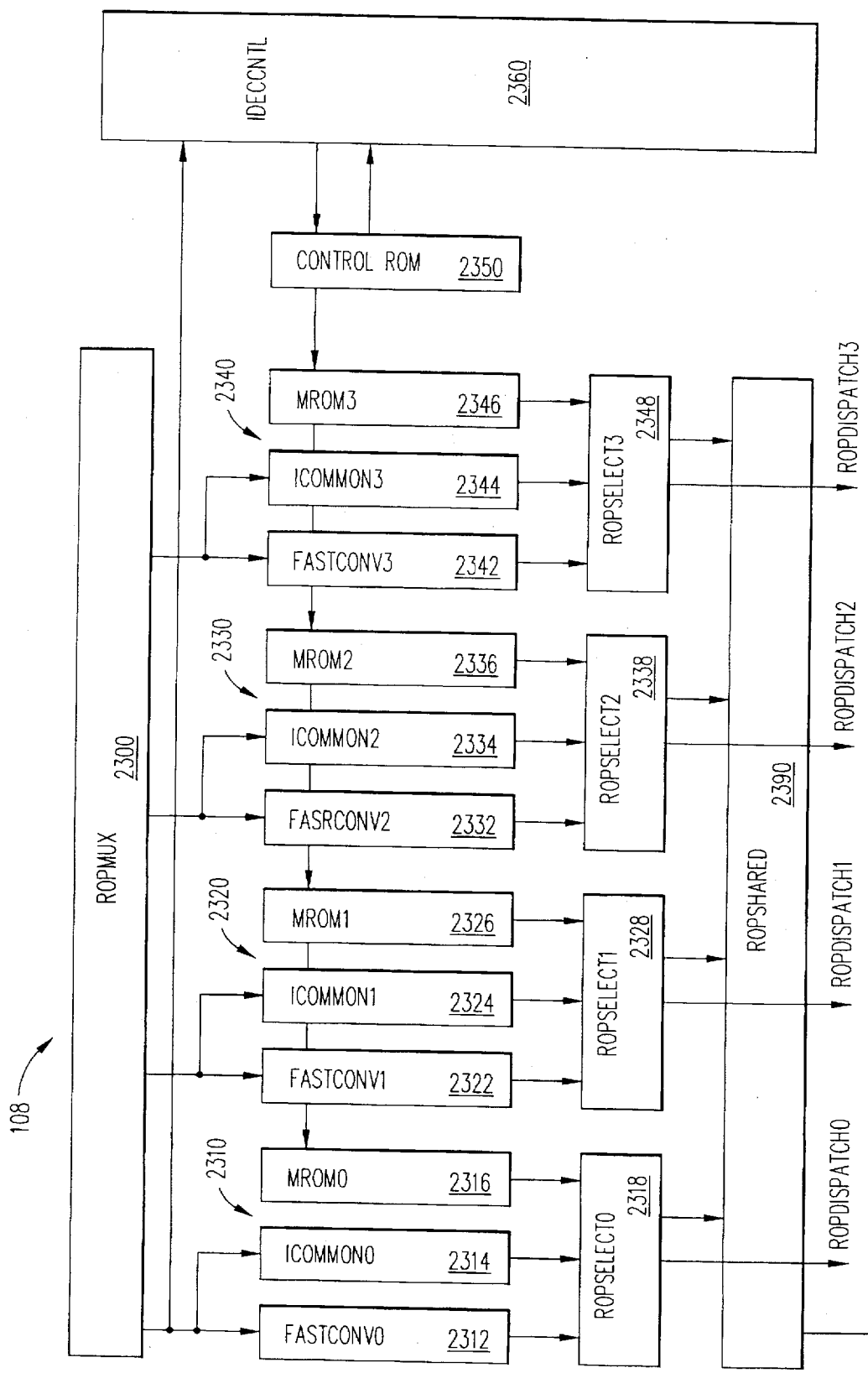
FIG. 23 is an architecture-level block diagram of an instruction decoder.

In the DECODE1 stage, the IDECODE 19108 determines whether ROPs for an x86 pre-decoded instruction are to be generated in the fastpath or the microcode ROM path. In the embodiment of FIG. 23, information for ROP sequences either is generated by fastpath logic for up to four x86 instructions per cycle using up to four ROPs, or is read from microcode ROM for one pre-decoded x86 instruction. The information from the fastpath and the microcode ROM path which is required to generate an ROP includes the type of functional unit to which the ROP is designated to go, the specific simple RISC-like instruction to be executed at the functional unit, source and destination pointers for the ROP, size information of the ROP, addressing mode if a load or a store ROP, and immediate fields if any from the instruction for the ROP. Preferably, microcode ROM accesses are not mixed with fastpath decode, which avoids having to shift microcode ROPs. In the DECODE2 stage, the IDECODE 19108 selects and augments the ROP information from either the fastpath or the microcode ROM and furnishes complete ROPs which are executed in the functional units 19131-19136.

The IDECODE 108 also controls shifting of the BYTEQ 19106, so that fully dispatched pre-decoded x86 instructions are shifted out of the BYTEQ 19106 and the next undispatched or partially dispatched pre-decoded x86 instruction is shifted to the "head of queue."

The IDECODE 19108 also detects problems in the BYTEQ 19106 and indirectly redirects the ICACHE 19104 as appropriate by forcing a microcode entrypoint. The IDECODE 19108 also accepts microcode ROM entry points initiated by cache refill logic in the ICACHE 19104, and by exception and microbranch misprediction logic in the BRNSEC 19135. Microcode entry points generated by the BRNSEC 135 are communicated to the IDECODE 19108 over the XTARGET bus 19103.

The architecture of the IDECODE 19108 is shown in FIG. 23. An ROP multiplexer ROPMUX 2300 directs entries of the BYTEQ 19106 to four dispatch positions 2310, 2320, 2330 AND 2340, which include respective fast converters FASTCONV0 2312, FASTCONV1 2322, FASTCONV2 2332, and FASTCONV3 2342; respective common stages ICOMMON0 2314, ICOMMON1 2324, ICOMMON2 2334, and ICOMMON3 2344; and respective microcode ROMs MROM0 2316, MROM1 2326, MROM2 2336, and MROM3 2346. MROM0 2316, MROM1 2326, MROM2 2336, and MROM3 2346 are controlled by microcode ROM controller IDECCNTL 2360. These elements generally form the first stage of the IDECODE 19108. The second stage of the IDECODE 19108 generally is implemented in ROPSELECT0 2318, ROPSELECT1 2328, ROPSELECT2 2338, and ROPSELECT3 2348, and in ROPSHARED 72390.

The IDECODE 19108 is controlled by IDECCNTL 2360. The IDECCNTL 2360 contains logic implementation in combinatorial logic or programmable array logic for providing general control functions such as furnishing instruction type information on the TAD bus 19118, predicting how many of the ROPs in the current dispatch window can be accepted by the RISC core 19110, informing the ICACHE 19104 how to shift the BYTEQ 19106 in view of the prediction, informing the ROPMUX 2300 of the number of ROPs yet to be dispatched for the pre-decoded x86 instruction at the head of the BYTEQ 19106, and accessing microcode and control ROM. To provide these functions, the IDECCNTL 760 receives various information from the functional units 19131-19136 of the RISC core 19110 as well as from other units of the processor 19100.

Rarely used x86 instructions and x86 instructions requiring ROP sequences of more than 3 ROPs to execute are mapped to microcode ROM. Generally, the x86 instructions which map to more than three ROPs are the complex or interactive instructions such as the CALL gate instruction, the STRING move instruction, and the transcendental floating point routines. In that event, control logic in the IDECODE 19108 forms a microcode ROM address known as an entrypoint, and based on the entrypoint, reads the ROP sequence from the microcode ROM instructions stored in the MROM0 2316, MROM1 2326, MROM2 2336, and MROM3 2346 at four ROPs per cycle.

The IDECCNTL 2360 is any suitable state machine for controlling the operation of the various units of the IDECODE 19108.

The function of the IDECODE 19108 of FIG. 23 for frequently used x86 instructions which map to three or fewer ROPs is illustrated by how the ADD instruction of FIG. 22 is processed. The ROPMUX 700 drives the ADD instruction to the first three dispatch positions 2310, 2320 and 2330. The ADD instruction is processed in the FASTCONVx 902 and ICOMMONx 904 units of the dispatch positions 2310, 2320 and 2330. Hence, FASTCONV0 2312 and ICOMMON0 2314 provide initial logic operations to convert the ADD instruction into the first ROP LOAD TEMP [EBX+ECX*8]. In a similar manner, FASTCONV1 2322 and ICOMMON1 2324 provide initial logic operations to convert the ADD instruction into the second ROP ADD TEMP, TEMP, EAX; and FASTCONV2 2332 and ICOMMON2 2334 provide initial logic operations to convert the ADD instruction into the third ROP STORE [EBX+ECX*8] TEMP.

The function of the IDECODE 19108 of FIG. 23 for infrequently used x86 instructions and for x86 instructions which map to a sequence of four or more ROPs is illustrated by how the XADD instruction of FIG. 22 is processed. The XADD instruction, which is positioned at the head of the BYTEQ 19106, is driven by the ROPMUX 700 to all four dispatch positions 2310, 2320, 2330 and 2340, and is processed in the ICOMMONx 904 units of the dispatch positions 2310, 2320, 2330 and 2340. The XADD instruction is also supplied to the IDECNTL 2360, which determines an entrypoint value for accessing the MROM0 2316, MROM1 2326, MROM2 2336 and MROM3 2346, and for accessing the control ROM 2350. Based on the entrypoint, ROP information for the first ROP in the sequence is read out of the MROM0 2316 and combined with the output of ICOMMON0 2314 to furnish the first ROP LOAD TEMP1, [EAX]. In a similar manner, ROP information for the second ROP in the sequence is read out of the MROM1 2326 in accordance with the value of the entrypoint and combined with the output of ICOMMON0 2324 to furnish the second ROP ADD TEMP0, TEMP1, ECX; ROP information for the third ROP in the sequence is read out of the MROM2 2336 in accordance with the value of the entrypoint and combined with the output of ICOMMON0 2334 to furnish the third ROP STORE [EAX], TEMP0; and ROP information for the fourth ROP in the sequence is read out of the MROM3 2346 in accordance with the value of the entrypoint and combined with the output of ICOMMON0 2344 to furnish the fourth ROP OR ECX, TEMP1. In the event that the x86 instruction were to map to more than the number of dispatch positions available for processing it (the XADD instruction, which maps to four ROPs, does not), processing would continue in the next cycle with the fifth ROP being dispatched from dispatch position 0.

VI. Conclusion—Superscalar High Performance Features

High performance is achieved in the microprocessor of the invention by extracting substantial parallelism from the code which is executed by the microprocessor. Instruction tagging, reservation stations and result buses with forwarding prevent operand hazards from blocking the execution of unrelated instructions. The microprocessor's reorder buffer (ROB) achieves multiple benefits. The ROB employs a type of register renaming to distinguish between different uses of the same register as a destination, which would otherwise artificially inhibit parallelism. The data stored in the reorder buffer represents the predicted execution state of the microprocessor, whereas the data stored in the register file represents the current execution state of the microprocesor. Also, the reorder buffer preserves the sequential state of the program in the event of interrupts. Moreover, the reorder buffer enables more parallelism by allowing execution beyond unresolved conditional branches. Parallelism is further promoted by the on-board instruction cache (ICACHE) which provides high bandwidth instruction fetch, by branch prediction which minimizes the impact of branches, and by an on-board data cache (DCACHE) to minimize latency for load and store operations.

The superscalar microprocessor of the present invention achieves increased performance by efficiently utilizing die space through sharing of several components. More particularly, the integer unit and floating point unit of the microprocessor reside on a common, shared data processing bus. These functional units include multiple reservation stations also coupled to the same data processing bus. The integer and floating point functional units share a common branch unit on the data processing bus. Moreover, the integer and floating point functional units share a common decoder and a common load/store unit 530. An internal address data (IAD) bus provides local communications among several components of the microprocessor of the invention.

While only certain preferred features of the invention have been shown by way of illustration, many modifications and changes will occur. It is, therefore, to be understood that the present claims are intended to cover all such modifications and changes which fall within the true spirit of the invention.

What is claimed is:

1. A superscalar complex instruction set computer (CISC) microprocessor having a variable byte length instruction format comprising:

a source of CISC instructions having a variable byte-length instruction format in which the CISC instructions are stored with an inconsistent byte alignment within an instruction memory including CISC instructions that map into reduced instruction set computer (RISC) operations (ROPs), the CISC instructions being integer CISC instructions that map into integer ROPs and floating point instructions that map into floating point ROPs;

a queue coupled to the CISC instruction source for aligning the speculatively fetched CISC instructions into an aligned instruction stream;

an instruction decoder coupled to the speculative instruction queue for mapping aligned CISC instructions into a corresponding sequence of RISC-like operations (ROPs), dispatching a plurality of ROPs per microprocessor cycle and performing a speculative branch prediction operation;

a data processing bus coupled to the instruction decoder for communicating the integer ROPs and floating point ROPs;

an integer functional unit coupled to the data processing bus for receiving the dispatched integer ROPs, executing the integer ROPs and generating speculative results resulting from the integer ROP execution;

an floating point functional unit coupled to the data processing bus for receiving the dispatched floating point ROPs, executing the floating point ROPs and generating speculative results resulting from the floating point ROP execution;

a reorder buffer coupled to the data processing bus for shared use by both the integer functional unit and the floating point functional unit to store speculative results in common storage elements, the common reorder buffer renaming registers, issuing multiple instructions in a single cycle, retiring multiple instructions in a single cycle, and retiring speculative results which become non-speculative results by virtue of being in a correctly predicted branch, the common reorder buffer not retiring speculative results in mispredicted branches; and a register file, coupled to the reorder buffer and data processing bus, for storing non-speculative results which are retired form the reorder buffer.

2. A microprocessor according to claim 1 wherein the speculative instruction queue further comprises:

an array having a plurality of byte positions for storing a plurality of predecoded instruction bytes;

a retrieval block for retrieving a block of unaligned instruction bytes from the instruction memory;

an array rotate block, responsive to the retrieved block of unaligned instruction bytes, for producing a first rotated instruction byte block;

an array mask block for masking a portion of the first rotated instruction byte block and driving a remaining non-masked portion of the first rotated instruction byte block to respective input terminals of the array for loading into the array;

an output rotate block, responsive to the plurality of instruction bytes stored within the array, for producing a second rotated instruction byte block; and an output mask block for masking a portion of the second rotated instruction byte block and driving a remaining non-masked portion of the second rotated instruction byte block to respective inputs of the array for loading into the array.

3. A microprocessor according to claim 1, wherein the speculative instruction queue further comprises:

a memory for storing a block of instruction bytes;

a fetch circuit for retrieving a block of unaligned instruction bytes from the instruction memory;

a first shifter for shifting the block of unaligned instruction bytes, furnishing a first shifted instruction byte block;

a first loader for loading at least a portion of the first shifted instruction byte block into the memory;

a second shifter for shifting the instruction bytes stored in the memory, furnishing a second shifted instruction byte block;

a second loader for loading at least a portion of the second shifted instruction byte block into the memory; and means for providing a plurality of instruction bytes stored within the memory to the instruction decoder.

4. A microprocessor according to claim 1, wherein the speculative instruction queue further comprises:

an array configured as a FIFO having a FIFO head and a FIFO tail and having a plurality of byte positions for storing a plurality of instruction bytes in speculative execution order, the byte positions having an output terminal coupled to an instruction decoder for simultaneously communicating the plurality of instruction bytes respectively stored in the array;

a shifter coupled to the array and responsive to the instruction decoder for shifting instruction bytes stored within the array by a variable number of byte positions corresponding to complete instructions stored within the array; and a loader coupled to the array for loading a plurality of instruction bytes retrieved from an instruction memory into available byte positions of the array, the array being loaded and shifted so that the FIFO head at all times contains a start byte of an instruction to be next decoded by the instruction decoder.

5. A microprocessor according to claim 4, wherein the loader includes:

a fetcher for retrieving a plurality of instruction bytes from the instruction cache; and a prefetcher for retrieving a plurality of instruction bytes from a memory external from the processor.

6. A microprocessor according to claim 4, wherein the loader includes:

an alignment circuit for generating an aligned plurality of instruction bytes rotated from the plurality of instruction bytes retrieved from the instruction memory; and a driver for selectively loading bytes of the plurality of aligned instruction bytes into the array.

7. A microprocessor according to claim 4, wherein the shifter includes:

a shift register for rotating a plurality of instruction bytes stored within the array; and a loader for selectively loading the rotated plurality of stored instruction bytes into the array.

8. A microprocessor according to claim 1, wherein the reorder buffer includes a control circuit coupled to the instruction decoder for tracking available resources in the reorder buffer and the integer and floating point functional units.

9. A microprocessor according to claim 1, wherein the reorder buffer includes a control circuit coupled to the instruction decoder for dynamically allocating a plurality of reorder buffer entries to receive operation results, the control circuit including:

means for assigning a location in the reorder buffer to receive speculative result data resulting from execution of an ROP;

means for associating a destination register with the location;

means for generating a tag for identifying the result;

means for storing the tag in a reorder buffer location associated with the assigned location; and means responsive to a request generated by a subsequent operation in an ROP stream for obtaining a result value from the assigned location if the value is presently computed and for obtaining the tag otherwise.

10. A microprocessor according to claim 1, further comprising:

a branch functional unit for restarting an instruction pipeline following an exception or branch misprediction, the branch functional unit being coupled to the reorder buffer and including:

means for receiving an extended instruction pointer value indicative of the last program instruction retired; and means for generating a target program counter applied to the instruction cache for fetching subsequent instructions as a function of the extended instruction pointer responsive to the exception or branch misprediction.

11. A microprocessor according to claim 1, further comprising a retire logic coupled to the reorder buffer, the retire logic including:

means for controlling retirement of result operands from the reorder buffer to the register file;

means for determining the number of allocated reorder buffer entries having valid results;

means for scanning for taken branches, stores and load misses and exceptions;

means responsive to detection of an exception for invalidating all ROPs succeeding the exception ROP, forming a trap vector fetch request in accordance with exception status information stored in the reorder buffer;

means responsive to a branch misprediction for invalidating ROPs in the reorder buffer without writeback to the register file and without instruction pointer updating for all ROPs within a misprediction path.

12. A superscalar complex instruction set computer (CISC) microprocessor having a variable byte length instruction format comprising:

source of CISC instructions having a variable byte-length instruction format in which the CISC instructions are stored with an inconsistent byte alignment within an instruction memory including CISC instructions that map into reduced instruction set computer (RISC) operations (ROPs), the CISC including branch instructions and associated branch prediction information, integer CISC instructions that map into integer ROPs, floating point instructions that map into floating point ROPs;

a queue coupled to the CISC instruction source for aligning the speculatively fetched CISC instructions into an aligned instruction stream;

an instruction decoder coupled to the speculative instruction queue for mapping aligned CISC instructions into a corresponding sequence of RISC-like operations (ROPs), dispatching a plurality of ROPs per microprocessor cycle and performing a speculative branch prediction operation;

a data processing bus coupled to the instruction decoder for communicating the integer ROPs and floating point ROPs;

an integer functional unit coupled to the data processing bus including:

means for receiving the dispatched integer ROPs, a reservation station for holding the dispatched integer ROPs awaiting execution;

means for executing the integer ROPs and generating speculative results resulting from the integer ROP execution;

a floating point functional unit coupled to the data processing bus including:

means for receiving the dispatched floating point ROPs;

a reservation station for holding the dispatched floating point ROPs awaiting execution;

means for executing the floating point ROPs and generating speculative results resulting from the floating point ROP execution;

a reorder buffer coupled to the data processing bus for shared use by both the integer functional unit and the floating point functional unit to store speculative results the common reorder buffer a first-in-first-out (FIFO) content addressable memory (CAM) circular buffer of a plurality of storage registers which are dynamically allocated to speculative results in common storage elements, the reorder buffer renaming registers, issuing multiple instructions in a single cycle, retiring multiple instructions in a single cycle, and retiring speculative results which become non-speculative results by virtue of being in a correctly predicted branch, the common reorder buffer not retiring speculative results in mispredicted branches; and a register file, coupled to the reorder buffer and data processing bus, for storing non-speculative results which are retired from the reorder buffer.

13. A microprocessor according to claim 12, wherein the speculative instruction queue further comprises:

an array having a plurality of byte positions for storing a plurality of predecoded instruction bytes;

a retrieval block for retrieving a block of unaligned instruction bytes from the instruction memory;

an array rotate block, responsive to the retrieved block of unaligned instruction bytes, for producing a first rotated instruction byte block;

an array mask block for masking a portion of the first rotated instruction byte block and driving a remaining non-masked portion of the first rotated instruction byte block to respective input terminals of the array for loading into the array;

an output rotate block, responsive to the plurality of instruction bytes stored within the array, for producing a second rotated instruction byte block; and an output mask block for masking a portion of the second rotated instruction byte block and driving a remaining non-masked portion of the second rotated instruction byte block to respective inputs of the array for loading into the array.

14. A microprocessor according to claim 12, wherein the speculative instruction queue further comprises:

a memory for storing a block of instruction bytes;

a fetch circuit for retrieving a block of unaligned instruction bytes from the instruction memory;

a first shifter for shifting the block of unaligned instruction bytes, furnishing a first shifted instruction byte block;

a first loader for loading at least a portion of the first shifted instruction byte block into the memory;

a second shifter for shifting the instruction bytes stored in the memory, furnishing a second shifted instruction byte block;

a second loader for loading at least a portion of the second shifted instruction byte block into the memory; and means for providing a plurality of instruction bytes stored within the memory to the instruction decoder.

15. A microprocessor according to claim 12 wherein:

the instruction decoder dynamically allocates reorder buffer storage registers by assigning a position in the reorder buffer to receive a speculative result value of an ROP; and the result value destination register number is associated with this assigned position.

16. A microprocessor according to claim 12 wherein:

responsive to decoding of an instruction by the instruction decoder, a reorder buffer register is allocated for holding the speculative result of the ROP; and the destination register of the ROP is associated with the allocated register so that register renaming is achieved.

17. A microprocessor according to claim 12, wherein the reorder buffer includes a control circuit coupled to the instruction decoder for tracking available resources in the reorder buffer and the reservation stations of the integer and floating point functional units.

18. A microprocessor according to claim 12, wherein the reorder buffer includes a control circuit coupled to the instruction decoder for dynamically allocating a plurality of reorder buffer entries to receive operation results, the control circuit including:

means for assigning a location in the reorder buffer to receive speculative result data resulting from execution of an ROP;

means for associating a destination register with the location;

means for generating a tag for identifying the result;

means for storing the tag in a reorder buffer location associated with the assigned location; and means responsive to a request generated by a subsequent operation in an ROP stream for obtaining a result value from the assigned location if the value is presently computed and for obtaining the tag otherwise.

19. A microprocessor according to claim 12 wherein:

the reorder buffer is addressed according to a destination register number; source operands of ROPs are accessed by comparing a source operand identifier with the destination register number of the reorder buffer; for a destination register number equal to the source operand identifier, the source operand is read from the reorder buffer, otherwise the source operand is read from the destination register location of the register file.

20. A microprocessor according to claim 12, further comprising:

a branch functional unit for restarting an instruction pipeline following an exception or branch misprediction, the branch functional unit being coupled to the reorder buffer and including:

means for receiving an extended instruction pointer value indicative of the last program instruction retired; and means for generating a target program counter applied to the instruction cache for fetching subsequent instructions as a function of the extended instruction pointer responsive to the exception or branch misprediction.

21. A microprocessor according to claim 12, further comprising a retire logic coupled to the reorder buffer, the retire logic including:

means for controlling retirement of result operands from the reorder buffer to the register file;

means for determining the number of allocated reorder buffer entries having valid results;

means for scanning for taken branches, stores and load misses and exceptions;

means responsive to detection of an exception for invalidating all ROPs succeeding the exception ROP, forming a trap vector fetch request in accordance with exception status information stored in the reorder buffer;

means responsive to a branch misprediction for invalidating ROPs in the reorder buffer without writeback to the register file and without instruction pointer updating for all ROPs within a misprediction path.

22. A method of operating a superscalar complex instruction set computer (CISC) microprocessor having a variable byte length instruction format, the method comprising the steps of:

supplying a source of CISC instructions having a variable byte-length instruction format in which the CISC instructions are stored with an inconsistent byte alignment within an instruction memory including CISC instructions that map into reduced instruction set computer (RISC) operations (ROPs), the CISC instructions including branch instructions and associated branch prediction information, integer CISC instructions that map into integer ROPs and floating point instructions that map into floating point ROPs;

aligning the inconsistent byte-aligned CISC instructions into an aligned instruction stream, selecting a CISC instruction from said aligned instruction stream;

determining a number of ROPs into which said selected instruction maps;

allocating a plurality of dispatch positions less than or equal to said number of ROPs;

directing a CISC instruction of the sequence of CISC instructions to at least one of the dispatch positions according to the number of ROPs allocated, within the dispatch positions, converting CISC instructions of a first-type to corresponding first-type ROPs employing a logic circuit and converting CISC instructions of a second-type to corresponding second-type ROPs employing a microcode ROM memory;

selecting ROPs from the logic circuit for first-type CISC instructions and from the microcode ROM memory for second-type CISC instructions; and dispatching a plurality of selected ROPs in a single cycle;

performing a speculative branch prediction operation;

transmitting integer ROPs and floating point ROPs;

within an integer functional unit receiving the dispatched integer ROPs, holding the dispatched integer ROPs awaiting execution, executing the integer ROPs and generating speculative results resulting from the integer ROP execution;

within a floating point functional unit receiving the dispatched floating point ROPs, holding the dispatched floating point ROPs awaiting execution, executing the floating point ROPs and generating speculative results resulting from the floating point ROP execution;

retiring speculative results of a plurality of ROPs in a single cycle both the integer functional unit and the floating point functional unit, the speculative results which become non-speculative results by virtue of being in a correctly predicted branch;

discarding speculative results in mispredicted branches; and storing retired non-speculative results as part of an architectural state.

23. A method according to claim 22 wherein the instruction aligning step further comprises the steps of:

configuring an array as a FIFO having a plurality of byte positions, a byte position storing a plurality of instruction bytes in speculative execution order;

coupling an output terminal of ones of the plurality of byte positions to an instruction decoder for simultaneously communicating ones of the plurality of instruction bytes stored within the array to the instruction decoder;

maintaining control information for the array for communicating which of the byte positions store valid instruction bytes suitable for decoding and conversely for communicating which of the byte positions are invalid and therefore available for storing instruction bytes not yet present within the array;

retrieving from the instruction memory a block of instruction bytes including an instruction byte that corresponds to an address designated by the processor and predicted to execute subsequent to execution of valid instruction bytes already stored within the array, and further retrieving subsequent additional blocks storing subsequently predicted-executed instruction bytes;

storing ones of the retrieved instruction bytes beginning with the address-designated instruction byte and continuing through the predicted-executed instruction byte, the instruction bytes being stored into available invalid byte positions within the array and continuing as additional invalid byte positions become available; and shifting the instruction bytes stored within the array in response to control signals received from the instruction decoder, the instruction bytes being shifted by a number of byte positions corresponding to complete instructions stored within the array and previously received by the instruction decoder, whereby the first of the byte positions, if valid, is maintained to correspond to a starting byte of a successive instruction to be next received by the instruction decoder to decode and dispatch for speculative execution, and if invalid, is reserved for subsequent storing of such an instruction byte.

24. A method according to claim 22 further comprising the steps of:

dynamically allocating storage registers for speculative results by assigning a position in a reorder buffer to receive a speculative result value of an ROP; and associating a result value destination register number with this assigned position.

25. A method according to claim 24, wherein the dynamically allocating step further comprises the steps of:

assigning a location in the reorder buffer to receive speculative result data resulting from execution of an ROP;

associating a destination register with the location;

generating a tag for identifying the result;

storing the tag in a reorder buffer location associated with the assigned location; and responsive to a request generated by a subsequent operation in an ROP stream, obtaining a result value from the assigned location if the value is presently computed and for obtaining the tag otherwise.

26. A method according to claim 24 wherein: addressing the reorder buffer according to a destination register number; accessing source operands of ROPs by comparing a source operand identifier with the destination register number of the reorder buffer;

for a destination register number equal to the source operand identifier, reading the source operand from the reorder buffer, and otherwise reading the source operand from the destination register location of the register file.

27. A method according to claim 22 wherein:

in response to decoding of an ROP, allocating a storage register in a reorder buffer for holding the speculative result of the ROP; and associating a destination register of the ROP with the allocated register so that register renaming is achieved.

28. A method according to claim 22, further comprising the steps of:

restarting an instruction pipeline following an exception or branch misprediction including the steps of:
receiving an extended instruction pointer value indicative of the last program instruction retired; and
generating a target program counter applied to the instruction cache for fetching subsequent instructions as a function of the extended instruction pointer responsive to the exception or branch misprediction.

29. A method according to claim 22, further comprising the steps of:

controlling retirement of result operands from the reorder buffer;

determining the number of allocated reorder buffer entries having valid results;

scanning for taken branches, stores and load misses and exceptions;

responsive to detection of an exception, invalidating all ROPs succeeding the exception ROP, forming a trap vector fetch request in accordance with exception status information stored in the reorder buffer; and responsive to a branch misprediction, invalidating ROPs in the reorder buffer without writeback and without instruction pointer updating for all ROPs within a misprediction path.

* * * * *